(12) United States Patent
Suzuki et al.

(10) Patent No.: US 9,232,205 B2
(45) Date of Patent: Jan. 5, 2016

(54) INFORMATION PROCESSING DEVICE, INFORMATION PROCESSING METHOD AND PROGRAM

(75) Inventors: Hirotaka Suzuki, Kanagawa (JP); Masato Ito, Tokyo (JP)

(73) Assignee: SONY CORPORATION, Tokyo (JP)

( * ) Notice: Subject to any disclaimer, the term of this patent is extended or adjusted under 35 U.S.C. 154(b) by 497 days.

(21) Appl. No.: 13/814,181

(22) PCT Filed: Aug. 2, 2011

(86) PCT No.: PCT/JP2011/067692
§ 371 (c)(1),
(2), (4) Date: Mar. 14, 2013

(87) PCT Pub. No.: WO2012/020668
PCT Pub. Date: Feb. 16, 2012

(65) Prior Publication Data
US 2013/0183022 A1     Jul. 18, 2013

(30) Foreign Application Priority Data
Aug. 11, 2010   (JP) ................................ P2010-180175

(51) Int. Cl.
G06F 17/30      (2006.01)
G06K 9/00       (2006.01)
H04N 9/87       (2006.01)

(52) U.S. Cl.
CPC ............ *H04N 9/87* (2013.01); *G06F 17/30796* (2013.01); *G06F 17/30843* (2013.01); *G06F 17/30852* (2013.01); *G06K 9/00718* (2013.01); *G06K 2209/27* (2013.01)

(58) Field of Classification Search
None
See application file for complete search history.

(56) References Cited

U.S. PATENT DOCUMENTS 8,296,799 B2 * 10/2012 Yamagishi ...................... 725/41
2003/0033288 A1 * 2/2003 Shanahan et al. ................. 707/3

(Continued)

FOREIGN PATENT DOCUMENTS

JP      10-254883      9/1998
JP      2003-283968    10/2003

(Continued)

OTHER PUBLICATIONS

T. Shibata et al., "Unsupervised Topic Identification by Integrating Linguistic and Visual Information based on Hidden Markov Models", vol. 48, No. 6, pp. 2129-2139 (2007).

(Continued)

*Primary Examiner* — Jay Patel
*Assistant Examiner* — Reza Aghevli
(74) *Attorney, Agent, or Firm* — Hazuki International, LLC

(57) ABSTRACT

An information processing device, method and a program adds an annotation to content and provides an application which utilizes the annotation. A learning module extracts an image feature amount of each frame of an image of learning content and extracts word frequency information regarding a frequency of appearance of each word in a description text, and learns an annotation models which is a multi-stream Hidden Markov Model (HMM) by using a multi-stream including the image feature amount and the text feature amount. A browsing controller extracts a scene which is a group of one or more temporally continuous frames from target content by using the annotation model and displays representative images of the scenes so as to be arranged in chronological order.

18 Claims, 45 Drawing Sheets

(56) References Cited

U.S. PATENT DOCUMENTS

| | | | | |
|---|---|---|---|---|
| 2003/0061201 | A1* | 3/2003 | Grefenstette et al. | 707/3 |
| 2003/0069877 | A1* | 4/2003 | Grefenstette et al. | 707/2 |
| 2005/0022114 | A1* | 1/2005 | Shanahan et al. | 715/513 |

FOREIGN PATENT DOCUMENTS

| | | |
|---|---|---|
| JP | 2007-163568 | 6/2007 |
| JP | 2008-175994 | 7/2008 |
| JP | 2010-44614 | 2/2010 |
| JP | 2010-093461 | 4/2010 |

OTHER PUBLICATIONS

N. Huu Bach et al., "Automatic video indexing of baseball broadcast using a hidden Markov model" IEICE Technical Report (Institute of Electronics, Information and Communication Engineers), vol. 104, No. 448, pp. 13-18.

English-language translation of International Search Report from the Japanese Patent Office in PCT International Application No. PCT/JP2011/067692 mailed Nov. 1, 2011.

* cited by examiner

FIG. 12

WHEN SEARCH REQUEST IS (KW#1 AND KW#2) OR (KW#3 AND KW#4)

| | t-TH FRAME | (t+1)-TH FRAME | (t+2)-TH FRAME | (t+3)-TH FRAME | (t+4)-TH FRAME | (t+5)-TH FRAME | |
|---|---|---|---|---|---|---|---|
| KEYWORD COINCIDENCE D#1 WITH KEYWORD KW#1 ... | 100 | 150 | 20 | 0 | 0 | 0 | ... |
| KEYWORD COINCIDENCE D#2 WITH KEYWORD KW#2 ... | 50 | 200 | 30 | 0 | 0 | 0 | ... |
| KEYWORD COINCIDENCE D#3 WITH KEYWORD KW#3 ... | 0 | 0 | 0 | 150 | 40 | 200 | ... |
| KEYWORD COINCIDENCE D#4 WITH KEYWORD KW#4 ... | 0 | 0 | 0 | 200 | 100 | 50 | ... |

FIG. 13

| | i-TH FRAME | (t+1)-TH FRAME | (t+2)-TH FRAME | (t+3)-TH FRAME | (t+4)-TH FRAME | (t+5)-TH FRAME | |
|---|---|---|---|---|---|---|---|
| KEYWORD COINCIDENCE D#1 WITH KEYWORD KW#1 | 100 | 150 | 120 | 0 | 0 | 0 | ... |
| KEYWORD COINCIDENCE D#2 WITH KEYWORD KW#2 | 200 | 200 | 100 | 0 | 0 | 0 | ... |
| KEYWORD COINCIDENCE D#12 WITH AND SEARCH FORMULA KW#1 AND KW#2 = min(D#1, D#2) | 100 | 150 | 100 | 0 | 0 | 0 | ... |
| KEYWORD COINCIDENCE D#3 WITH KEYWORD KW#3 | 0 | 0 | 0 | 150 | 40 | 200 | ... |
| KEYWORD COINCIDENCE D#4 WITH KEYWORD KW#4 | 0 | 0 | 0 | 200 | 100 | 50 | ... |
| KEYWORD COINCIDENCE D#34 WITH AND SEARCH FORMULA KW#3 AND KW#4 = min(D#3, D#4) | 0 | 0 | 0 | 150 | 40 | 50 | ... |

FIG. 14

| | t-TH FRAME | (t+1)-TH FRAME | (t+2)-TH FRAME | (t+3)-TH FRAME | (t+4)-TH FRAME | (t+5)-TH FRAME | |
|---|---|---|---|---|---|---|---|
| KEYWORD COINCIDENCE D#12 WITH AND SEARCH FORMULA KW#1 AND KW#2 = min(D#1, D#2) | 100 | 150 | 100 | 0 | 0 | 0 | ... |
| KEYWORD COINCIDENCE D#34 WITH AND SEARCH FORMULA KW#3 AND KW#4 = min(D#3, D#4) | 0 | 0 | 0 | 150 | 40 | 50 | ... |
| KEYWORD COINCIDENCE D#12/34 WITH OR SEARCH FORMULA (KW#1 AND KW#2) OR (KW#3 AND KW#4) = max(D#12, D#34) | 100 | 150 | 100 | 150 | 40 | 50 | ... |
| FRAME, WHICH COINCIDES WITH SEARCH QUERY (KW#1 AND KW#2) OR (KW#3 AND KW#4) | | | | | | | |

FIG. 31

| | INTERESTING TOPIC COLUMN | | TOPIC COLUMN | ANNOTATION |
|---|---|---|---|---|
| CHINA/FOR/TOPIC/ RECALL/PANDA/RED BRI | JAPAN/MEDAL/ CHINA/WIN/ GOLD MEDAL/KOREA | NO SMOKING/WHOLE AREA/COMEDY/ JAPAN/CINEMA/CHAMPI | CHARGE/MEMBER/ KOBAYASHI/ARREST/ FUND/DOUBT/CAMP | |
| PLAYER/JAPAN/ ASADA/MAO/MEDAL/FIGU | CANADA/THE UNITED STATES/ GOLD MEDAL/LAST/ICE | CHILI/EARTHQUAKE/ DAMAGE/EARTHQUAKE CENTER/DISASTER/ GOVERNMENT/OCCUR | | PLAYER/OLYMPIC/ THOUGHT/ FEELING/ARAKAWA/MOS |
| MIYAZATO/OPENING/ PLAYER/THOUGHT/ ACHIEVEMENT/ TOUR/CONSECUTIVE | SUICIDE/MEASURES/ MARCH/AFFAIR/ REINFORCEMENT/ GOVERNMENT/MONTH | POINT/CARD/COMMON/ COMPANY/SHOPPING/S | JAPAN/SKATING/ SPEED/MEDAL/ WOMAN/ | |
| SALE/PLAN/ SHONAN/BELLMARE/ ANOMALY/HUNDRED | CHOPIN/NO PROBLEM/FIREFLY SQUID/MYSELF/MARCH | WOMAN/COLLECT/ ATTENTION/NEW/ ADMINISTRATION/ FLASH POINT/ESCAPE | OLYMPIC/ VANCOUVER/ SOCHI D/DAILY / | MINISTER/HATOYAMA/BUDGET/ PRIME MINISTER/HOUSE OF REPRESENTATIVES/PROBLEM/INDIC |
| | TSUNAMI/DAMAGE/ CULTIVATION/MIYAGI/ SEACOAST/OYSTER/EFFECT | JAPAN/THOUGHT/ MEDAL/SAY/ THINK/MINUTES/BA | TSUNAMI/ESCAPE/THIS TIME/ALERT/ISSUE/ INSTRUCTION/ISSUE | |
| ENTER/PLAN/ THINK/DEATH/ FRANCE/REMEMBER | | | ECONOMY/WATCH/ SO FAR/EXTREMELY/ IMPORTANT/TRANSMIT | TSUNAMI/EARTHQUAKE/ ALERT/METEOROLOGICAL AGENCY/METER/FORECAST |

INFORMATION PROCESSING DEVICE, INFORMATION PROCESSING METHOD AND PROGRAM

TECHNICAL FIELD

The present invention relates to an information processing device, an information processing method, and a program, and especially relates to an information processing device, an information processing method, and a program capable of easily adding an annotation to content and providing an application, which utilizes the annotation, for example.

BACKGROUND ART

There is a method of displaying a digest of the content as a method by which a user recognizes a summary of the content including an image of a broadcast program and the like (for example, Patent Documents 1, 2, and 3).

CITATION LIST

Patent Documents

Patent Document 1: Japanese Patent Application Laid-Open No. 2007-163568
Patent Document 2: Japanese Patent Application Laid-Open No. 2008-175994
Patent Document 3: Japanese Patent Application Laid-Open No. 2010-093461

SUMMARY OF THE INVENTION

Problems to be Solved by the Invention

As the method by which the user recognizes the summary of the content, there is a method of adding the annotation to the content in addition to the method of displaying the digest of the content.

At present, it is required that technology to easily add the annotation to the content be proposed.

The present invention is achieved in consideration of such circumstances and an object thereof is to easily add the annotation to the content and to provide the application, which utilizes the annotation.

Solutions to Problems

An information processing device or a program according to one aspect of the present invention is an information processing device including learning means for extracting an image feature amount of each frame of an image of learning content and extracting word frequency information regarding frequency of appearance of each word in a description text describing a content of the image of the learning content as a text feature amount of the description text, and learning an annotation model, which is a multi-stream HMM (hidden Markov model), by using an annotation sequence for annotation, which is a multi-stream including the image feature amount and the text feature amount; and browsing controlling means for extracting a scene, which is a group of one or more temporally continuous frames, from target content from which the scene is to be extracted by using the annotation model, and displaying representative images of scenes so as to be arranged in chronological order, or a program for allowing a computer to function as the information processing device.

An information processing method according to one aspect of the present invention is an information processing method to be performed by an information processing device, including the steps of: extracting an image feature amount of each frame of an image of learning content and extracting word frequency information regarding a frequency of appearance of each word in a description text describing a content of the image of the learning content as a text feature amount of the description text; learning an annotation model, which is a multi-stream HMM (hidden Markov model), by using an annotation sequence for annotation, which is a multi-stream including the image feature amount and the text feature amount; extracting a scene, which is a group of one or more temporally continuous frames, from target content from which a scene is to be extracted by using the annotation model; and displaying representative images of scenes so as to be arranged in chronological order.

In one aspect of the present invention as described above, the image feature amount of each frame of the image of the learning content is extracted and the word frequency information regarding the frequency of the appearance of each word in the description text describing the content of the image of the learning content is extracted as the text feature amount of the description text, and the annotation model, which is the multi-stream HMM (hidden Markov model), is learned by using the annotation sequence for annotation, which is the multi-stream including the image feature amount and the text feature amount. Then, the scene, which is a group of one or more temporally continuous frames, is extracted from the target content from which the scene is to be extracted by using the annotation model and the representative images of the scenes are displayed so as to be arranged in chronological order.

Meanwhile, the information processing device may be an independent device or may be an internal block, which compose one device.

Also, the program may be provided by being transmitted through a transmitting medium or being recorded in a recording medium.

Effects of the Invention

According to one aspect of the present invention, it is possible to easily add the annotation to the content and provide the application, which utilizes the annotation.

BRIEF DESCRIPTION OF DRAWINGS

FIG. 12 is a view illustrating an example of keyword coincidence of each frame of the target content obtained for each of keywords KW#1, KW#2, KW#3, and KW#4.

FIG. 13 is a view illustrating numerical min operation as operation of an AND search formula.

FIG. 14 is a view illustrating numerical max operation as operation of an OR search formula.

FIG. 31 is a view illustrating an example of a display format of the annotation using the topic list.

MODE FOR CARRYING OUT THE INVENTION

First Embodiment

Figure 1:
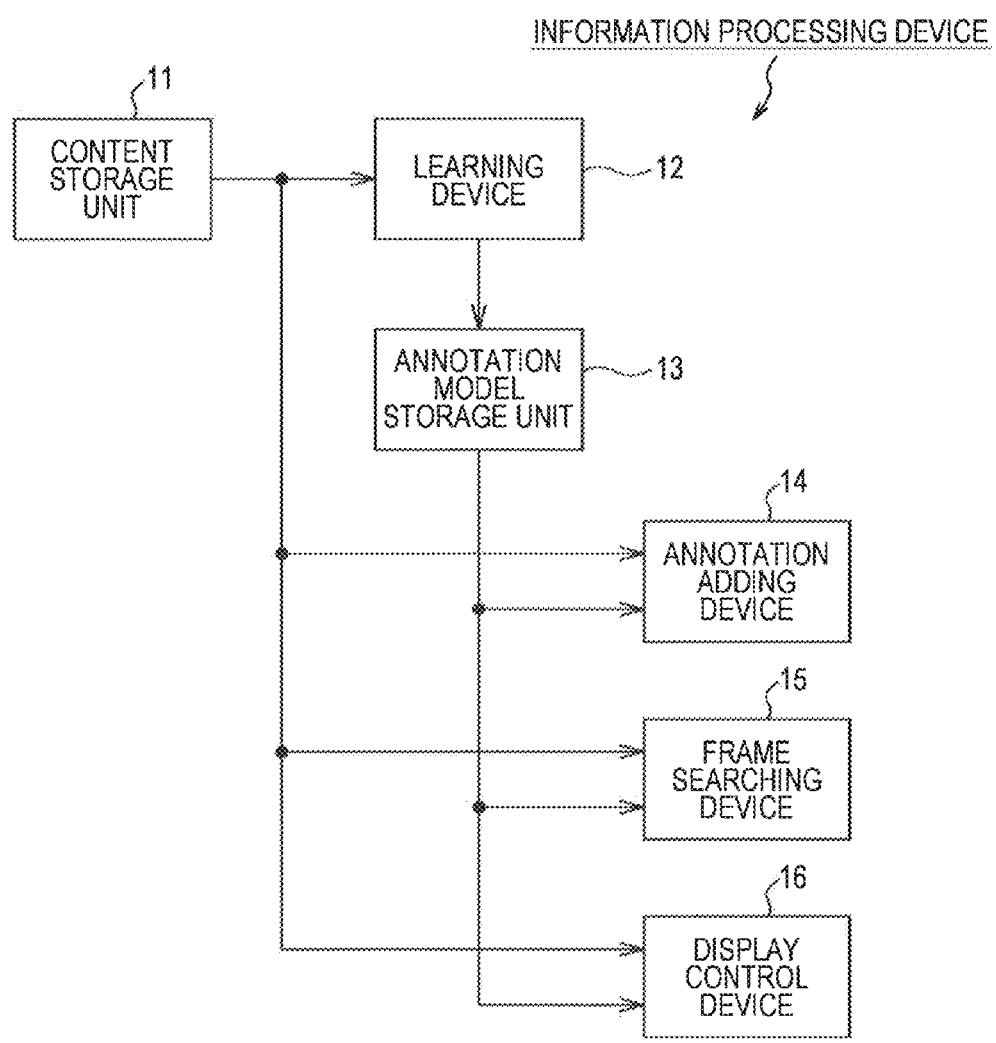
FIG. 1 is a block diagram illustrating a configuration example of one embodiment of a recorder to which an information processing device of the present invention is applied.

One Embodiment of Recorder to which Information Processing Device of Present Invention is Applied FIG. 1 is a block diagram illustrating a configuration example of one embodiment of a recorder to which an information processing device of the present invention is applied.

The recorder in FIG. 1 is a HD (hard disk) recorder and the like, for example, which may record (record) (store) various content such as a television broadcast program, content provided through a network such as the Internet, and content taken by a video camera and the like.

That is, in FIG. 1, the recorder includes a content storage unit 11, a learning device 12, an annotation model storage unit 13, an annotation adding device 14, a frame searching device 15, and a display control device 16.

Meanwhile, the content storage unit 11, the learning device 12, the annotation model storage unit 13, the annotation adding device 14, the frame searching device 15, and the display control device 16 may be composed as one device (casing) or as a plurality of devices.

That is, it is possible to compose the content storage unit 11, the learning device 12, and the annotation model storage unit 13 as one device such as a server on a home network or the server on the Internet and compose each of the annotation adding device 14, the frame searching device 15, and the display control device 16 as another device such as a client, for example.

The content storage unit 11 stores (records) the content including an image such as the television broadcast program, for example. To store the content in the content storage unit 11 is to record the content and the recorded content (content stored in the content storage unit 11) is reproduced according to operation by a user, for example.

Meanwhile, in addition to this, the content taken by the video camera and the like, the content downloaded from a web server and the like may also be stored in the content storage unit 11.

The learning device 12 organizes the content stored in the content storage unit 11 in a self-organizing manner in a predetermined feature amount space and performs learning (statistical learning) to obtain a model representing a structure (time-space structure) of the content, for example.

That is, the learning device 12 selects the content of which description text describing a content of the image of the content may be obtained from among the content stored in the content storage unit 11 as learning content used for learning an annotation model to be described later.

Further, the learning device 12 extracts an image feature amount of each frame of the image of the learning content and extracts word frequency information regarding a frequency of appearance of each word in the description text describing the content of the image of the learning content as a text feature amount of the description text.

Then, the learning device 12 learns the annotation model, which is a multi-stream HMM (hidden Markov model), by using a multi-stream including the image feature amount and the text feature amount extracted from the learning content as an annotation sequence for annotation and supplies the learned annotation model to the annotation model storage unit 13.

The annotation model storage unit 13 stores the annotation model supplied from the learning device 12.

The annotation adding device 14 adds the annotation to target content to which the annotation is to be added out of the content stored in the content storage unit 11 by using the annotation model stored in the annotation model storage unit 13.

The frame searching device 15 searches a keyword frame from the target content from which the keyword frame, which is a frame of which content coincides with a predetermined keyword, is to be searched out of the content stored in the content storage unit 11 by using the annotation model stored in the annotation model storage unit 13.

The display control device 16 performs display control to display the annotation to be added to the frame of the target content to which the annotation is to be added out of the content stored in the content storage unit 11 by using the annotation model stored in the annotation model storage unit 13.

Meanwhile, data of the content stored in the content storage unit 11 herein includes the data (streams) of the image, audio, and a text of a required caption.

However, it is only required that the learning content be the content at least including the image and of which description text such as the text of the caption may be obtained by a certain method, and that the target content to be processed by the annotation adding device 14, the frame searching device 15, and the display control device 16 be the content at least including the image.

The learning content and the target content may also be the content not including the image but including the audio.

[Configuration Example of Learning Device 12]

Figure 2:
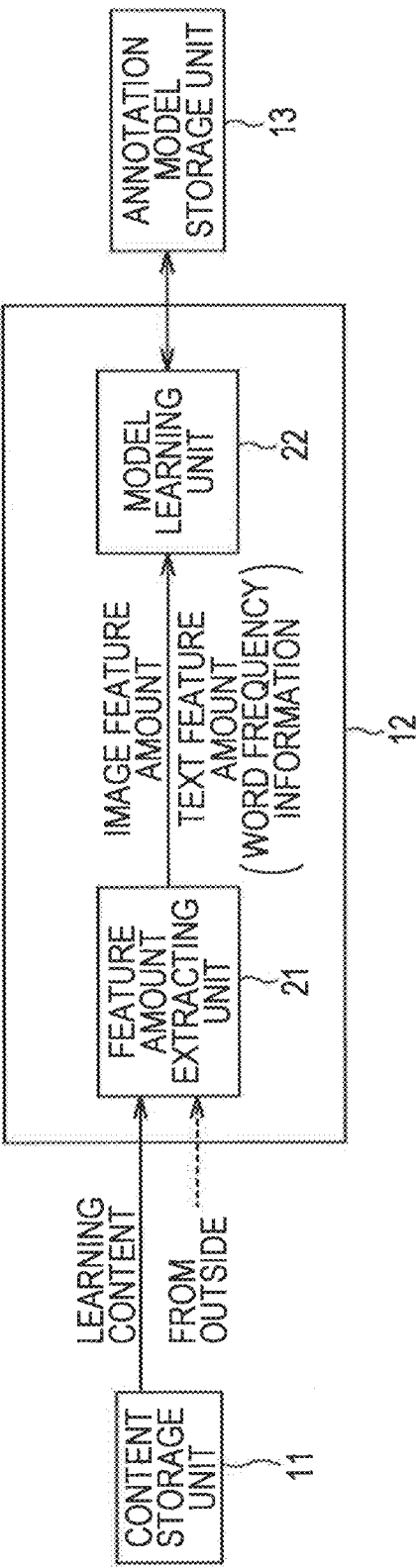
FIG. 2 is a block diagram illustrating a configuration example of a learning device 12.

FIG. 2 is a block diagram illustrating a configuration example of the learning device 12 in FIG. 1.

The learning device 12 includes a feature amount extracting unit 21 and a model learning unit 22.

The feature amount extracting unit 21 selects the content used for learning the annotation model as the learning content from among the content stored in the content storage unit 11 and obtains (reads) the same from the content storage unit 11.

Herein, the feature amount extracting unit 21 selects the content of which description text describing the content of the image of the content may be obtained such as the content including the text of the caption, for example, as the learning content from among the content stored in the content storage unit 11.

In addition to the text of the caption included in the content, meta data provided by a service provider of a paid service (hereinafter, also referred to as a program meta data service) to distribute the meta data such as a broadcast start time, a broadcast end time, a performer, and a summary of a content of a corner for each corner of the broadcast program after the broadcast program ends, a text describing the content and the like input by the user by operation of a keyboard and the like may be adopted as the description text.

Also, the feature amount extracting unit 21 selects one or more pieces of content belonging to a predetermined category as the learning content used for learning one annotation model, for example.

The content belonging to a predetermined category is intended to mean the content having a common content structure latent in the content such as the programs of a same genre, a serial, and the program broadcasted weekly, daily or periodically (so called a series of programs with a same title), for example.

As the genre, which becomes the category, although so-called general classification such as a sport program, a news program, and a music program may be adopted, for example, so-called fine classification such as a soccer game program and a baseball game program, for example, is desirable.

Also, soccer game programs may be classified into the content belonging to different categories according to channels (broadcast stations), for example.

Meanwhile, the category to be adopted as the category of the content is set in advance in the recorder in FIG. 1, for example.

Also, the category of the content stored in the content storage unit 11 may be recognized by the meta data such as the title and the genre of the program transmitted together with the program via television broadcast and the information of the program provided by a site on the Internet and the like, for example.

Herein, the learning device 12 learns the annotation model for each category. The annotation adding device 14, the frame searching device 15, and the display control device 16 in FIG. 1 also process the target content by using the annotation model of the same category as that of the target content. However, the description of the category is hereinafter appropriately omitted.

The feature amount extracting unit 21 extracts the image feature amount, which is the feature amount of each frame of the image included in the learning content from the content storage unit 11, and supplies the same to the model learning unit 22.

Herein, the feature amount extracting unit 21 sequentially sets the frame of the learning content as a frame of interest, for example, and divides the frame of interest into sub regions, which are a plurality of small regions.

Further, the feature amount extracting unit 21 extracts a sub region feature amount of each sub region, for example, and supplies a vector of which component is the sub region feature amount of the frame of interest to the model learning unit 22 as the image feature amount of the frame of interest.

As the sub region feature amount, a global feature amount of the sub region is obtained by using pixel values (for example, RGB components, YUV components and the like) of the sub region.

Herein, the global feature amount of the sub region is intended to mean the feature amount as a histogram, for example, calculated in an additive manner by using only the pixel values without using information of a position of a pixel, which composes the sub region.

The feature amount referred to as GIST may be adopted, for example, as the global feature amount. The GIST is described in detail, for example, in A. Torralba, K. Murphy, W. Freeman, and M. Rubin, "Context-based vision system for place and object recognition", IEEE Int. Conf. Computer Vision, vol. 1, no. 1, pp. 273-280, 2003.

Meanwhile, the global feature amount is not limited to the GIST. That is, it is only required that the global feature amount be the feature amount robust to a local change in vision such as a position, brightness, and a view point (such that the change is absorbed). Such feature amount includes HLCA (higher-order local auto correlation), LBP (local binary patterns), a color histogram and the like, for example.

The HLCA is described in detail in N. Otsu, T. Kurita, "A new scheme for practical flexible and intelligent vision systems", Proc. IAPR Workshop on Computer Vision, pp. 431-435, 1988, for example. The LBP is described in detail in Ojala T., Pietikainen M. & Maenpaa T., "Multiresolution gray-scale and rotation invariant texture classification with Local Binary Patterns", IEEE Transactions on Pattern Analysis and Machine Intelligence 24(7): 971-987, for example ("a" in Pietikainen and Maenpaa is exactly "a-umlaut").

The above-described image feature amount, which is the vector of which component is the sub region feature amount, is the feature amount robust to the local change (change occurring in the sub region) but discriminative to the change in arrangement of patterns as an entire frame (having a property of sharply discriminating the change).

According to such image feature amount, similarity of scenes (contents) between the frames may be appropriately judged. For example, it is sufficient that the "sky" is on an upper side of the frame, the "sea" is on the center thereof, and a "sand beach" is on a lower side of a screen in the scene of the "seashore", and positions of a human in the "sand beach" and cloud in the "sky" and the like have no relation with whether the scene is the "seashore" scene. The image feature amount, which is the vector of which component is the sub region feature amount, is suitable for judging the similarity of the scenes (classifying the scenes) from such a point of view and hereinafter also appropriately referred to as a scene feature amount.

The feature amount extracting unit 21 extracts the word frequency information regarding the frequency of the appearance of each word in the description text of the learning content as the text feature amount of the description text in addition to extracting the image feature amount (scene feature amount) of each frame of the image included in the learning content from the content storage unit 11 and supplies the same to the model learning unit 22.

Meanwhile, when the text of the caption is included in the learning content, the feature amount extracting unit 21 adopts the text of the caption as the description text.

When the description text is input from outside, that is, when the meta data of the program is provided from the service provider of the program meta data service or when the text describing the learning content is input by the user by the operation of the keyboard and the like, for example, the feature amount extracting unit 21 may adopt the meta data from the service provider and the text from the user as the description text.

In addition to this, the feature amount extracting unit 21 may perform speech recognition of the audio included in the learning content and adopt the text, which is a result of the speech recognition, as the description text.

Hereinafter, the text of the caption included in the content is adopted as the description text in order to simplify the description.

The model learning unit 22 makes the multi-stream including the image feature amount and the text feature amount of the learning content supplied from the feature amount extracting unit 21 the annotation sequence for annotation for adding the annotation to the content and learns the annotation model, which is the multi-stream HMM, by using the annotation sequence.

Then, the model learning unit 22 supplies the learned annotation model to the annotation model storage unit 13 for storage.

Herein, the HMM is defined by initial probability $\pi_i$ to be in a state $s_i$ at first, state transition probability $a_{ij}$ of state transition from the state $s_i$ to a state $s_j$, and output probability distribution $b_i(o)$ of observation (output) of a predetermined observation value o from the state $s_i$.

Although (distribution of) discrete values, which become the probabilities, is used as the output probability distribution $b_i(o)$ when the observation value o is the discrete value (multinomial distribution), a probability distribution function is used when the observed value o is a continuous value. Gaussian distribution defined by a mean value (mean vector) and variance (covariance matrix) and the like may be adopted, for example, as the probability distribution function.

It is possible to learn the HMM by a Baum-Welch re-estimation method, which is a parameter estimating method based on an EM (expextation maximization) algorithm, for example.

Meanwhile, in a case in which an ergodic HMM (HMM without limitation in state transition) is adopted as the annotation model, when the number of states of the HMM is large, convergence to a local minimum might occur such that appropriate parameters cannot be obtained depending on initial values of the parameters (the initial probability $\pi_i$, the state transition probability $a_{ij}$, and the output probability distribution $b_i(o)$) of the HMM.

Therefore, an assumption that "most natural phenomena, camera work, which creates a video content, and program composition may be represented by sparse binding such as a small world network" is adopted and the HMM of which state transition is limited to a sparse structure is adopted as the annotation model.

Herein, the sparse structure is a structure in which a state to which the state transition from a certain state is possible is extremely limited (state transition is sparse), unlike the ergodic HMM in which the state transition is dense such that the state transition is possible from a certain state to an optional state.

Meanwhile, herein, at least one state transition to another state is present and self transition is also present even in the sparse structure.

As described above, the model learning unit 22 learns the annotation model, which is the multi-stream HMM, by using the annotation sequence, which is the multi-stream including the image feature amount and the text feature amount of the learning content supplied from the feature amount extracting unit 21, by the Baum-Welch re-estimation method, for example.

The multi-stream, which is a plurality of sequences (streams) of the observation value, is observed in the multi-stream HMM.

Then, in the multi-stream HMM, it is possible to set, for each sequence (stream) (hereinafter also referred to as a component sequence), which composes the multi-stream, a weight (hereinafter, also referred to as a sequence weight), which is a degree of an effect of the component sequence on the multi-stream HMM.

As for the sequence weight, by setting a large sequence weight for the component sequence regarded as important at the time of the learning of the multi-stream HMM, it is possible to provide previous knowledge such that a result of the learning of the multi-stream HMM does not fall into a local solution.

Also, it is possible to obtain a recognition result, which is not (substantially) subjected to the effect of the component sequence, by setting a small sequence weight for the component sequence, which is not regarded as important, at the time of recognition by using the multi-stream HMM (when obtaining a maximum likelihood state sequence).

Meanwhile, the multi-stream HMM is described in detail in Satoshi Tamura, Koji Iwano, and Sadaoki Furui, "Multimodal speech recognition using optical-flow analysis" Acoustical Society of Japan, Annals of Autumn Meeting 2001, 1-1-14, pp. 27-28 (October 2001) and the like, for example.

In the above-described document, an example of usage of the multi-stream HMM in a field of audio-visual speech recognition is introduced. That is, it is described that, when an SN ratio (signal to noise ratio) of the audio is low, the sequence weight for the sequence of the audio feature amount is made low such that the effect of the image becomes larger than that of the audio to perform the learning and recognition.

The multi-stream HMM is different from the HMM in which a single sequence, which is not the multi-stream, is used in that output probability distribution $b_j(o_{[1]}, o_{[2]}, \ldots, o_{[M]})$ of an entire multi-stream is calculated in consideration of a sequence weight $W_m$ set in advance for output probability distribution $b_{[m]j}(o_{[m]})$ of each component sequence $o_{[m]}$, which composes the multi-stream, as represented by an equation (1).

[Equation 1]

$$b_j(o_{[1]}, o_{[2]}, \ldots, o_{[M]}) = \prod_{m=1}^{M} b_{[m]j}(o_{[m]})^{W_m}, \quad (1)$$

$$\text{where } W_m \geq 0, \sum_{m=1}^{M} W_m = 1$$

Herein, in the equation (1), M represents the number of component sequences $o_{[m]}$ (number of streams), which compose the multi-stream, and the sequence weight $W_m$ represents the sequence weight of an m-th component sequence $o_{[m]}$ of M component sequences, which compose the multi-stream.

In this case, the annotation sequence, which is the multi-stream, used for learning by the model learning unit 22 is composed of two component sequences, which are a sequence $o_{[1]}$ of the image feature amount and a sequence $o_{[2]}$ of the text feature amount.

In this case, 0.5 may be adopted as the sequence weights $W_1$ and $W_2$, for example.

For example, the vector of which component is the sub region feature amount is adopted as the image feature amount, which is the first component sequence $o_{[1]}$, and the frequency (the frequency itself or a value obtained by normalizing the frequency) of each word is adopted as the text feature amount, which is the second component sequence $o_{[2]}$.

In this case, the image feature amount, which is the first component sequence $o_{[1]}$, is the vector of the continuous values and Gaussian distribution $N(\mu_{[1]j}, \sigma^2_{[1]j})$ of which mean value (mean vector) is $\mu_{[1]j}$ and variance (covariance matrix) is $\sigma^2_{[1]j}$ is used, for example, as the output probability distribution (observation model) $b_{[1]j}(o_{[1]})$.

Also, the text feature amount, which is the second component sequence $o_{[2]}$, is the multinomial distribution of the frequency (the frequency itself or the value obtained by normalizing the frequency) of each word and the multinomial distribution is used as the output probability distribution $b_{[2]j}(o_{[2]})$.

In the learning of the multi-stream HMM by using the annotation sequence composed of the above-described two component sequences $o_{[1]}$ and $o_{[2]}$, that is, in the Baum-Welch re-estimation method, at an E (expextation) step, state probability $\gamma^h_{t,j}$ to be in a state j at a time t (t-th frame of the learning content (t-th frame from the start)) is obtained for a h-th learning content by using the initial probability $\pi_i$, the state transition probability $a_{ij}$, and output probability distribution $b_j(o_{[1]}, o_{[2]})$ obtained according to the equation (1) as in the case of the learning of the HMM in which the single sequence is used.

Also, at an M (maximization) step, the mean value $\mu_{[1]j}$ and the variance $\sigma^2_{[1]j}$ of the Gaussian distribution as the output probability distribution (observation model) $b_{[1]j}(o_{[1]})$ of the image feature amount are obtained according to an equation (2) by using the state probability $\gamma^{(h)}_{t,j}$ obtained at the E step as in the case of the learning of the HMM in which the single sequence is used.

[Equation 2]

$$\mu_{[1]j} = \frac{\sum_{h=1}^{H} \sum_{t=1}^{T} \gamma^{(h)}_{t,j} o^{(h)}_{[1]}(t)}{\sum_{h=1}^{H} \sum_{t=1}^{T} \gamma^{(h)}_{t,j}} \quad (2)$$

$$\sigma^2_{[1]j} = \frac{\sum_{h=1}^{H} \sum_{t=1}^{T} \gamma^{(h)}_{i,j} (\mu_{[1]j} - o^{(h)}_{[1]}(t))^2}{\sum_{h=1}^{H} \sum_{t=1}^{T} \gamma^{(h)}_{t,j}}$$

Herein, in the equation (2), H represents the number of pieces of learning content (number of pieces of content) and $o^{(h)}_{[1]}(t)$ represents the image feature amount of the t-th frame of the h-th learning content of H pieces of learning content.

Further, at the M step, the multinomial distribution as output probability distribution (discrete symbol observation model) $b_{[2]j}$ of each word of which frequency is represented by the text feature amount is obtained according to an equation (3) by using the state probability $\gamma^{(h)}_{t,j}$ obtained at the E step as in the case of the learning of the HMM including the multinomial distribution as the observation model (output probability distribution).

[Equation 3]

$$b_{[2]j} = \frac{\sum_{h=1}^{H}\sum_{t=1}^{T} \gamma_{t,j}^{(h)} o_{[2]}^{(h)}(t)}{\sum_{h=1}^{H}\sum_{t=1}^{T} \gamma_{t,j}^{(h)}} \quad (3)$$

Herein, in the equation (3), $o^{(h)}_{[2]}(t)$ represents the multinomial distribution of the frequency of each word, which is the text feature amount of the t-th frame of the h-th learning content of the H pieces of learning content, and $b_{[2]j}$ represents the multinomial distribution, which is the output probability distribution of observation of each word in the state $s_j$.

Meanwhile, when the multinomial distribution represents the distribution of K symbols and when one symbol out of the K symbols is observed at each time t, the multinomial distribution $o^{(h)}_{[2]}(t)$ is the multinomial distribution in which the distribution (probability) of one symbol observed at the time t is 1 and the distribution of all remaining symbols is 0.

[First Configuration Example of Feature Amount Extracting Unit 21]

Figure 3:
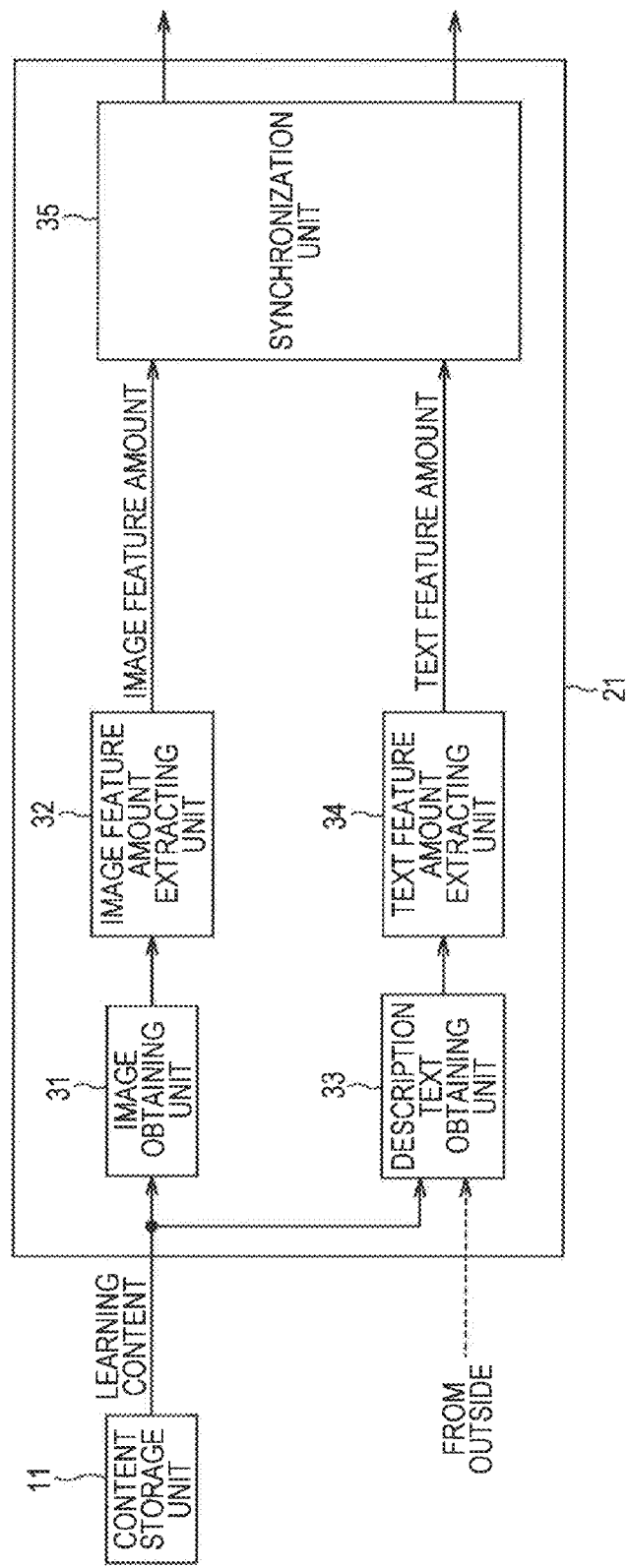
FIG. 3 is a block diagram illustrating a first configuration example of a feature amount extracting unit 21.

FIG. 3 is a block diagram illustrating a first configuration example of the feature amount extracting unit 21 in FIG. 2.

In FIG. 3, the feature amount extracting unit 21 includes an image obtaining unit 31, an image feature amount extracting unit 32, a description text obtaining unit 33, a text feature amount extracting unit 34, and a synchronization unit 35.

The image obtaining unit 31 selects to obtain the content of which description text may be obtained as the learning content from among the content stored in the content storage unit 11.

Further, the image obtaining unit 31 obtains the image from the learning content by inverse multiplexing (separating) and supplies the same to the image feature amount extracting unit 32.

The image feature amount extracting unit 32 selects each frame of the image from the image obtaining unit 31 as the frame of interest in order of time, extracts the scene feature amount, which is the image feature amount suitable for judging the similarity of the content (scene) of the frame, from the frame of interest, and supplies the same to the synchronization unit 35.

The description text obtaining unit 33 obtains the learning content the same as that obtained by the image obtaining unit 31 from the content storage unit 11, for example, and obtains the text of the caption from the learning content by the inverse multiplexing and supplies the same to the text feature amount extracting unit 34 as the description text.

Meanwhile, the description text obtaining unit 33 may obtain the meta data of the program from the service provider of the program meta data service or obtain the text input by the user by the operation of the keyboard and the like, the text as the speech recognition result obtained by performing the speech recognition of the audio included in the learning content and the like as the description text as described above in addition to the text of the caption included in the learning content.

The text feature amount extracting unit 34 extracts the words included in the text of the caption displayed in a window as one document while shifting the window having a predetermined time length of few seconds to several tens of seconds, for example, at regular intervals for the text of the caption as the description text from the description text obtaining unit 33.

Further, the text feature amount extracting unit 34 extracts the multinomial distribution representing the frequency of the appearance of each word in the document as the text feature amount from the document and supplies the same to the synchronization unit 35.

Herein, the multinomial distribution representing the frequency of the appearance of each word in the document is the word frequency information, that is, information regarding the frequency of the appearance of each word in the description text.

The synchronization unit 35 synchronizes the scene feature amount supplied from the image feature amount extracting unit 32 with the text feature amount supplied from the text feature amount extracting unit 34 in a unit of frame to output.

That is, although the scene feature amount is present in a unit of frame because this is obtained for each frame, the text feature amount is not necessarily present in a unit of frame because this is obtained for each document, that is, for each window shifted at regular intervals.

The synchronization unit 35 synchronizes the scene feature amount supplied from the image feature amount extracting unit 32 with the text feature amount supplied from the text feature amount extracting unit 34 such that a set of the scene feature amount extracted from a noted frame of interest and the text feature amount obtained from the window in a position temporally the closest to the frame of interest (extracted from the document) or the text feature amount obtained from the window in the position at a time after the frame of interest and the window in the position temporally the closest to the frame of interest, for example, becomes a set of the scene feature amount and the text feature amount of the frame of interest and outputs the same to the model learning unit 22 (FIG. 2).

[Extraction of Text Feature Amount]

Figure 4:
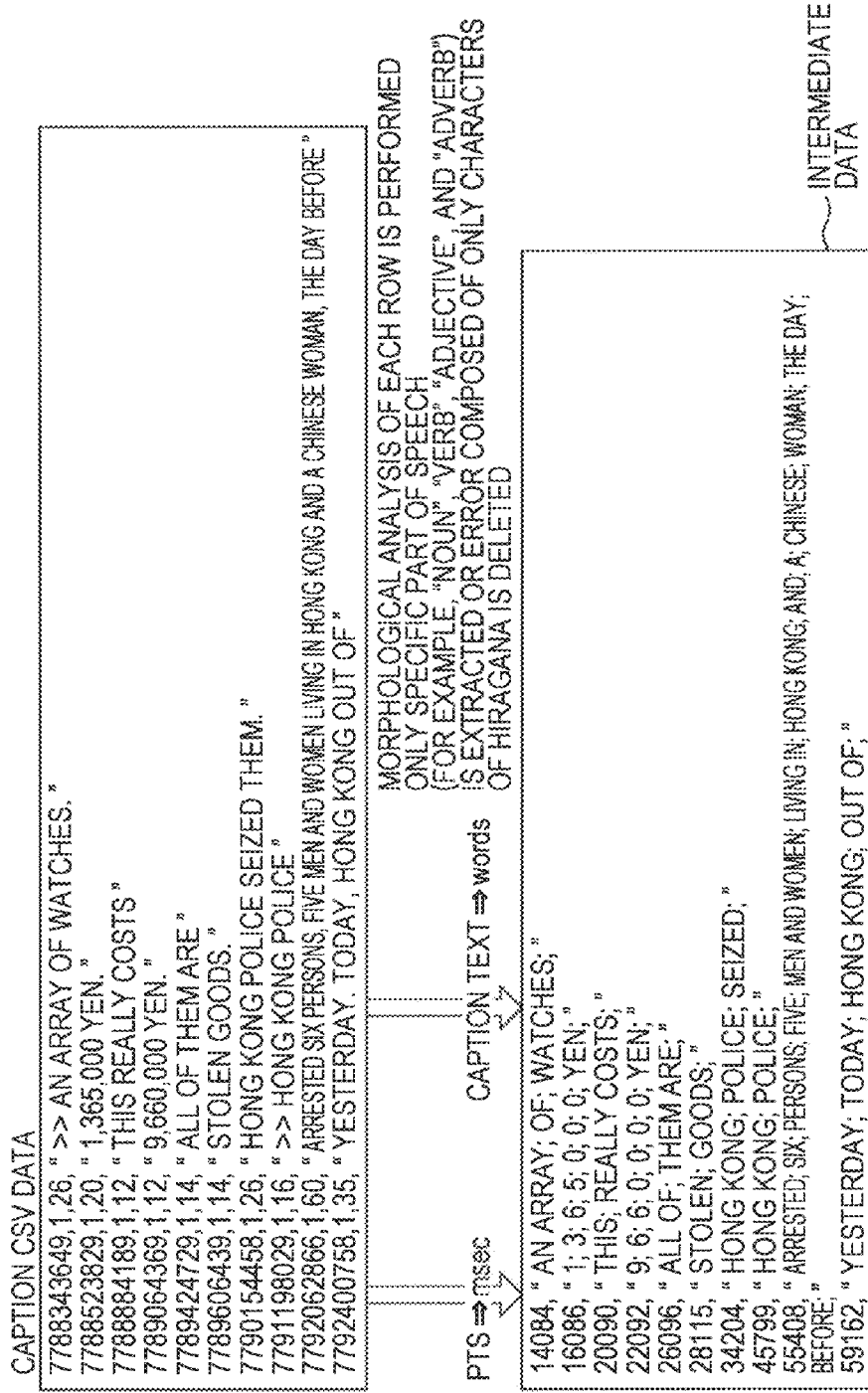
FIG. 4 is a view illustrating an example of caption CSV data and intermediate data.
Figure 5:
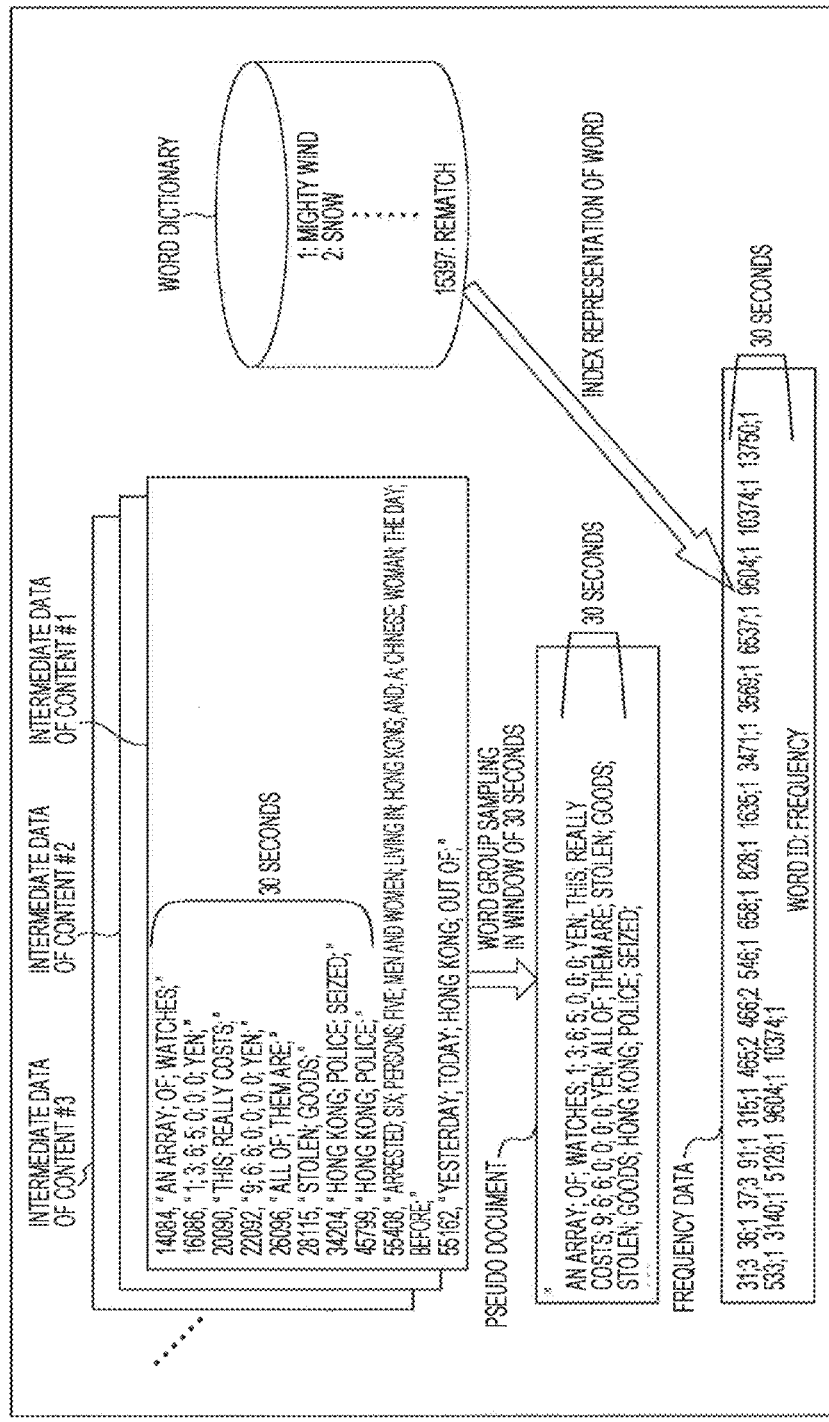
FIG. 5 is a view illustrating a method of converting the intermediate data to frequency data.
Figure 6:
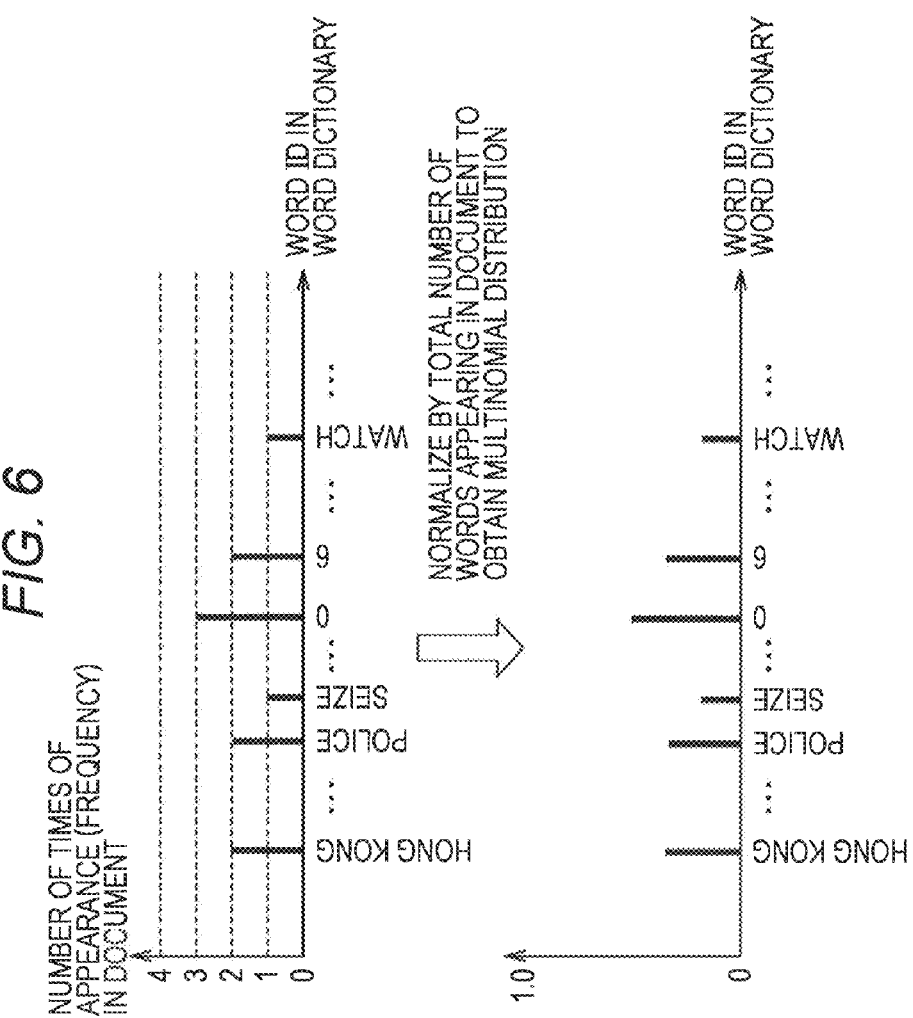
FIG. 6 is a view illustrating an example of a text feature amount.

FIGS. 4 to 6 are views illustrating extraction of the text feature amount by the text feature amount extracting unit 34 in FIG. 3.

That is, FIG. 4 is a view illustrating an example of caption CSV data and intermediate data.

The description text obtaining unit 33 (FIG. 3) obtains the caption data (caption stream) including the text of the caption as the description text from the learning content and supplies the same to the text feature amount extracting unit 34.

The text feature amount extracting unit 34 (FIG. 3) extracts a display start time of the caption and the text of the caption as the description text from the caption data.

Herein, the caption CSV data in FIG. 4 is data obtained by decoding the caption data included in the content in CSV (comma separated value) representation.

Data in a first column (first column from the left) of the caption CSV data is PTS (presentation time stamp) as the display start time of the caption and data in a fourth column is the text of the caption.

Meanwhile, the text of the caption in a certain row of the caption CSV data is displayed from the display start time of this row until just before the display start time of a next row.

The text feature extracting unit 34 converts the display start time represented by the PTS in the first column of the caption CSV data to the time represented in millisecond based on the start of the learning content, for example.

Further, the text feature extracting unit 34 segmentalizes the text of the caption into words (morphemes) by performing morphological analysis of the text of the caption in the fourth column of the caption CSV data and identifies a part of speech to which each word belongs.

Also, the text feature amount extracting unit 34 extracts the word useful for the annotation from the words obtained by the segmentalization of the text of the caption.

That is, the text feature amount extracting unit 34 extracts the words belonging to specific parts of speech such as a noun, a verb, an adjective, and an adverb, for example, as candidates for the useful word from the words obtained by the segmentalization of the text of the caption and deletes the word composed of one character of hiragana or the word composed of only the characters of hiragana, for example, from the candidates for the useful word.

Then, the text feature amount extracting unit 34 determines a remaining candidate for the useful word as the useful word and makes a set of the useful word and the display start time represented in millisecond as the intermediate data used for extracting the text feature amount.

Herein, according to an experiment in which actual data is used performed by the inventor of the present application, a result that a relatively appropriate word is added as the annotation may be obtained by extracting the words belonging to the parts of speech such as the noun and the verb as the candidates for the useful word and deleting the word composed of one character of hiragana, the word composed only of the characters of hiragana, and a number from the candidates for the useful word.

FIG. 5 is a view illustrating a method of converting the intermediate data to frequency data.

When the text feature amount extracting unit 34 obtains the intermediate data from the learning content, this converts the intermediate data to the frequency data.

That is, the text feature amount extracting unit 34 shifts the window (window function) having the time length of 30 seconds at an interval of 30 seconds, for example, in chronological order of the learning content. Then, the text feature amount extracting unit 34 extracts the words included in the text of the caption displayed in the window (within the time corresponding to the window) as one pseudo document (hereinafter, also referred to as the pseudo document) from the words included in the intermediate data of the learning content.

In this case, it is possible to obtain (the useful word out of) the words included in the text of the caption displayed within 30 seconds as the pseudo document for each 30 seconds for the learning content.

When there is a plurality of pieces of content as the learning content, the text feature amount extracting unit 34 obtains the pseudo document for each of the plurality of pieces of content.

Meanwhile, in the text feature amount extracting unit 34, the time length of the window used for extracting the pseudo document is not limited to 30 seconds.

Also, when the pseudo document is extracted, it is possible to shift the window such that a part thereof overlaps. For example, it is possible to realize the window shifted while overlapping by 15 seconds by shifting the window having the time length of 30 seconds at intervals of 15 seconds.

When the text feature amount extracting unit 34 obtains the pseudo documents for all pieces of the learning content, this lists the words from all of the pseudo documents such that there is no overlap and generates a word dictionary in which each word and word ID (identification) unique to the word are associated with each other to be registered.

Meanwhile, the word dictionary generated from the pseudo document may be generated also from the intermediate data of the learning content.

When the text feature amount extracting unit 34 generates the word dictionary, this obtains the frequency of the word appearing in the pseudo document for each pseudo document by referring to the word dictionary and generates the frequency data associated with the word ID of the word.

Herein, the word dictionary is supplied to the annotation model storage unit 13, for example, to be stored together with the annotation model obtained by the learning by using the learning content used or generating the word dictionary.

FIG. 6 is a view illustrating an example of the text feature amount.

The text feature amount extracting unit 34 converts the frequency data of the pseudo document to the frequency of each word registered in the word dictionary.

That is, when the total number of words registered in the word dictionary is K and when a K-dimensional vector of which k-th component is the frequency of a k-th word is set as a registered word frequency vector, the text feature amount extracting unit 34 converts the frequency data of the pseudo document to the registered word frequency vector.

Herein, there is a case in which the feature amount referred to as BoW (bag-of-words) is used as the feature amount of the document in natural language processing; the registered word frequency vector is equivalent to the feature amount referred to as the BoW.

The text feature amount extracting unit 34 divides each component of the registered word frequency vector obtained by converting the frequency data of the pseudo document by a sum of the frequencies, which are the components, and outputs the vector obtained as a result of the division to the synchronization unit 35 as the text feature amount.

The text feature amount of the pseudo document described above is the multinomial distribution representing the frequency (probability) of the appearance of each word registered in the word dictionary in the pseudo document.

[Learning Process]

Figure 7:
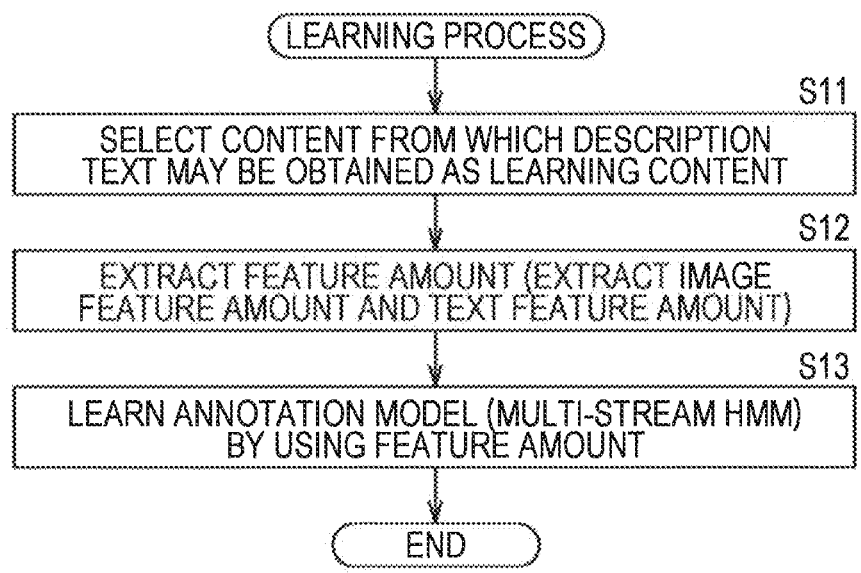
FIG. 7 is a flowchart illustrating a learning process in which the learning device 12 learns an annotation model.

FIG. 7 is a flowchart illustrating a learning process in which the learning device 12 in FIG. 2 learns the annotation model.

In the learning device 12 (FIG. 2), the feature amount extracting unit 21 selects the content of which description text describing the content of the image of the content, may be obtained such as the content including the text of the caption, for example, as the learning content from among the content stored in the content storage unit 11 at a step S11 and the process shifts to a step S12.

At the step S12, the feature amount extracting unit 12 extracts the scene feature amount as the image feature amount from each frame of the image included in the learning content from the content storage unit 11 and extracts the word frequency information regarding the frequency of the appearance of each word as the text feature amount from the caption text as the description text included in the learning content from the content storage unit 11.

Then, the feature amount extracting unit 12 synchronizes the scene feature amount with the text feature amount in a unit of frame and supplies the same to the model learning unit 22, and the process shifts from the step S12 to a step S13.

At the step S13, the model learning unit 22 learns the annotation model, which is the multi-stream HMM, by using the annotation sequence, which is the multi-stream including the image feature amount and the text feature amount of the learning content from the feature amount extracting unit 21.

Then, the model learning unit 22 supplies the learned annotation model to the annotation model storage unit 13 for storage and the learning process ends.

According to the above-described learning process, the structure of the content (for example, the program composition, the structure created, the camera work and the like)

latent in the learning content is obtained in a self-organizing manner in the annotation model, which is the multi-stream HMM.

As a result, each state of the multi-stream HMM as the annotation model obtained by the learning process corresponds to an element of the structure of the content obtained by the learning and the state transition represents temporal transition between the elements of the structure of the content (transition between the scenes).

Then, the state of the annotation model is such that a group of frames with a short spatial distance therebetween and similar temporal context (that is, "similar scenes") are collectively represented in the feature amount space (space defined by axes of the scene feature amount and the text feature amount extracted by the feature amount extracting unit 21 (FIG. 2)).

Therefore, according to the learning process, the feature amount space is state-divided.

Herein, when the content is a game show, for example, a basic flow of the program is roughly a flow of a question, presentation of a hint, answer by the performer, and announcement of a right answer, and the quiz show progresses by repeating the basing flow.

The above-described basic flow of the program corresponds to the structure of the content and each of the question, the presentation of the hint, the answer by the performer, and the announcement of the right answer, which compose the flow (structure), corresponds to the element of the structure of the content.

Also, for example, the progress from the question to the presentation of the hint and the like corresponds to the temporal transition between the elements of the structure of the content, for example.

Meanwhile, each state of the multi-stream HMM as the annotation model includes the observation model (output probability distribution) in which both of (modal of) the scene feature amount and (modal of) the text feature amount are observed in the state.

That is, each state of the annotation model includes the output probability distribution of the observation (output) of the scene feature amount of each value and the output probability distribution, which is the multinomial distribution representing the frequency (probability) of the observation of each word in the word dictionary.

The image from which the scene feature amount observed with high probability in each state of the annotation model is extracted and the word observed with high probability in the state tend to be observed at the same time, so that it may be said that the word observed with high probability in a certain state represents the content of the image (scene) from which the scene feature amount observed with high probability in the state is extracted.

Therefore, the word observed with high probability in each state of the annotation model may be used as the annotation of the image (frame) from which the scene feature amount observed with high probability in this state is extracted.

That is, according to the annotation model, the annotation may be easily added to the content.

[Configuration Example of Annotation Adding Device 14]

Figure 8:
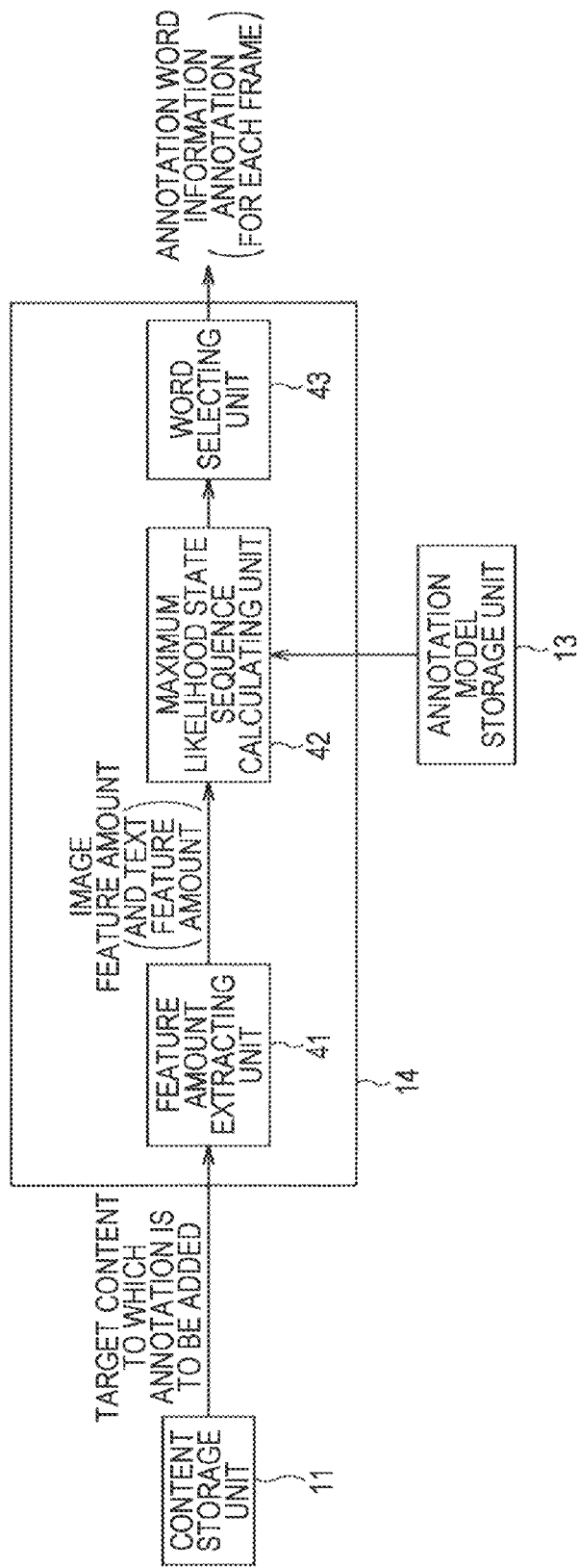
FIG. 8 is a block diagram illustrating a configuration example of an annotation adding device 14.

FIG. 8 is a block diagram illustrating a configuration example of the annotation adding device 14 in FIG. 1.

The annotation adding device 14 includes a feature amount extracting unit 41, a maximum likelihood state sequence calculating unit 42, and a word selecting unit 43.

The feature amount extracting unit 41 selects the target content to which the annotation is to be added from among the content stored in the content storage unit 11 and obtains (reads) the same from the content storage unit 11.

Herein, the feature amount extracting unit 41 selects the target content according to the operation by the user, for example. Also, the content, which is not yet selected as the target content (the content to which the annotation is not added) out of the content stored in the content storage unit 11, may be selected as the target content, for example.

The content selected as the target content from among the content stored in the content storage unit 11 may be the content of which description text may be obtained such as the learning content or the content of which description text cannot be obtained.

When the target content is the content of which description text may be obtained, that is, when the target content is the content including the text of the caption, for example, the feature amount extracting unit 41 extracts the scene feature amount as the image feature amount for each frame and the word frequency information as the text feature amount of the text of the caption as the description text from the target content as in the case of the feature amount extracting unit 21 of the learning device 12 (FIG. 2).

Further, the feature amount extracting unit 41 composes the multi-stream including the scene feature amount for each frame and the text feature amount as the annotation sequence and supplies the annotation sequence to the maximum likelihood state sequence calculating unit 42.

When the target content is the content of which description text cannot be obtained, the feature amount extracting unit 41 extracts the scene feature amount as the image feature amount for each frame from the target content as in the case of the feature amount extracting unit 21 of the learning device 12 (FIG. 2).

Further, the feature amount extracting unit 41 uses dummy data, which is the multinomial distribution of a predetermined value such as 0 and 1 (multinomial distribution of the same dimension as the text feature amount), as the text feature amount, for example, to compose the multi-stream including the scene feature amount for each frame and the text feature amount, which is the dummy data, as the annotation sequence and supplies the annotation sequence to the maximum likelihood state sequence calculating unit 42.

The maximum likelihood state sequence calculating unit 42 obtains the maximum likelihood state sequence in which the annotation sequence from the feature amount extracting unit 41 is observed (state sequence of the annotation model in which likelihood that the annotation sequence is observed is the highest) in the annotation model (multi-stream HMM) stored in the annotation model storage unit 13 according to the Viterbi algorithm, for example, and supplies the same to the word selecting unit 43.

The maximum likelihood state sequence represents that it is likely that the t-th frame of the target content is observed in (the state of the annotation model, which is in) a t-th state of the maximum likelihood state sequence.

Herein, in the annotation model, which is the multi-stream HMM, obtaining the maximum likelihood state sequence in which a certain sequence (time-series data) is observed corresponds to recognizing the sequence by using the multi-stream HMM (pattern recognition).

Also, the annotation sequence is composed of the scene feature amount in a unit of frame and the text feature amount of the target content, so that this is the sequence of sample values of the target content in a unit of frame, and each frame of the target content is associated with each state, which composes the maximum likelihood state sequence, by obtaining the maximum likelihood state sequence for such annotation sequence.

Therefore, according to the maximum likelihood state sequence, the t-th frame of the target content is associated with the t-th state of the maximum likelihood state sequence, so that it may be considered that the t-th frame of the target content is clustered to the t-th state of the maximum likelihood state sequence.

Meanwhile, when the text feature amount, which composes the annotation sequence, is the word frequency information, the maximum likelihood state sequence calculating unit 42 sets the sequence weight $W_m$ for the output probability distribution $b_j(o_{[1]}, o_{[2]}, \ldots, o_{[M]})$ of the annotation sequence, which is the multi-stream, calculated according to the equation (1) to a value equally distributed to each component sequence $o_{[m]}$, that is, 1/M, for example, when obtaining the maximum likelihood state sequence.

Therefore, when the annotation sequence is composed of two types (two modals), which are the component sequence $o_{[1]}$ of the scene feature amount and the component sequence $o_{[2]}$ of the text feature amount, both of the sequence weights $W_1$ and $W_2$ are set to 0.5.

Also, when the text feature amount, which composes the annotation sequence, is the dummy data, the maximum likelihood state sequence calculating unit 42 sets the sequence weight $W_m$ for the output probability distribution $b_j(o_{[1]}, o_{[2]}, \ldots, o_{[M]})$ of the annotation sequence, which is the multi-stream, calculated according to the equation (1) to 0 for the component sequence of the text feature amount and sets the same to 1/(M−1), for example, for another component sequence when obtaining the maximum likelihood state sequence.

Herein, although the sequence weight $W_m$ is set such that a sum of the sequence weight $W_m$ becomes 1 in the equation (1), the sequence weight $W_m$ may be set such that the sum becomes a value other than 1.

The word selecting unit 43 sequentially sets the frame of the target content as the frame of interest and selects the word with high frequency (word observed with high probability), that is, the word with the highest frequency and the word of which frequency is in the top R (>1), for example, in the output probability distribution, which is the multinomial distribution of the frequencies (output probabilities) of the words observed in a state corresponding to the frame of interest of the maximum likelihood state sequence from the maximum likelihood state sequence calculating unit 42, as (the word, which becomes) the annotation to be added to the frame of interest.

In the word selecting unit 43, the annotation is selected for the frame of interest, and according to this, the annotation is added to the frame of interest.

When the word selecting unit 43 adds the annotation to each frame of the target content, this outputs the annotation added to each frame of the target content as annotation word information.

The annotation word information output by the word selecting unit 43 is supplied to the content storage unit 11, for example, and is stored while being associated with the target content. The annotation word information stored in the content storage unit 11 may be used together with the frame of the target content for displaying the annotation added to the frame when the target content is reproduced, for example.

[Annotation Adding Process]

Figure 9:
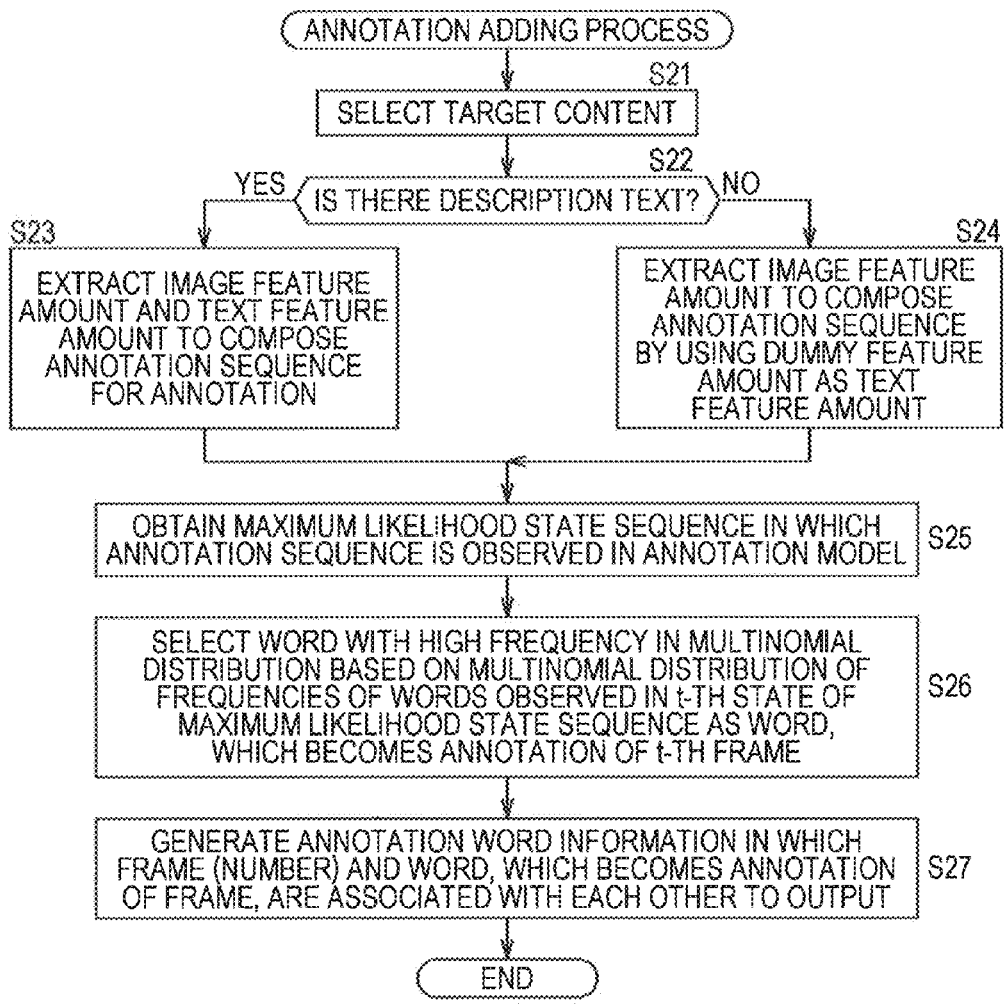
FIG. 9 is a flowchart illustrating an annotation adding process in which the annotation adding device 14 adds an annotation to target content.

FIG. 9 is a flowchart illustrating an annotation adding process in which the annotation adding device 14 in FIG. 8 adds the annotation to the target content.

At a step S21, the feature amount extracting unit 41 selects the target content to which the annotation is to be added from among the content stored in the content storage unit 11 and obtains the same from the content storage unit 11, and the process shifts to a step S22.

At the step S22, the feature amount extracting unit 41 judges whether the target content is the content of which description text may be obtained or the content of which description text cannot be obtained.

At the step S22, when it is judged that the target content is the content of which description text may be obtained, that is, when the target content is the content including the text of the caption, for example, the process shifts to a step S23 and the feature amount extracting unit 41 extracts the scene feature amount as the image feature amount for each frame and the word frequency information as the text feature amount of the text of the caption as the description text from the target content.

Further, the feature amount extracting unit 41 composes the multi-stream including the scene feature amount for each frame and the text feature amount as the annotation sequence and supplies the annotation sequence to the maximum likelihood state sequence calculating unit 42, and the process shifts from the step S23 to a step S25.

Also, at the step S22, when it is judged that the target content is the content of which description text cannot be obtained, that is, when the target content is the content, which does not include the text of the caption, for example, the process shifts to a step S24 and the feature amount extracting unit 41 extracts the scene feature amount as the image feature amount for each frame from the target content.

Further, the feature amount extracting unit 41 composes the multi-stream including the scene feature amount for each frame and the text feature amount, which is the dummy data, as the annotation sequence by using the dummy data as the text feature amount, for example, and supplies the annotation sequence to the maximum likelihood state sequence calculating unit 42, and the process shifts from the step S24 to the step S25.

At the step S25, the maximum likelihood state sequence calculating unit 42 obtains the annotation model of the same category as that of the target content (annotation model learned by using the learning content of the same category as that of the target content) from among the annotation models (multi-stream HMMs) stored in the annotation model storage unit 13.

Further, the maximum likelihood state sequence calculating unit 42 obtains the maximum likelihood state sequence in which the annotation sequence from the feature amount extracting unit 41 is observed in the annotation model obtained from the annotation model storage unit 13 and supplies the same to the word selecting unit 43, and the process shifts from the step S25 to a step S26.

At the step S26, the word selecting unit 43 sequentially sets the frame of the target content as the frame of interest and selects (the word, which becomes) the annotation to be added to the frame of interest based on the multinomial distribution of the frequencies of the words observed in the state corresponding to the frame of interest of the maximum likelihood state sequence from the maximum likelihood state sequence calculating unit 42.

That is, when the t-th frame of the target content is the frame of interest, the word selecting unit 43 selects the word with high frequency in the multinomial distribution of the frequencies of the words observed in the t-th state of the maximum likelihood state sequence as the annotation to be added to the t-th frame, and according to this, the annotation is added to the t-th frame.

Thereafter, when the annotation is added to all of the frames of the target content, the process shifts from the step S26 to a step S27 and the word selecting unit 43 associates the annotation added to each frame of the target content with a frame number (t of the t-th frame) of the frame and outputs the same as the annotation word information, and the annotation adding process ends.

As described above, the annotation adding device 14 extracts the image feature amount of each frame of the image of the target content, composes the annotation sequence by using the image feature amount, obtains the maximum likelihood state sequence in which the annotation sequence is observed in the annotation model, and selects the word with high frequency in the multinomial distribution observed in the state corresponding to the noted frame of interest out of the states of the maximum likelihood state sequence as the annotation to be added to the frame of interest, so that this may easily add the annotation to the target content.

Also, the annotation adding device 14 extracts the image feature amount of each frame of the image of the target content and the text feature amount of the description text when the description text of the target content may be obtained (when the description text is present) and composes the annotation sequence including the image feature amount and the text feature amount, and uses the dummy data as the text feature amount to compose the annotation sequence including the image feature amount and the text feature amount, which is the dummy data, when the description text of the target content cannot be obtained (when the description text is not present), so that this may add the annotation to (each frame of) the target content regardless of the presence of the description text.

That is, as for the target content including the text of the caption as the description text, for example, when the word, which appropriately represents the content of the target content, is observed with high probability in the annotation model even if this is the word, which does not appear in the text of the caption of the target content, the word is added to the target content as the annotation.

Also, for example, as for the target content, which does not include the text of the caption as the description text, the annotation is added even though the description text is not present.

[Configuration Example of Frame Searching Device 15]

Figure 10:
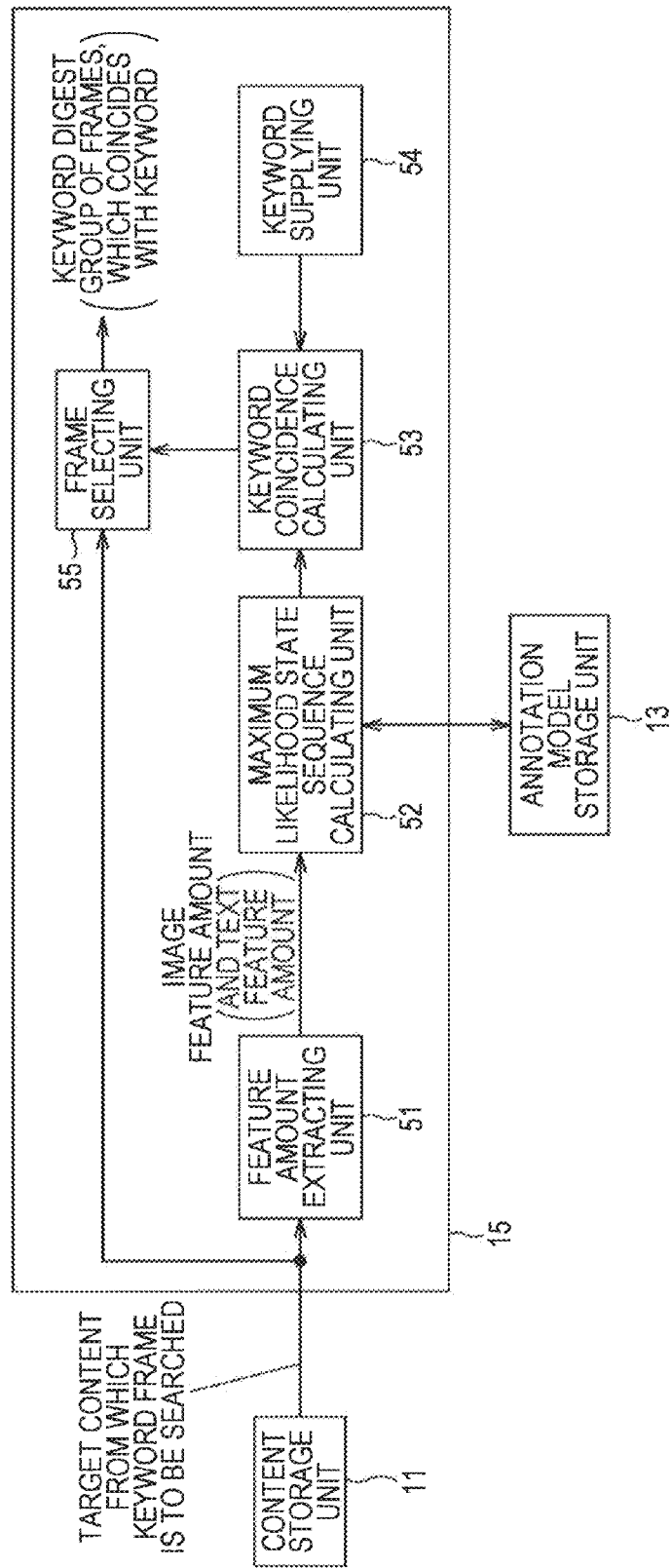
FIG. 10 is a block diagram illustrating a configuration example of a frame searching device 15.

FIG. 10 is a block diagram illustrating a configuration example of the frame searching device 15 in FIG. 1.

The frame searching device 15 includes a feature amount extracting unit 51, a maximum likelihood state sequence calculating unit 52, a keyword coincidence calculating unit 53, a keyword supplying unit 54, and a frame selecting unit 55.

The feature amount extracting unit 51 selects the target content from which the keyword frame, which is the frame of which content coincides with a predetermined keyword, is searched from among the content stored in the content storage unit 11 as in the case of the feature amount extracting unit 41 in FIG. 8, for example, and obtains (reads) the same from the content storage unit 11.

That is, the feature amount extracting unit 51 selects the target content according to the operation by the user, for example. Also, the feature amount extracting unit 51 selects the content, which is not yet selected as the target content out of the content stored in the content storage unit 11, for example, as the target content.

Meanwhile, the content selected as the target content from among the content stored in the content storage unit 11 may be the content of which description text may be obtained as the learning content or the content of which description text cannot be obtained.

When the target content is the content of which description text may be obtained, that is, when the target content is the content including the text of the caption, for example, the feature amount extracting unit 51 extracts the scene feature amount as the image feature amount for each frame and the word frequency information as the text feature amount of the text of the caption as the description text from the target content as in the case of the feature amount extracting unit 41 in FIG. 8.

Further, the feature amount extracting unit 51 composes the multi-stream including the scene feature amount for each frame and the text feature amount as the annotation sequence and supplies the annotation sequence to the maximum likelihood state sequence calculating unit 52.

Also, when the target content is the content of which description text cannot be obtained, the feature amount extracting unit 51 extracts the scene feature amount as the image feature amount for each frame from the target content and uses the dummy data as the text feature amount to compose the multi-stream including the scene feature amount for each frame and the text feature amount, which is the dummy data, as the annotation sequence as in the case of the feature amount extracting unit 41 in FIG. 8.

Then, the feature amount extracting unit 51 supplies the annotation sequence composed of the scene feature amount for each frame and the text feature amount, which is the dummy data, to the maximum likelihood state sequence calculating unit 52.

The maximum likelihood state sequence calculating unit 52 obtains the maximum likelihood state sequence in which the annotation sequence from the feature amount extracting unit 51 is observed in the annotation model (multi-stream HMM) stored in the annotation model storage unit 13 and supplies the same to the keyword coincidence calculating unit 53 as in the case of the maximum likelihood state sequence calculating unit 42 in FIG. 8.

A predetermined word (group) is supplied from the keyword supplying unit 54 to the keyword coincidence calculating unit 53 as the keyword in addition to the maximum likelihood state sequence regarding the target content supplied from the maximum likelihood state sequence 52.

The keyword coincidence calculating unit 53 sequentially sets the frame of the target content as the frame of interest and calculates a probability (frequency) with which the keyword from the keyword supplying unit 54 is observed in the multinomial distribution of the frequencies of the words observed in the state corresponding to the frame of interest, that is, in the output probability distribution in the state corresponding to the frame of interest of the maximum likelihood state sequence from the maximum likelihood state sequence calculating unit 52 as a keyword coincidence of the content of the frame of interest with the keyword and supplies the same to the frame selecting unit 55.

The keyword supplying unit 54 sets the word input by the user by the operation of the keyboard and the like, for example, as the keyword for searching the frame from the target content and supplies a search query, which requires searching, including the keyword to the keyword coincidence calculating unit 53.

The frame selecting unit 55 obtains the target content from the content storage unit 11 and selects the keyword frame, which coincides with the keyword (search query), from the target content based on the keyword coincidence from the keyword coincidence selecting unit 53.

That is, the frame selecting unit 55 selects the frame of which keyword coincidence from the keyword coincidence selecting unit 53 is higher than a predetermined threshold (hereinafter, also referred to as a search threshold) as the keyword frame from the target content, for example.

Then, the frame selecting unit 55 outputs a sequence of the keyword frames selected from the target content in chronological order as a keyword digest, which is a digest of the target content.

Meanwhile, the search threshold may be set in advance or set according to the operation by the user, for example.

The keyword digest output by the frame selecting unit 55 is reproduced according to the operation by the user, for example. In this case, the user may watch only the scene of which content is represented by the keyword out of the target content as the digest.

Herein, it is also possible to reproduce the keyword digest in order of sequence (in chronological order) of the frames, which compose the keyword digest, or in descending order of the keyword coincidence.

[Frame Searching Process]

Figure 11:
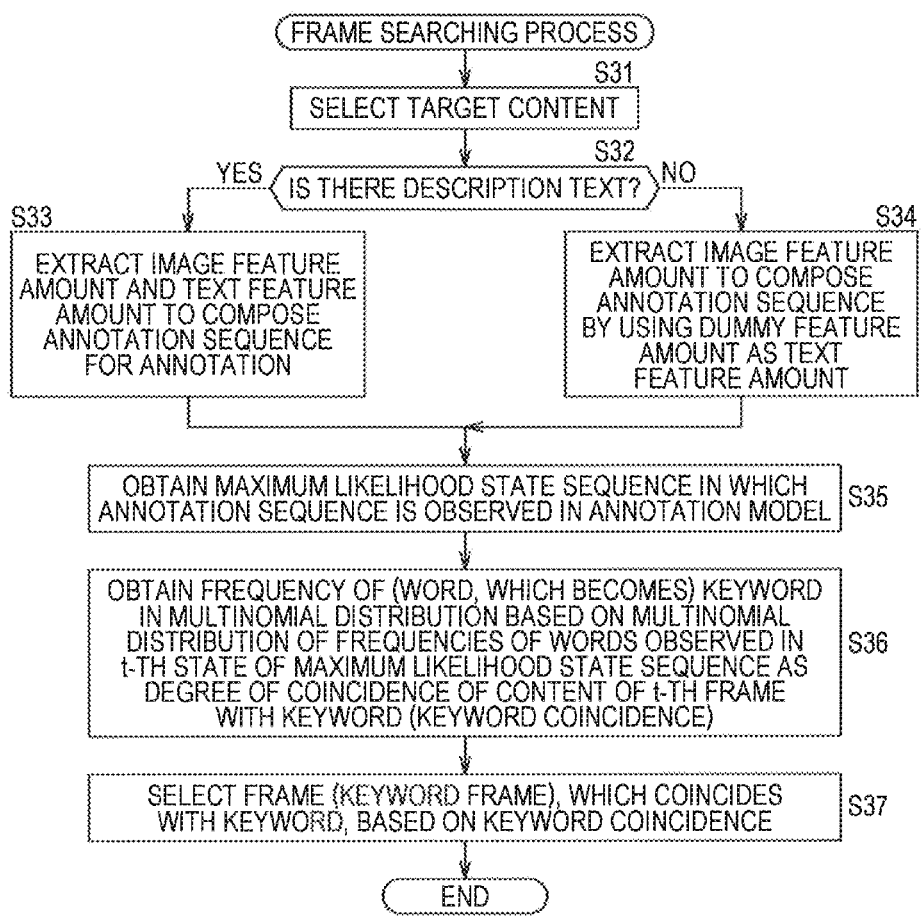
FIG. 11 is a flowchart illustrating a frame searching process in which the frame searching device 15 searches a keyword frame from the target content to generate a keyword digest.

FIG. 11 is a flowchart illustrating a frame searching process in which the frame searching device 15 in FIG. 10 searches the keyword frame from the target content to generate the keyword digest.

The keyword supplying unit 55 supplies the search query including the keyword to the keyword coincidence calculating unit 53 according to the operation by the user, for example.

Also, at steps S31 to S35, the processes similar to those at the steps S21 to S25 in FIG. 9 are performed.

That is, at the step S31, the feature amount extracting unit 51 selects the target content to which the annotation is to be added from among the content stored in the content storage unit 11 and obtains the same from the content storage unit 11, and the process shifts to the step S32.

At the step S32, the feature amount extracting unit 51 judges whether the target content is the content of which description text may be obtained or the content of which description text cannot be obtained.

At the step S32, when it is judged that the target content is the content of which description text may be obtained, the process shifts to the step S33 and the feature amount extracting unit 51 extracts the scene feature amount as the image feature amount for each frame and the word frequency information as the text feature amount of the description text from the target content.

Further, the feature amount extracting unit 51 composes the multi-stream including the scene feature amount for each frame and the text feature amount as the annotation sequence and supplies the annotation sequence to the maximum likelihood state sequence calculating unit 52, and the process shifts from the step S33 to the step S35.

Also, at the step S32, when it is judged that the target content is the content of which description text cannot be obtained, the process shifts to the step S34 and the feature amount extracting unit 51 extracts the scene feature amount as the image feature amount for each frame from the target content.

Further, the feature amount extracting unit 51 composes the multi-stream including the scene feature amount for each frame and the text feature amount, which is the dummy data, as the annotation sequence by using the dummy data as the text feature amount, for example, and supplies the annotation sequence to the maximum likelihood state sequence calculating unit 52, and the process shifts from the step S34 to the step S35.

At the step S35, the maximum likelihood state sequence calculating unit 52 obtains the annotation model of the same category as that of the target content from among the annotation models stored in the annotation model storage unit 13.

Further, the maximum likelihood state sequence calculating unit 52 obtains the maximum likelihood state sequence in which the annotation sequence from the feature amount extracting unit 51 is observed in the annotation model obtained from the annotation model storage unit 13 and supplies the same to the keyword coincidence calculating unit 53, and the process shifts from the step S35 to a step S36.

At the step S36, the keyword coincidence calculating unit 53 sequentially sets the frame of the target content as the frame of interest and obtains the keyword coincidence of the frame of interest based on the multinomial distribution of the frequencies of the words observed in the state corresponding to the frame of interest of the maximum likelihood state sequence from the maximum likelihood state sequence calculating unit 52.

That is, when the t-th frame of the target content is the frame of interest, the keyword coincidence calculating unit 53 obtains the frequency of the keyword (probability of observation of the keyword) included in the search query from the keyword supplying unit 54 in the multinomial distribution of the frequencies of the words observed in the t-th state of the maximum likelihood state sequence as the keyword coincidence of the t-frame.

When the keyword coincidence calculating unit 53 obtains the keyword coincidence for all of the frames of the target content, this supplies the keyword coincidence to the frame selecting unit 55 and the process shifts from the step S36 to a step S37.

At the step S37, the frame selecting unit 55 obtains the target content from the content storage unit 11 and selects the keyword frame, which coincides with the keyword (search query), from the target content based on the keyword coincidence from the keyword coincidence selecting unit 53.

That is, the frame selecting unit 55 selects the frames of which keyword coincidence from the keyword coincidence selecting unit 53 is higher than the search threshold as the keyword frames from the target content, for example, and outputs the sequence of the keyword frames in chronological order as the keyword digest, and ends the frame searching process.

As described above, the frame searching device 15 extracts the image feature amount of each frame of the image of the target content, composes the annotation sequence by using the image feature amount, obtains the maximum likelihood state sequence in which the annotation sequence is observed in the annotation model, and selects the frame of interest as the keyword frame when the frequency of the keyword is higher than the search threshold in the multinomial distribution of the words observed in the state corresponding to the noted frame of interest out of the states of the maximum likelihood state sequence, so that it is possible to provide an application, which utilizes the annotation model to reproduce the keyword digest only of such keyword frames.

Meanwhile, as the annotation adding device 14, the frame searching device 15 also extracts the image feature amount of each frame of the image of the target content and the text feature amount of the description text and composes the annotation sequence including the image feature amount and the text feature amount when the description text of the target content may be obtained, and composes the annotation sequence including the image feature amount and the text feature amount, which is the dummy data, by using the dummy data as the text feature amount when the description text of the target content cannot be obtained, so that this may generate the keyword digest from the target content regardless of the presence of the description text.

Herein, although the frame selecting unit 55 searches (selects) the frame, which coincides with the keyword (frame of which keyword coincidence is higher than the search threshold), from the target content as the keyword frame by setting such that only one keyword is included in the search query in FIGS. 10 and 11, it is also possible that the search query includes a search formula including a plurality of keywords to search the frame, which coincides with the search formula, from the target content as the keyword frame.

FIGS. 12 to 14 are views illustrating a method of searching the frame, which coincides with the search formula including a plurality of keywords, as the keyword frame.

For example, it is supposed that the search query including a search formula (KW#1 AND KW#2) OR (KW#3 AND KW#4) composed of four keywords KW#1, KW#2, KW#3, and KW#4 is supplied from the keyword supplying unit 54 to the keyword coincidence calculating unit 53.

Herein, an AND search formula KW#1 AND KW#2 represents coincidence with both of the keywords KW#1 and KW#2 and an OR search formula KW#1 OR KW#2 represents the coincidence with the keyword KW#1 or KW#2. In the search formula (KW#1 AND KW#2) OR (KW#3 AND KW#4), parentheses ( ) represent that the search formula in the parentheses ( ) is preferentially processed.

For the search query including the search formula (KW#1 AND KW#2) OR (KW#3 AND KW#4), the keyword coincidence calculating unit 53 obtains the keyword coincidence of each frame of the target content for each of the keywords KW#1, KW#2, KW#3, and KW#4 included in the search query.

FIG. 12 is a view illustrating an example of the keyword coincidence of each frame of the target content obtained for each of the keywords KW#1, KW#2, KW#3, and KW#4.

In FIG. 12, the keyword coincidences of t-th, (t+1)-th, (t+2)-th, (t+3)-th, (t+4)-th, and (t+5)-th frames of the target content to the keyword KW#1 are 100, 150, 20, 0, 0, and 0, respectively.

Also, the keyword coincidences of the t-th to (t+5)-th frames of the target content to the keyword KW#2 are 50, 200, 30, 0, 0, and 0, respectively.

Further, the keyword coincidences of the t-th to (t+5)-th frames of the target content to the keyword KW#3 are 0, 0, 0, 150, 40, and 200, respectively, and the keyword coincidences of the t-th to (t+5)-th frames of the target content to the keyword KW#4 are 0, 0, 0, 200, 100, and 50, respectively.

When the keyword coincidence calculating unit 53 obtains the keyword coincidence with each of the keywords KW#1 to KW#4, this performs numerical min operation of the keyword coincidences for the AND search formula of the search query and performs numerical max operation of keyword coincidences for the OR search formula of the search query, thereby obtaining the keyword coincidence with (the search formula of) the search query.

FIG. 13 is a view illustrating the numerical min operation as operation of the AND search formula.

The keyword coincidence calculating unit 53 obtains the keyword coincidence with the AND search formula KW#1 AND KW#2 and the keyword coincidence with the AND search formula KW#3 AND KW#4 by performing the numerical min operation of the keyword coincidences according to each of the AND search formula KW#1 AND KW#2 and the AND search formula KW#3 AND KW#4 of the search formula (KW#1 AND KW#2) OR (KW#3 AND KW#4).

That is, the keyword coincidence calculating unit 53 selects the keyword coincidence of which value is smaller out of the keyword coincidence with the keyword KW#1 and the keyword coincidence with the keyword KW#2 as the keyword coincidence with the AND search formula KW#1 AND KW#2 for each frame of the target content according to the AND search formula KW#1 AND KW#2.

Similarly, the keyword coincidence calculating unit 53 selects the keyword coincidence of which value is smaller out of the keyword coincidence with the keyword KW#3 and the keyword coincidence with the keyword KW#4 as the keyword coincidence with the AND search formula KW#3 AND KW#4 for each frame of the target content according to the AND search formula KW#3 AND KW#4.

As a result, as illustrated in FIG. 13, the keyword coincidences with the AND search formula KW#1 AND KW#2 of the t-th to (t+5)-th frames are 100, 150, 100, 0, 0, and 0, respectively, and the keyword coincidences with the AND search formula KW#3 AND KW#4 are 0, 0, 0, 150, 40, and 50, respectively.

Thereafter, the keyword coincidence calculating unit 53 performs the numerical max operation of the keyword coincidences according to the OR search formula of the search formula (KW#1 AND KW#2) OR (KW#3 AND KW#4), thereby obtaining the keyword coincidence with the OR search formula.

FIG. 14 is a view illustrating the numerical max operation as the operation of the OR search formula.

The keyword coincidence calculating unit 53 selects the keyword coincidence of which value is larger out of the keyword coincidence with the AND search formula KW#1 AND KW#2 and the keyword coincidence with the AND search formula KW#3 AND KW#4 as the keyword coincidence with the OR search formula (KW#1 AND KW#2) OR (KW#3 AND KW#4) for each frame of the target content according to the OR search formula (KW#1 AND KW#2) OR (KW#3 AND KW#4).

As a result, as illustrated in FIG. 14, the keyword coincidence with the OR search formula (KW#1 AND KW#2) OR (KW#3 AND KW#4) of the t-th to (t+5)-th frames, that is, the keyword coincidences with the search formula (KW#1 AND KW#2) OR (KW#3 AND KW#4) of the search query are 100, 150, 100, 150, 40, and 50, respectively.

When the keyword coincidence calculating unit 53 obtains the keyword coincidences with (the search formula (KW#1 AND KW#2) OR (KW#3 AND KW#4) of) the search query in the above-described manner, this supplies the keyword coincidence with the search query to the frame selecting unit 55 (FIG. 10).

The frame selecting unit 55 selects the frame of which keyword coincidence with the search query from the keyword coincidence calculating unit 53 is higher than the search threshold from the target content as the keyword frame, which coincides with the search query.

For example, if it is supposed that the search threshold is set to 90, in FIG. 14, the t-th to (t+3)-th frames of which keyword coincidence with the search query is higher than the search threshold out of the t-th to (t+5)-th frames are selected as the keyword frames.

[Configuration Example of Display Control Device 16]

Figure 15:
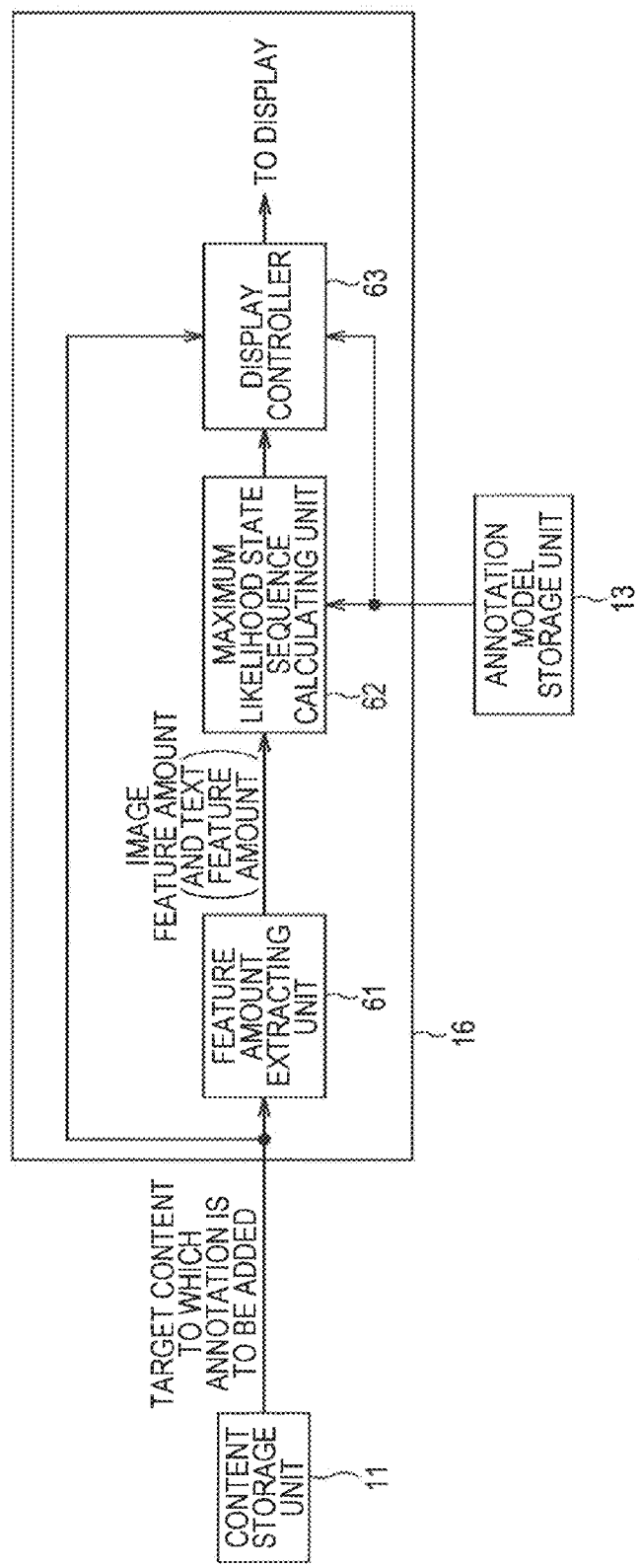
FIG. 15 is a block diagram illustrating a configuration example of a display control device 16.

FIG. 15 is a block diagram illustrating a configuration example of the display control device 16 in FIG. 1.

The display control device 16 includes a feature amount extracting unit 61, a maximum likelihood state sequence calculating unit 62, and a display controller 63.

The feature amount extracting unit 61 selects the target content to which the annotation is to be added from among the content stored in the content storage unit 11 according to the operation by the user, for example, and obtains (reads) the same from the content storage unit 11.

Then, the feature amount extracting unit 61 extracts the scene feature amount as the image feature amount from the target content and composes the annotation sequence by using the scene feature amount to supply to the maximum likelihood state sequence calculating unit 62 as in the case of the feature amount extracting unit 41 in FIG. 8.

That is, when the target content is the content of which description text may be obtained, the feature amount extracting unit 61 extracts the scene feature amount as the image feature amount for each frame and the word frequency information as the text feature amount of the description text from the target content.

Further, the feature amount extracting unit 61 composes the multi-stream including the scene feature amount for each frame and the text feature amount as the annotation sequence and supplies the annotation sequence to the maximum likelihood state sequence calculating unit 62.

Also, when the target content is the content of which description text cannot be obtained, the feature amount extracting unit 61 extracts the scene feature amount as the image feature amount for each frame from the target content and composes the multi-stream including the scene feature amount for each frame and the text feature amount, which is the dummy data, as the annotation sequence by using the dummy data as the text feature amount.

Then, the feature amount extracting unit 61 supplies the annotation sequence composed of the scene feature amount for each frame and the text feature amount, which is the dummy data, to the maximum likelihood state sequence calculating unit 62.

The maximum likelihood state sequence calculating unit 62 obtains the maximum likelihood state sequence in which the annotation sequence from the feature amount extracting unit 61 is observed in the annotation model (multi-stream HMM) stored in the annotation model storage unit 13 and supplies the same to the display controller 63 as in the case of the maximum likelihood state sequence calculating unit 42 in FIG. 8.

The display controller 63 obtains the annotation to be added to the frame of the target content (selects the word, which becomes the annotation) by using the maximum likelihood state sequence from the maximum likelihood state sequence calculating unit 62 as in the case of the word selecting unit 43 in FIG. 8, for example, and displays the same on a display not illustrated.

That is, the display controller 63 sequentially sets the frame of the target content as the frame of interest and selects the word with high frequency (word observed with high probability) in the output probability distribution, which is the multinomial distribution of the frequencies (output probabilities) of the words observed in the state corresponding to the frame of interest of the maximum likelihood state sequence from the maximum likelihood state sequence calculating unit 62, as (the word, which becomes) the annotation to be added to the frame of interest, thereby adding the annotation to the frame of interest.

Then, the display controller 63 displays the annotation added to each frame of the target content on the display for each state of the annotation model, for example.

Herein, the annotation is added to the frames corresponding to a certain state $s_i$ of the frames of the target content (all of the frames corresponding to the state $s_i$ when the state $s_i$ of the annotation model is present in the states, which compose the maximum likelihood state sequence) based on the output probability distribution of the state $s_i$, so that the same word is added as the annotation.

Therefore, since the annotation is added to the frame in a unit of the state of the annotation model (since the same annotation is added to the frame corresponding to the same state $s_i$), the display controller 63 may display the annotation added to each frame of the target content on the display for each state of the annotation model.

There is a method of using a model map, for example, as a method of displaying the annotation added to each frame of the target content for each state of the annotation model.

The model map is a map on which the state of the annotation model is arranged and the display controller 63 obtains a state coordinate, which is a coordinate of a position of the state on the model map, and draws the model map on which the corresponding state is arranged in the position of the state coordinate.

Figure 16:
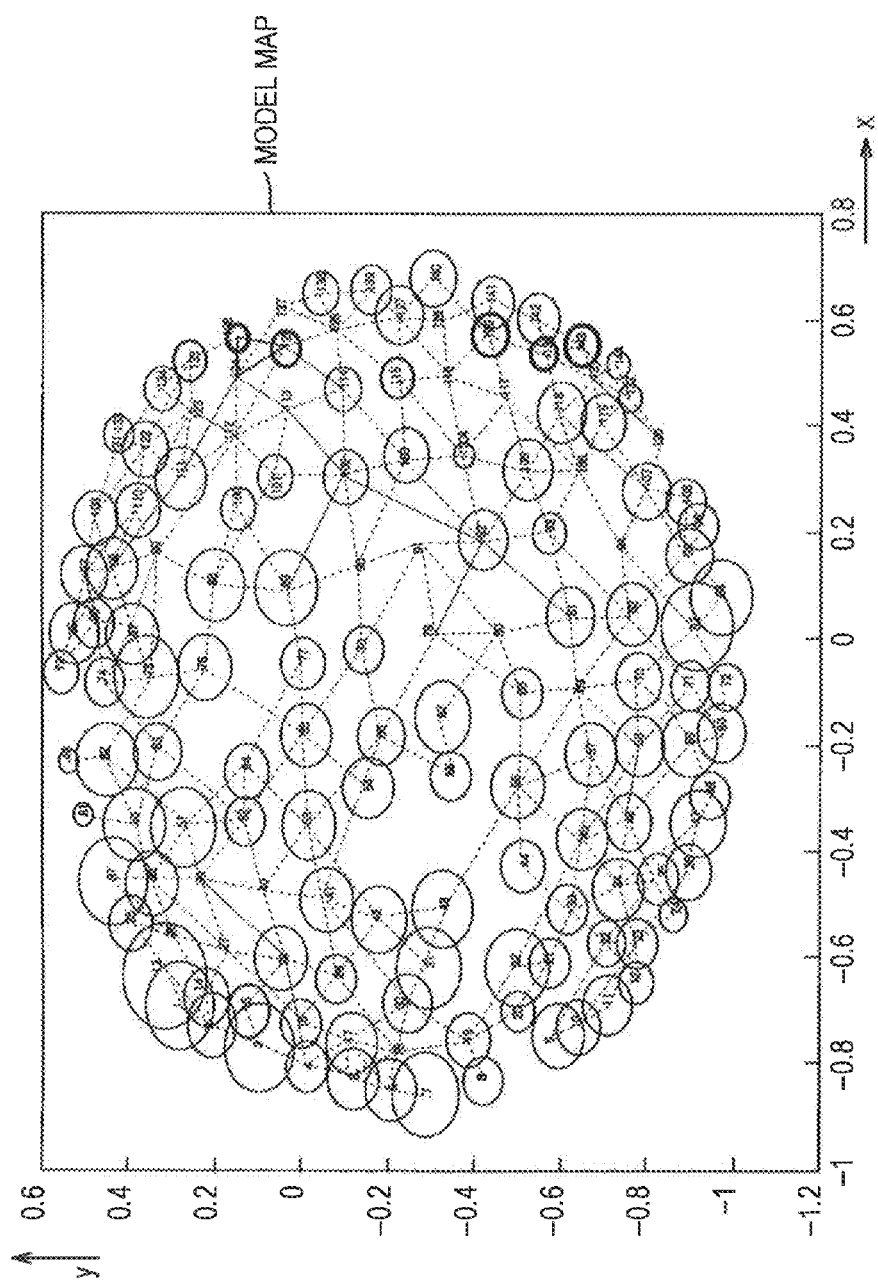
FIG. 16 is a view illustrating an example of a model map drawn by a display controller 63.

FIG. 16 is a view illustrating an example of the model map drawn by the display controller 63.

Herein, in the annotation model, a state at the time t (t-th state from the start, which composes the maximum likelihood state sequence) based on the start of the maximum likelihood state sequence in which the annotation sequence obtained from the target content is observed (hereinafter, also referred to as the maximum likelihood state sequence of the annotation model for the target content) is represented as s(t) and the number of frames of the target content is represented as T.

In this case, the maximum likelihood state sequence of the annotation model for the target content is the sequence of T states s(1), S(2), . . . , s(T) and the t-th state (state at the time t) s(t) corresponds to the frame at the time t (frame t) of the target content.

Also, when the total number of the states of the annotation model is represented as N, the state s(t) at the time t is any one of N states $s_1, s_2, \ldots, s_N$, which compose the annotation model.

When the state s(t) at the time t of the maximum likelihood state sequence of the annotation model for the target content is an i-th state $s_i$ of the N states $s_1$ to $s_N$, the frame at the time t corresponds to the state $s_i$.

Therefore, the maximum likelihood state sequence is obtained, and according to this, each frame of the target content is associated with any one of the N states $s_1$ to $s_N$ of the annotation model.

A substance of the maximum likelihood state sequence of the annotation model for the target content is a sequence of state ID of any state of the N states $s_1$ to $s_N$ to which the frame at each time t of the target content corresponds.

The display controller 63 (FIG. 15) obtains an inter-state distance $d_{ij}^*$ from one state $s_i$ to another state $s_j$ of the annotation model stored in the annotation model storage unit 13 (annotation model used for obtaining the maximum likelihood state sequence) based on state transition probability $a_{ij}$ from one state $s_i$ to another state $s_j$.

Herein, for example, the display controller 63 sets the inter-state distance $d_{ij}^*$ to 0.1 (small value), for example, when the state transition probability $a_{ij}$ is larger than a predetermined threshold (for example, $(1/N) \times 10^{-2}$)), and sets the inter-state distance $d_{ij}^*$ to 1.0 (large value), for example, when the state transition probability $a_{ij}$ is not larger than a predetermined threshold.

When the display controller 63 obtains the inter-state distance $d_{ij}{}^*$ from an optional state $s_i$ to an optional state $s_j$ of the N states of the annotation model, this obtains a state coordinate $Y_i$ by using a matrix with N rows and N columns (inter-state distance matrix) having the inter-state distance $d_{ij}{}^*$ as a component.

That is, the display controller 63 obtains the state coordinate $Y_i$, which is the coordinate of the position of the state $s_i$ on the model map, such that an error between a Euclidean distance $d_{ij}$ from one state $s_i$ to another state $s_j$ on the model map, which is the map on which the N states $s_1$ to $s_N$ of the annotation model are arranged, and the inter-state distance $d_{ij}{}^*$ of the inter-state distance matrix becomes small.

Specifically, for example, the display controller 63 obtains the state coordinate $Y_i$ such that an error function E of a Sammon Map proportional to a statistical error between the Euclidian distance $d_{ij}$ and the inter-state distance $d_{ij}{}^*$ is minimized.

Herein, the Sammon Map is one of multidimensional scaling methods and this is described in detail in J. W. Sammon, JR., "A Nonlinear Mapping for Data Structure Analysis", IEEE Transactions on Computers, vol. C-18, No. 5, May 1969, for example.

In the Sammon Map, the state coordinate $Y_i = (x_i, y_i)$ (x coordinate and y coordinate) on the model map, which is a two-dimensional map, for example, is obtained such that the error function E in an equation (4) is minimized, for example.

[Equation 4]

$$E = \frac{1}{\sum_{i<j}[dij^*]} \sum_{i<j}^{N} \frac{[dij^* - dij]^2}{dij^*} \quad (4)$$

Herein, in the equation (4), N represents the total number of the states of the annotation model and i and j represent the state IDs to specify the states which takes integer values from 1 to N.

$d_{ij}{}^*$ represents a component in i-th row j-th column of the inter-state distance matrix and represents the inter-state distance from the state $s_i$ to the state $s_j$. $d_{ij}$ represents the Euclidean distance between the coordinate (state coordinate) $Y_i$ of the position of the state $s_i$ and the coordinate $Y_j$ of the position of the state $s_j$ on the model map.

The display controller 63 obtains the state coordinate $Y_i$ (i=1, 2, ..., N) by repetitive application of a gradient method so as to minimize the error function E in the equation (4).

Then, the display controller 63 draws (graphics of) the model map on which (the image of) the corresponding state $s_i$ is arranged in the position of the state coordinate $Y_i$. Also, the display controller 63 draws a line segment, which connects the states on the model map according to the state transition probability between the states.

Further, the display controller 63 arranges a representative image representing the frame corresponding to the state $s_i$ and the annotation added to the frame corresponding to the state $s_i$ in the position of the state $s_i$ on the model map and displays the same on the display.

Meanwhile, the display controller 63 obtains the target content from the content storage unit 11 and generates a thumbnail and the like obtained by reducing a size of the frame of which display time (reproduction time) is the earliest out of the frames corresponding to the state $s_i$ of the target content (the frame closer to the start of the content) as the representative image of the frames corresponding to the state $s_i$.

Herein, as the representative image of the frames corresponding to the state $s_i$, the thumbnail of a moving image such as animation GIF in which a plurality of frames at the start are used, for example, may be adopted in addition to the thumbnail of a still image in which only the frame of which display time is the earliest (start frame) out of the frames corresponding to the state $s_i$ is used.

FIG. 16 is a display example of only the model map displayed by the display controller 63 (display example of the model map on which the representative image and the annotation are not arranged).

On the model map in FIG. 16, an ellipse represents the state and the line segment (dotted line), which connects the ellipses, represents the state transition. Also, the number assigned to the ellipse represents the state ID of the state represented by the ellipse.

The display controller 63 draws (the graphics of) the model map on which (the image (the ellipse in FIG. 16) of) the corresponding state $s_i$ is arranged in the position of the state coordinate $Y_i$ obtained as described above.

Further, the display controller 63 draws the line segment, which connects the states on the model map according to the state transition probability between the states. That is, the display controller 63 draws the line segment, which connects the states $s_i$ and $s_j$, when the state transition probability from the state $s_i$ to another state $s_j$ on the model map is larger than a predetermined threshold.

Herein, on the model map, the state and the like may be drawn in an emphasized manner.

That is, on the model map in FIG. 16, although the state $s_i$ is drawn with the ellipse (including a circle) and the like, the ellipse and the like representing the state $s_i$ may be drawn with different radii and colors according to a maximum value and the like of output probability distribution $b_i(o)$ of the state $s_i$, for example.

Also, the line segment, which connects the states on the model map according to the state transition probability between the states, may be drawn with different widths and colors of the line segment according to magnitude of the state transition probability.

When the display controller 63 in FIG. 15 obtains the state coordinate $Y_i$ on the model map so as to minimize the error function E by adopting the error function E in the equation (4) as is, (the ellipses representing) the states are arranged in a circular manner on the model map as illustrated in FIG. 16.

In this case, the states are concentrated in the vicinity (on an outer side) (on an outer edge) of a circumference of the circular model map and it becomes hard to see the arrangement of the states, therefore so-called visibility might be damaged.

Therefore, the display controller 63 in FIG. 15 may correct the error function E in the equation (4) and obtain the state coordinate $Y_i$ on the model map so as to minimize the corrected error function E.

That is, the display controller 63 judges whether the Euclidean distance $d_{ij}$ is larger than a predetermined threshold THd (for example, THd=1.0 and the like).

When the Euclidean distance $d_{ij}$ is not larger than the predetermined threshold THd, the display controller 63 uses the Euclidean distance $d_{ij}$ as is as the Euclidean distance $d_{ij}$ when calculating the error function in the equation (4).

On the other hand, when the Euclidean distance $d_{ij}$ is larger than the predetermined threshold THd, the display controller 63 uses the inter-state distance $d_{ij}{}^*$ as the Euclidean distance $d_{ij}$ ($d_{ij}=d_{ij}*$) when calculating the error function in the equation (4) (the Euclidean distance $d_{ij}$ is made the distance equal to the inter-state distance $d_{ij}*$).

In this case, on the model map, when two states $s_i$ and $s_j$ between which the Euclidean distance $d_{ij}$ is relatively short (not larger than the threshold THd) are noted, the state coordinates $Y_i$ and $Y_j$ are changed such that the Euclidean distance $d_{ij}$ and the inter-state distance $d_{ij}*$ conform to each other (such that the Euclidean distance $d_{ij}$ approximates the inter-state distance $d_{ij}*$).

On the other hand, on the model map, when the two states $s_i$ and $s_j$ the Euclidean distance $d_{ij}$ between which is relatively large (larger than the threshold THd) are noted, the state coordinates $Y_i$ and $Y_j$ are not changed.

As a result, the Euclidean distance $d_{ij}$ between the two states $s_i$ and $s_j$ between which the Euclidean distance $d_{ij}$ is relatively large is left unchanged, so that it is possible to prevent visibility from being damaged by the states concentrated in the vicinity of the circumference (outer edge) of the model map as illustrated in FIG. 16.

Figure 17:
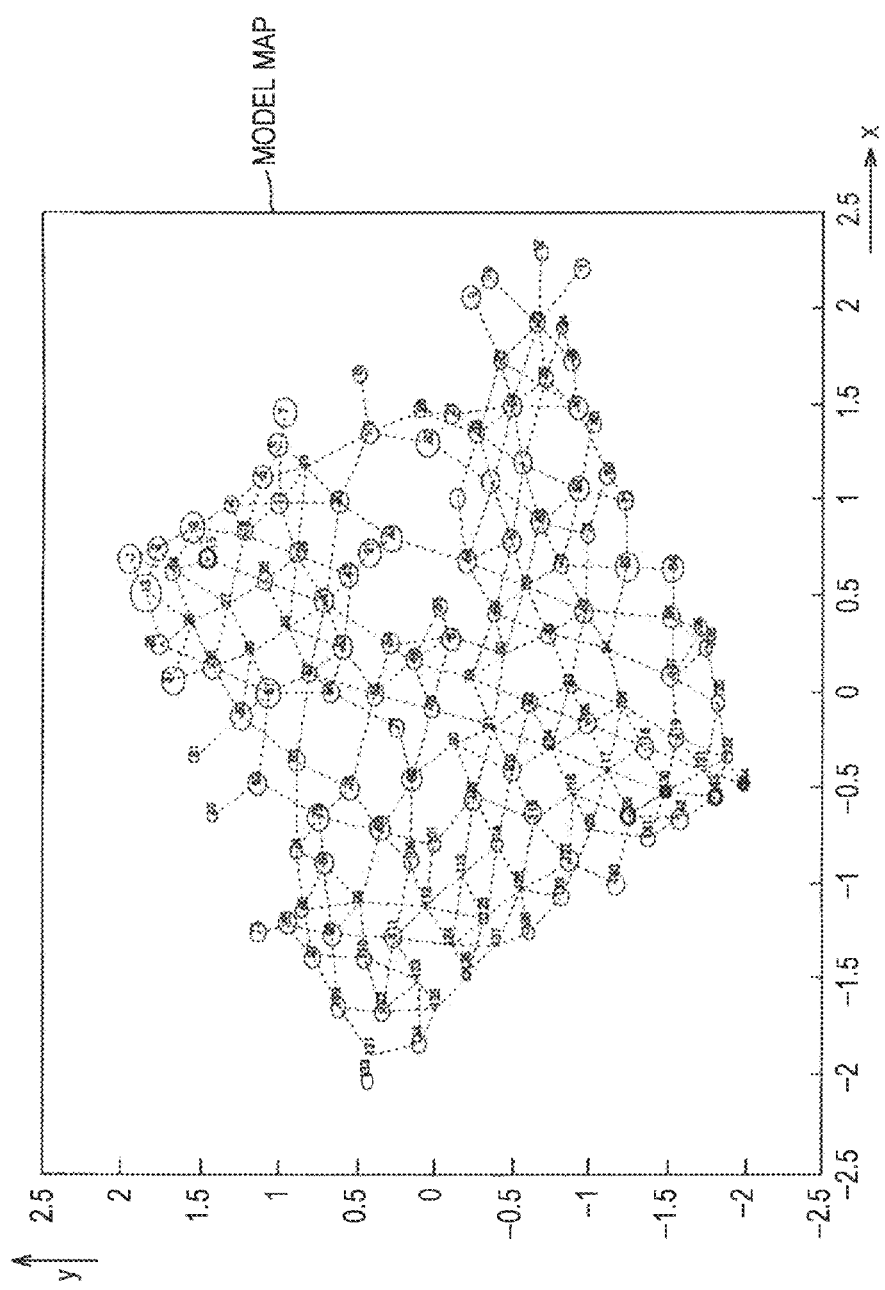
FIG. 17 is a view illustrating a display example of the model map obtained by using a corrected error function E.

FIG. 17 is a view illustrating a display example of the model map obtained by using the corrected error function E.

According to the model map in FIG. 17, it may be confirmed that the states are not concentrated in the vicinity of the circumference.

Figure 18:
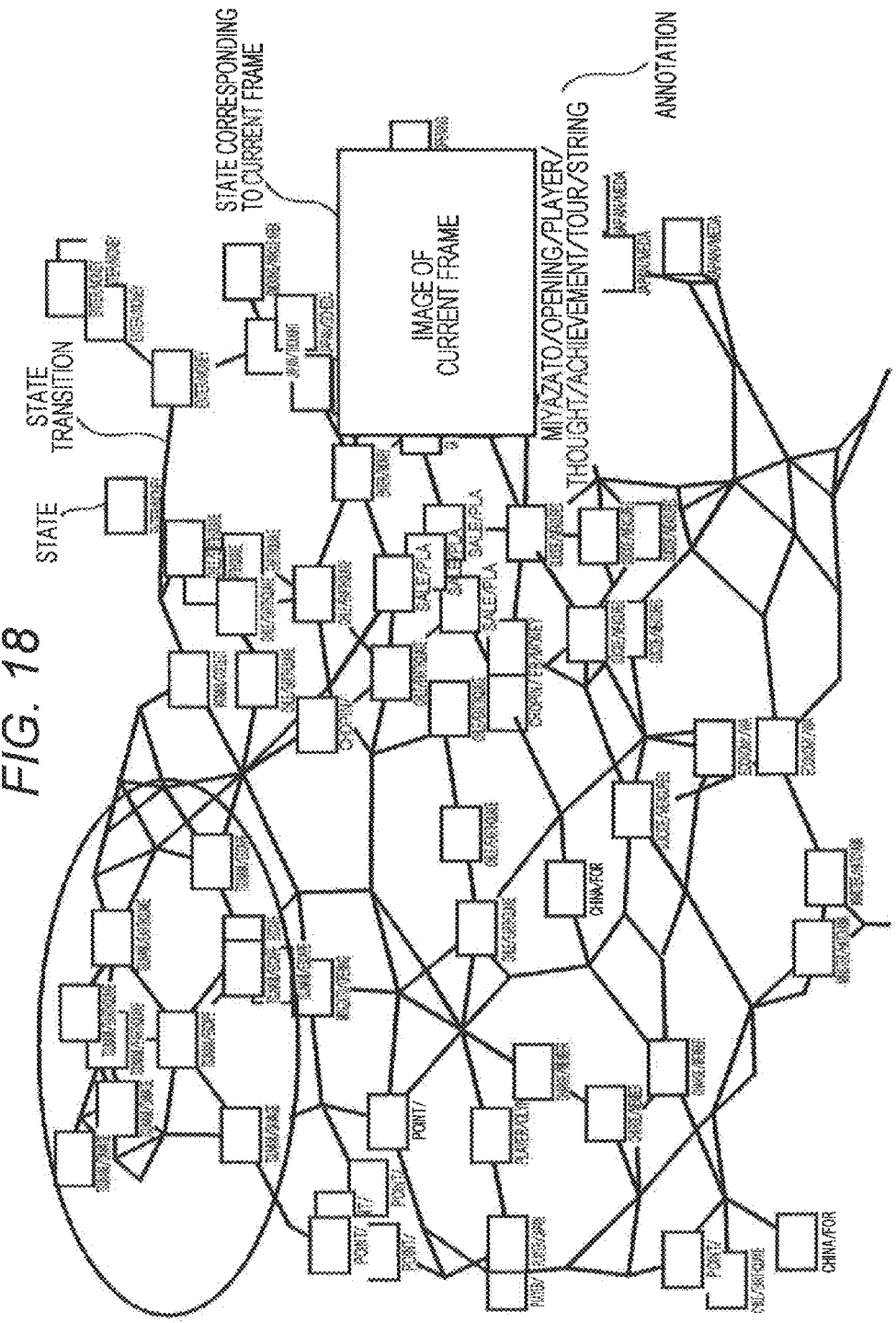
FIG. 18 is a view illustrating the display example of the model map on which a representative image and the annotation are arranged displayed by the display controller 63.
Figure 19:
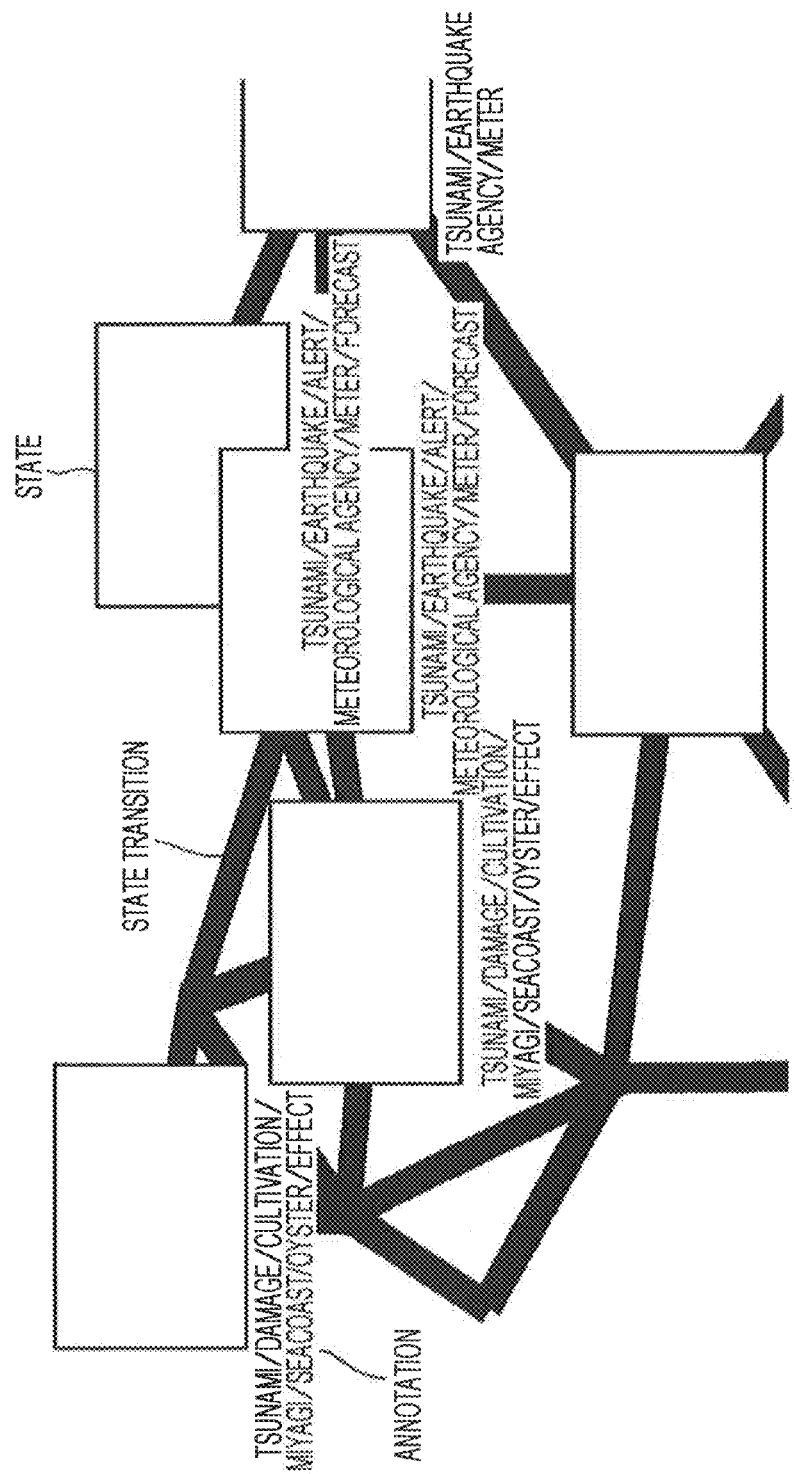
FIG. 19 is a partially enlarged view of the model map.

FIGS. 18 and 19 are views illustrating a display example of the model map on which the representative image and the annotation are arranged displayed by the display controller 63.

Meanwhile, FIG. 19 is an enlarged view in which a part enclosed by a bold ellipse in FIG. 18 is enlarged.

In FIGS. 18 and 19, the state $s_i$ is drawn in a rectangular shape.

However, on the model map in FIGS. 18 and 19, only the state the corresponding frame (frame of the target content) of which is present is drawn in the rectangular shape out of the states of the annotation model, and the state the corresponding frame of which is not present is not drawn (drawn as an intersection of the line segments representing the state transitions).

Also, in the rectangle representing the state in which the corresponding frame is present, the representative image of the frame corresponding to the state is displayed (arranged) and the word as the annotation added to the frame corresponding to the state is displayed on a lower part thereof.

The display controller 63 may display the model map on which the representative image and the annotation are arranged as illustrated in FIGS. 18 and 19 for the target content by setting the content of which reproduction is required by the user as the target content, for example.

Further, the display controller 63 may display the image of the reproduced frame so as to be larger than the representative image in place of the representative image for the state corresponding to the frame currently represented (hereinafter, also referred to as a reproduced frame).

The display controller 63 may also display the annotation so as to be larger than that in other states for the state corresponding to the reproduced frame.

Further, when the representative image is specified by the user, the display controller 63 may perform reproduction control of the target content so as to start reproducing from the frame of which display time is the earliest, for example, out of the frames corresponding to the state in which the representative image is displayed.

Herein, the annotation added to the frame corresponding to the state of the annotation model is also referred to as the annotation of the state and the representative image of the frame corresponding to the state of the annotation model is also referred to as the representative image of the state.

As described above, by displaying the annotation and the representative image of the state for each state of the annotation model for the target content, the user may easily search (a group of) the frame(s) of an interesting content by referring to the annotation and the representative image and may reproduce from the frame.

Therefore, it is possible to provide the application, which utilizes the annotation that the user looks at the annotation of the state and specifies the frame from which the reproduction is started.

[Display Control Process]

Figure 20:
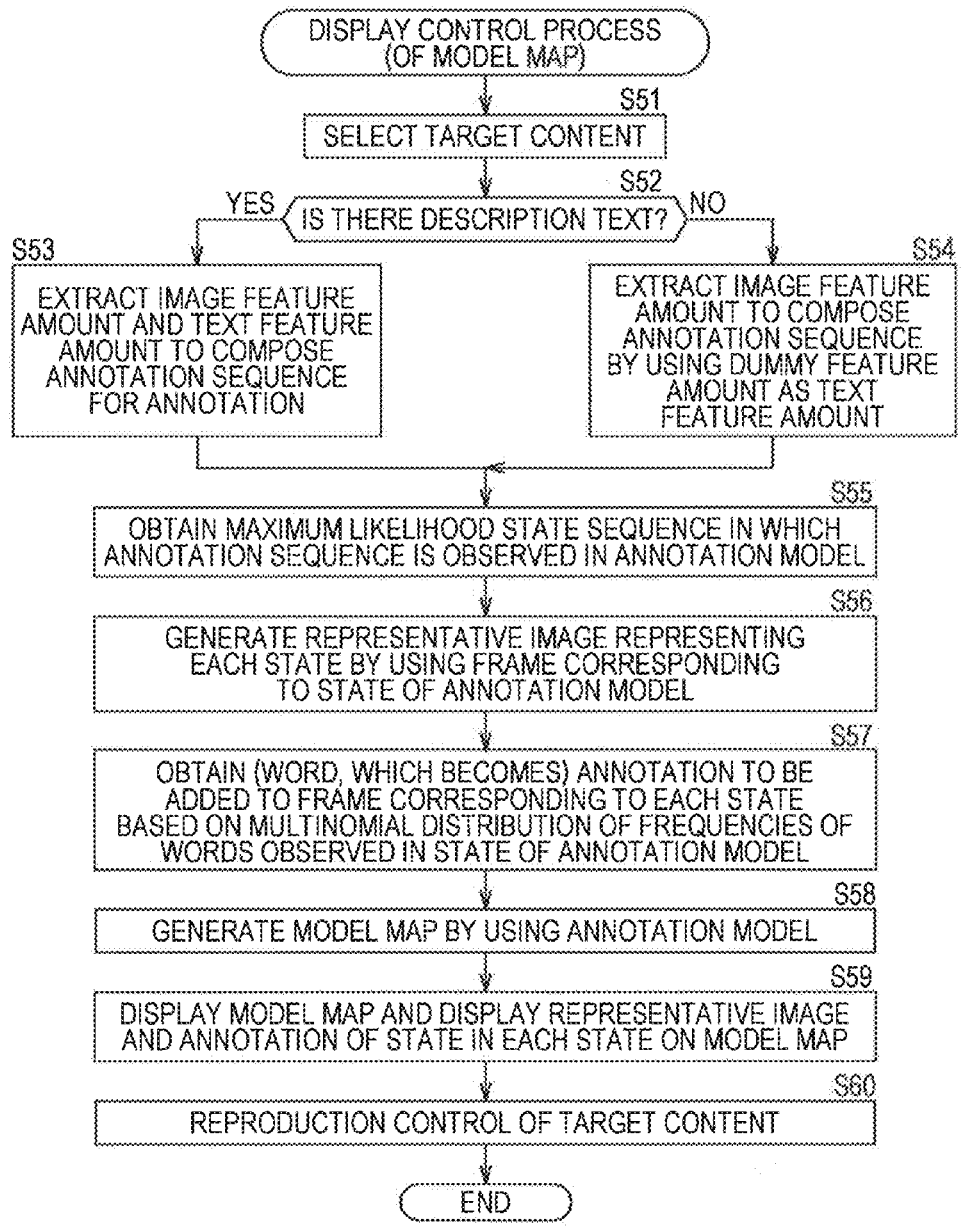
FIG. 20 is a flowchart illustrating a display control process in which the display control device 16 displays the model map.

FIG. 20 is a flowchart illustrating a display control process in which the display control device 16 in FIG. 15 displays the model map.

At steps S51 to S55, the display control device 16 performs the processes similar to those at the steps S21 to S25 in FIG. 9.

That is, at the step S51, the feature amount extracting unit 61 selects the content of which reproduction is instructed according to the operation by the user from among the content stored in the content storage unit 11 as the target content to which the annotation is to be added and obtains the same from the content storage unit 11, and the process shifts to the step S52.

At the step S52, the feature amount extracting unit 61 judges whether the target content is the content of which description text may be obtained or the content of which description text cannot be obtained.

At the step S52, when it is judged that the target content is the content of which description text may be obtained, the process shifts to the step S53 and the feature amount extracting unit 61 extracts the scene feature amount as the image feature amount for each frame and the word frequency information as the text feature amount of the description text from the target content.

Further, the feature amount extracting unit 61 composes the multi-stream including the scene feature amount for each frame and the text feature amount as the annotation sequence and supplies the annotation sequence to the maximum likelihood state sequence calculating unit 62, and the process shifts from the step S53 to the step S55.

Also, at the step S52, when it is judged that the target content is the content of which description text cannot be obtained, the process shifts to the step S54 and the feature amount extracting unit 61 extracts the scene feature amount as the image feature amount for each frame from the target content.

Further, the feature amount extracting unit 61 composes the multi-stream including the scene feature amount for each frame and the text feature amount, which is the dummy data, as the annotation sequence by using the dummy data as the text feature amount, for example, and supplies the annotation sequence to the maximum likelihood state sequence calculating unit 62, and the process shifts from the step S54 to the step S55.

At the step S55, the maximum likelihood state sequence calculating unit 62 obtains the annotation model of the same category as that of the target content from among the annotation models stored in the annotation model storage unit 13.

Further, the maximum likelihood state sequence calculating unit 62 obtains the maximum likelihood state sequence in which the annotation sequence from the feature amount extracting unit 61 is observed in the annotation model obtained from the annotation model storage unit 13 and supplies the same to the display controller 63, and the process shifts from the step S55 to a step S56.

Herein, the maximum likelihood state sequence is obtained for the target content, and according to this, the t-th frame of the target content is associated with the state of the annotation model, which is in the t-th state of the maximum likelihood state sequence.

At the step S56, the display controller 63 obtains the target content from the content storage unit 11. Further, the display controller 63 generates the representative image of (the frame corresponding to) the state for each state of the annotation model stored in the annotation model storage unit 13 by using the frame of the target content corresponding to the state and the process shifts from the step S56 to a step S57.

That is, if a certain state of the annotation model is noted now, the display controller 63 generates the thumbnail obtained by reducing the size of the frame of which display time is the earliest out of the frames of the target content corresponding to the noted state of interest as the representative image of the state of interest.

Meanwhile, in a case in which there is no frame corresponding to the state of interest (when there is no state of interest in the maximum likelihood state sequence), the representative image is not generated for the state of interest.

At the step S57, the display controller 63 sequentially sets the frame of the target content as the frame of interest and selects the word with high frequency (output probability) as (the word, which becomes) the annotation to be added to the frame of interest based on the multinomial distribution of the frequencies of the words observed in the state corresponding to the frame of interest of the maximum likelihood state sequence from the maximum likelihood state sequence calculating unit 62, thereby adding the annotation to the frame of interest as in the case of the annotation adding device 14 (FIG. 18).

Herein, since the same annotation is added to the frame corresponding to a certain state, adding the annotation to each frame of the target content is equivalent to adding the annotation to the state.

Meanwhile, it is possible to add the annotation to the state by selecting the word with high frequency (output probability) as (the word, which becomes) the annotation to be added to the state based on the multinomial distribution of the frequencies of the words observed in the state as in the case of adding the annotation to the frame corresponding to the state.

When the annotation is added to all of the frames of the target content at the step S57, the process shifts to a step S58 and the display controller 63 generates the model map (FIGS. 16 and 17) as described above by using the annotation model (annotation model used for obtaining the maximum likelihood state sequence for the target content) stored in the annotation model storage unit 13.

Then, the process shifts from the step S58 to a step S59 and the display controller 63 displays the model map on the display.

Further, the display controller 63 displays the representative image and the annotation of the state in each state (except the state in which the maximum likelihood state sequence obtained for the target content is not composed) on the model map by using the representative image generated at the step S56 and the annotation obtained at the step S57.

Thereafter, the process shifts from the step S59 to a step S60 and the display controller 63 performs the reproduction control of the target content.

That is, the display controller 63 starts reproducing from the first frame of the target content, for example, and displays the image of the reproduced frame so as to be larger than the representative image in place of the representative image and displays the annotation so as to be larger than that in another state for the state corresponding to the frame currently reproduced (reproduced frame) on the model map as illustrated in FIG. 18.

Further, when the state in which the representative image and the annotation are displayed on the model map is specified by the user, for example, the display controller 63 finishes reproducing the frame, which is currently the reproduced frame, and starts reproducing the frame of which display time is the earliest of the frames corresponding to the state specified by the user as the reproduced frame.

As described above, the display control device 16 extracts the image feature amount of each frame of the image of the target content, composes the annotation sequence by using the image feature amount, obtains the maximum likelihood state sequence in which the annotation sequence is observed in the annotation model, selects the word with high frequency in the multinomial distribution observed in the state corresponding to the noted frame of interest out of the states of the maximum likelihood state sequence as the annotation to be added to the frame of interest, and displays the annotation to be added to the frame corresponding to the state for each state of the annotation model in a display format using the model map (FIGS. 18 and 19), for example, so that the user may have a look at the annotations added to the target content.

Also, according to the display control device 16, it is possible to provide the application, which utilizes the annotation that, when the state on the model map in which the annotation is displayed is specified, the reproduction of the frame corresponding to the state is started.

Further, when the description text of the target content may be obtained as in the case of the annotation adding device 14 and the frame searching device 15, the display control device 16 also extracts the image feature amount of each frame of the image of the target content and the text feature amount of the description text and composes the annotation sequence including the image feature amount and the text feature amount, and when the description text of the target content cannot be obtained, this composes the annotation sequence including the image feature amount and the text feature amount, which is the dummy data, by using the dummy data as the text feature amount, so that this may display the annotation for the target content regardless of the presence of the description text.

Herein, the display of the annotation added to the frame of the target content for each state of the annotation model may be performed in the display format (view) other than the display format using the model map (FIGS. 18 and 19).

That is, the display of the annotation added to the frame of the target content for each state of the annotation model may be performed in the display format in which the annotations of the state are arranged in one direction, the display format in which they are arranged in a two-dimensional tabular format and the like, for example.

Meanwhile, the feature amount extracting unit 21 of the learning device 12 (FIG. 2) may be used as the feature amount extracting unit 21 of the learning device 12 (FIG. 2), the feature amount extracting unit 41 of the annotation adding device 14 (FIG. 8), the feature amount extracting unit 51 of the frame searching device 15 (FIG. 10), and the feature amount extracting unit 61 of the display control device 16 (FIG. 15).

Also, any one of the maximum likelihood state sequence calculating unit 42 of the annotation adding device 14 (FIG. 8), the maximum likelihood state sequence calculating unit 52 of the frame searching device 15 (FIG. 10), and the maximum likelihood state sequence calculating unit 62 of the display control device 16 (FIG. 16) may be used as all of them.

[Second Configuration Example of Feature Amount Extracting Unit 21]

Figure 21:
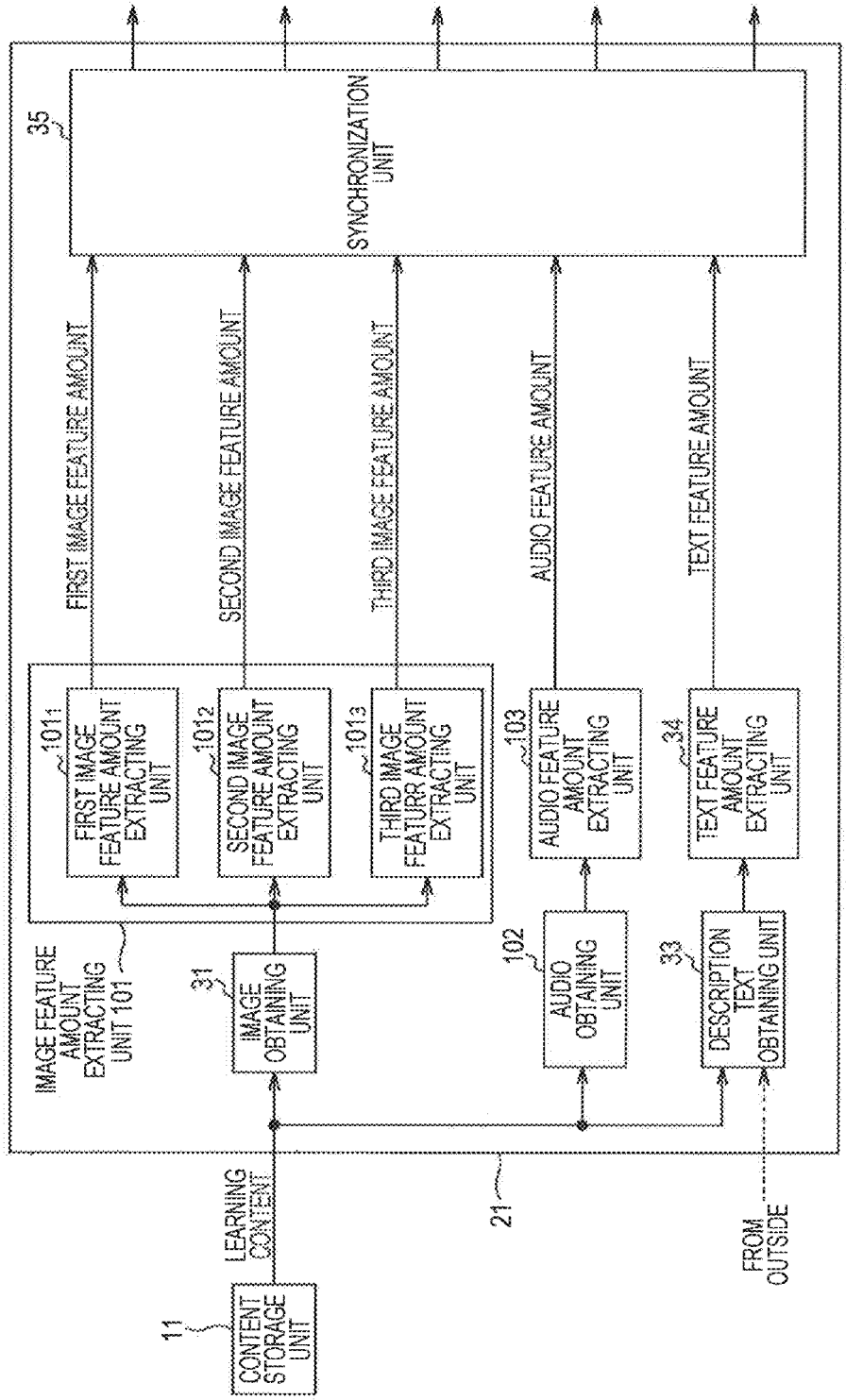
FIG. 21 is a block diagram illustrating a second configuration example of the feature amount extracting unit 21.

FIG. 21 is a block diagram illustrating a second configuration example of the feature amount extracting unit 21 in FIG. 2.

Meanwhile, in FIG. 21, the same reference sign is assigned to a part corresponding to that in FIG. 3 and the description thereof is hereinafter appropriately omitted.

The feature amount extracting unit 21 in FIG. 21 is the same as that in FIG. 3 in that this includes the image obtaining unit 31, the description text obtaining unit 33, the text feature amount extracting unit 34, and the synchronization unit 35.

However, the feature amount extracting unit 21 in FIG. 21 is different from that in FIG. 3 in that an image feature amount extracting unit 101 is provided in place of the image feature amount extracting unit 32 and an audio obtaining unit 102 and an audio feature amount extracting unit 103 are newly provided.

The image feature amount extracting unit 101 includes a first image feature amount extracting unit $101_1$, a second image feature amount extracting unit $101_2$, and a third image feature amount extracting unit $101_3$, extracts a first image feature amount, a second image feature amount, and a third image feature amount, for example, as a plurality of types of the image feature amounts from each frame of the image supplied from the image obtaining unit 31 and supplies them to the synchronization unit 35.

That is, the first image feature amount extracting unit $101_1$ selects each frame of the image from the image obtaining unit 31 as the frame of interest in order of time, extracts the scene feature amount as the first image feature amount from the frame of interest as in the case of the image feature amount extracting unit 32 in FIG. 3, for example, and supplies the same to the synchronization unit 35.

The second image feature amount extracting unit $101_2$ selects each frame of the image from the image obtaining unit 31 as the frame of interest in order of time and detects a human rectangular region, which is a minimum rectangular region enclosing a region in which a human is seen, for example, from the frame of interest.

Further, the second image feature amount extracting unit $101_2$ divides the frame of interest into sub regions, which are a plurality of small regions, and divides the number of pixels of the human rectangular region present in the sub region by the number of pixels of the sub region, thereby obtaining a ratio of the human rectangular region to the sub region (hereinafter, also referred to as a human rectangular region ratio) for each sub region.

Then, the second image feature amount extracting unit $101_2$ composes the vector of which component is the human rectangular region ratio of each sub region of the frame of interest and supplies the vector to the synchronization unit 35 as the second image feature amount extracted from the frame of interest.

The third feature amount extracting unit $101_2$ selects each frame of the image from the image obtaining unit 31 as the frame of interest in order of time and detects a face rectangular region, which is a minimum rectangular region enclosing a region in which a face of the human is seen, for example, from the frame of interest.

Further, the third image feature amount extracting unit $101_3$ divides the frame of interest into sub regions, which are a plurality of small regions, and divides the number of pixels of the face rectangular region present in the sub region by the number of pixels of the sub region, thereby obtaining a ratio of the face rectangular region to the sub region (hereinafter, also referred to as a face rectangular region ratio) for each sub region.

Then, the third image feature amount extracting unit $101_3$ composes the vector of which component is the face rectangular region ratio of each sub region of the frame of interest and supplies the vector to the synchronization unit 35 as the third image feature amount extracted from the frame of interest.

Meanwhile, a plurality of types of the image feature amounts extracted by the image feature amount extracting unit 101 are not limited to the above-described first to third image feature amounts.

The audio obtaining unit 102 obtains the same learning content as that obtained by the image obtaining unit 31 from the content storage unit 11, for example, and obtains audio by inverse multiplexing (separation) from the learning content to supply to the audio feature amount extracting unit 103.

The audio feature amount extracting unit 103 extracts the audio feature amount from the audio from the audio obtaining unit 102 and supplies the same to the synchronization unit 35.

That is, the audio feature amount extracting unit 103 extracts a primitive feature amount, which is a primitive feature amount for generating the audio feature amount suitable for classifying the audio into scenes (for example, "music", "non-music", "noise", "human voice", "human voice and music", "audience" and the like) used in a field of audio classification (sound classification), for example.

Herein, the primitive feature amount includes energy of the audio, a zero crossing rate, spectrum center of gravity and the like, for example. A method of extracting the primitive feature amount is described in Zhu Liu; Jincheng Huang; Yao Wang; Tsuhan Chen, Audio feature extraction and analysis for scene classification, First Workshop on Multimedia Signal Processing, 1997, IEEE Volume, Issue, 23-25 Jun. 1997 Page(s): 343-348, and Brezeale, D. Cook, D. J., Automatic Video Classification: A Survey of the Literature, IEEE Transactions on Systems, Man, and Cybernetics, Part C: Applications and Reviews, May 2008, Volume: 38, Issue: 3, pp. 416-430, for example.

The audio feature amount extracting unit 103 extracts one or more primitive feature amounts from the audio in the window while shifting the window having the time length of 0.05 seconds and the like at regular intervals of 0.05 seconds and the like, for example.

Further, the audio feature amount extracting unit 103 sequentially notes the time at which the primitive feature amount is extracted as time of interest, obtains a statistic amount such as a mean value and variance of the primitive feature amount within 0.5 seconds before and after the time of interest, and supplies the vector of which component is the mean value and the variance to the synchronization unit 35 as the audio feature amount at the time of interest.

Meanwhile, in FIG. 21, the synchronization unit 35 synchronizes the first to third image feature amounts supplied from the image feature amount extracting unit 101, the audio feature amount supplied from the audio feature amount extracting unit 103, and the text feature amount supplied from the text feature amount extracting unit 34 in a unit of frame to output.

That is, the synchronization unit 35 synchronizes the first to third image feature amounts supplied from the image feature amount extracting unit 101, the audio feature amount supplied from the audio feature amount extracting unit 103, and the text feature amount supplied from the text feature amount extracting unit 34 such that a set of the first to third image feature amounts extracted from the noted frame of interest, the audio feature amount at the time the closest to a predetermined time such as the start time of the frame of interest, and the text feature amount obtained from the window in the position at the time after the frame of interest, the window in the position temporally the closest to the frame of interest becomes the set of the first to third image feature amounts, the audio feature amount, and the text feature amount of the frame of interest, for example, and outputs them to the model learning unit 22 (FIG. 2).

In this case, the model learning unit 22 sets the multi-stream including the first to third image feature amounts, the audio feature amount, and the text feature amount of the learning content supplied from the feature amount extracting unit 21 as the annotation sequence for annotation for adding the annotation to the content and learns the annotation model, which is the multi-stream HMM, by using the annotation sequence.

Therefore, in this case, the annotation sequence, which is the multi-stream, used for the learning by the model learning unit 22 is composed of five-component sequences $o_{[1]}$, $o_{[2]}$, $o_{[3]}$, $o_{[4]}$, and $o_{[5]}$ of the first to third image feature amounts, the audio feature amount, and the text feature amount.

Then, the state of the annotation model obtained by the learning by using such annotation sequence is such that a group of frames with a short spatial distance therebetween and similar temporal context are collectively represented in the feature amount space, which is a space defined by axes (of five modals) of the first to third image feature amounts, the audio feature amount, and the text feature amount (the feature amount space is state-divided).

Meanwhile, as illustrated in FIG. 21, when the five feature amounts, which are the first to third image feature amounts, the audio feature amount, and the text feature amount, are extracted by the feature amount extracting unit 21 of the learning device 12, the feature amount extracting unit 41 of the annotation adding device 14 (FIG. 8), the feature amount extracting unit 51 of the frame searching device 15 (FIG. 10), and the feature amount extracting unit 61 of the display control device 16 (FIG. 15) also extract the five feature amounts, which are the first to third image feature amounts, the audio feature amount, and the text feature amount, as in the case of the feature amount extracting unit 21, and the process is performed by using the annotation sequence including the five feature amounts.

However, in the feature amount extracting unit 41 of the annotation adding device 14 (FIG. 8), the feature amount extracting unit 51 of the frame searching device (FIG. 10), and the feature amount extracting unit 61 of the display control device 16 (FIG. 15), when the target content is the content of which description text cannot be obtained, the dummy data is used as the text feature amount as described above.

As described above, by composing the annotation sequence of the first to third image feature amounts, the audio feature amount, and the text feature amount, which are a variety of types of feature amounts, the content may be classified into the frames with similar content more appropriately (with higher accuracy) as compared to the case in which the annotation sequence is composed of the scene feature amount and the text feature amount (the frames with the similar content correspond to the same state when the maximum likelihood state sequence is obtained).

Meanwhile, as the audio feature amount, MFCC (Mel frequency cepstrum coefficient) and the like, for example, used in audio processing such as the speech recognition may be adopted in addition to the above-described (mean value and variance of the) primitive feature amount.

[Third Configuration Example of Feature Amount Extracting Unit 21]

Figure 22:
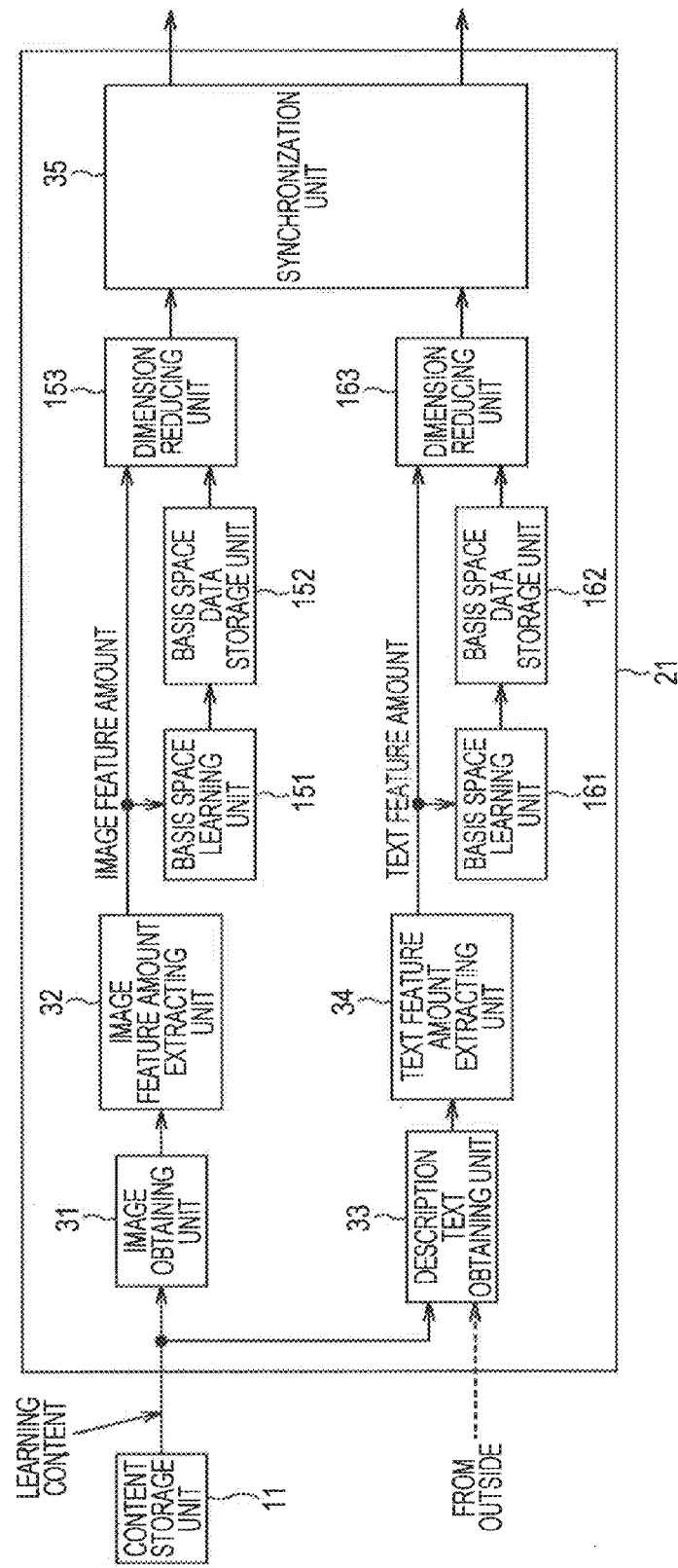
FIG. 22 is a block diagram illustrating a third configuration example of the feature amount extracting unit 21.

FIG. 22 is a block diagram illustrating a third configuration example of the feature amount extracting unit 21 in FIG. 2.

Meanwhile, in FIG. 22, the same reference sign is assigned to a part corresponding to that in FIG. 3 and the description thereof is hereinafter appropriately omitted.

The feature amount extracting unit 21 in FIG. 22 is the same as that in FIG. 3 in that this includes the image obtaining unit 31, the image feature amount extracting unit 32, the description text obtaining unit 33, the text feature amount extracting unit 34, and the synchronization unit 35.

However, the feature amount extracting unit 21 in FIG. 22 differs from that in FIG. 3 in that a basis space learning unit 151, a basis space data storage unit 152, a dimension reducing unit 153, a basis space learning unit 161, a basis space data storage unit 162, and a dimension reducing unit 153 are newly provided.

The image feature amount of the learning content is supplied from the image feature amount extracting unit 32 to the basis space learning unit 151.

The basis space learning unit 151 obtains basis space data of a basis space for image of which dimension is lower than the dimension of the image feature amount for mapping the image feature amount by using the image feature amount from the image feature amount extracting unit 32 and supplies the same to the basis space data storage unit 152.

The basis space data storage unit 152 stores the basis space data of the basis space for image from the basis space learning unit 151.

The image feature amount of the learning content is supplied from the image feature amount extracting unit 32 to the dimension reducing unit 153.

The dimension reducing unit 153 performs dimension reduction to reduce the dimension of the image feature amount from the image feature amount extracting unit 32 based on the basis space data of the basis space for image stored in the basis space data storage unit 152 and supplies the image feature amount after the dimension reduction to the synchronization unit 35.

Herein, the image feature amount extracted by the image feature amount extracting unit 32 is the vector and the basis space learning unit 151 obtains a code book used for vector quantization as the basis space data of the basis space for image by a k-means method, for example, by using the image feature amount of the learning content from the image feature amount extracting unit 32.

Then, the dimension reducing unit 153 performs the dimension reduction by performing the vector quantization of the image feature amount from the image feature amount extracting unit 32 by using the code book as the basis space data of the basis space for image and obtains a code (scalar discrete value) representing a centroid vector of which distance from the vector as the image feature amount from the image feature amount extracting unit 32 is the shortest out of the centroid vectors registered in the code book, as the image feature amount after the dimension reduction.

Therefore, the vector of a predetermined dimension as the image feature amount from the image feature amount extracting unit 32 is reduced to a one-dimensional code by the dimension reducing unit 153, and it may be considered that, this maps the vector of a predetermined dimension in the basis space for image while setting the space of the one-dimensional code as the basis space for image by the dimension reduction.

Meanwhile, the dimension reduction of the image feature amount may be performed by using the HMM and SOM (self organizing maps), for example, in addition to the vector quantization.

That is, it is possible to learn the HMM by using the image feature amount extracted by the image feature amount extracting unit 32, obtain the maximum likelihood state sequence in which a temporal sequence of the image feature amount is observed in the learned HMM, and obtain the state ID of the state corresponding to each image feature amount in the maximum likelihood state sequence as the image feature amount after the dimension reduction.

It is also possible to learn the SOM by using the image feature amount extracted by the image feature amount extracting unit 32, for example, and obtain the ID representing a node, which becomes a winner when the image feature amount is input to the learned SOM, as the image feature amount after the dimension reduction.

The text feature amount of the learning content is supplied from the text feature amount extracting unit 34 to the basis space learning unit 161.

The basis space learning unit 161 obtains the basis space data of the basis space for text of which dimension is lower than the dimension of the text feature amount for mapping the text feature amount by using the text feature amount from the text feature amount extracting unit 34 and supplies the same to the basis space data storage unit 162.

The basis space data storage unit 162 stores the basis space data of the basis space for text from the basis space learning unit 161.

The text feature amount of the learning content is supplied from the text feature amount extracting unit 34 to the dimension reducing unit 163.

The dimension reducing unit 163 performs the dimension reduction to reduce the dimension of the text feature amount from the text feature amount extracting unit 34 based on the basis space data of the basis space for text stored in the basis space data storage unit 162 and supplies the text feature amount after the dimension reduction to the synchronization unit 35.

Herein, the text feature amount extracted by the text feature amount extracting unit 34 is the word frequency information regarding the frequency of the appearance of each word in the description text and is the K-dimensional vector (registered word frequency vector) of which component is the frequency of the appearance of each word in the word dictionary (FIG. 5) in which the K words are registered in the pseudo document obtained by setting the words included in the text of the caption displayed in a predetermined window (within time corresponding to the window) as the pseudo document as illustrated in FIGS. 5 and 6, for example.

The basis space learning unit 161 obtains a parameter of LDA as the basis space data of the basis space for text by learning the LDA (latent Dirichlet allocation), for example, by using the registered word frequency vector as the text feature amount obtained from the pseudo document.

Then, the dimension reducing unit 163 converts the text feature amount obtained from the pseudo document to topic likelihood, which is likelihood of each latent topic of the LDA for the pseudo document, by using the parameter of the LDA as the basis space data of the basis space for text and obtains a topic label (scalar discrete value) representing the latent topic having the maximum topic likelihood as the text feature amount after the dimension reduction.

Therefore, the dimension reducing unit 163 reduces the K-dimensional registered word frequency vector as the text feature amount from the text feature amount extracting unit 34 to a one-dimensional topic label, and it may be considered that this maps the K-dimensional registered word frequency vector in the basis space for text while setting the space of the one-dimensional topic label as the basis space for text by the dimension reduction.

Figure 23:
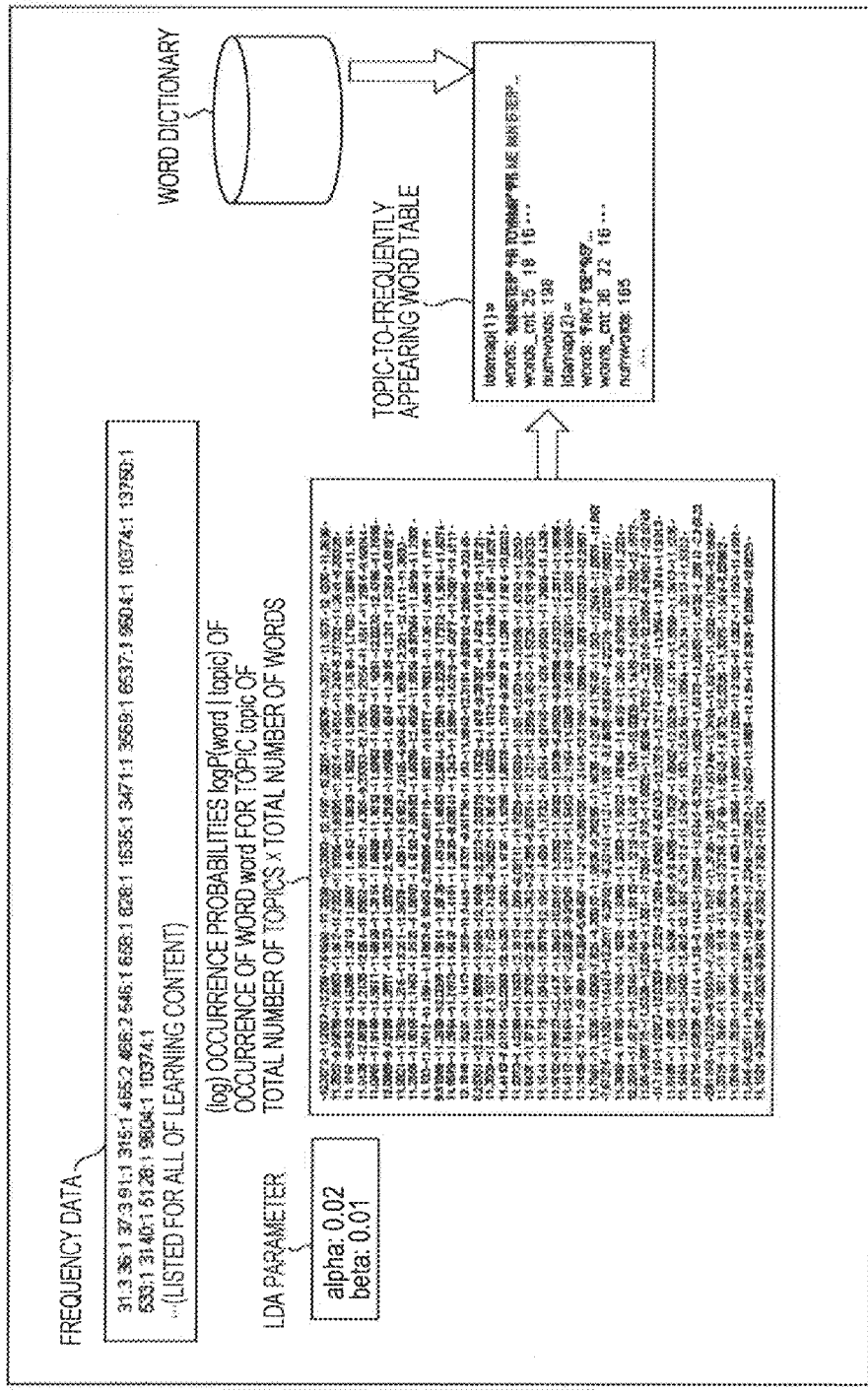
FIG. 23 is a view illustrating learning of LDA in which the basis space learning unit 161 obtains a parameter of the LDA as basis space data of a basis space for text.

FIG. 23 is a view illustrating the learning of the LDA in which the basis space learning unit 161 in FIG. 22 obtains the parameter of the LDA as the basis space data of the basis space for text.

The basis space learning unit 161 obtains the parameter of the LDA by learning the LDA by using the registered word frequency vector as the text feature amount obtained from the pseudo document.

The LDA is described in David M. Blei, Andrew Y. Ng, Michael I. Jordan, "Latent Dirichlet Allocation", Journal of Machine Learning Research 3 (2003) 993-1022 and the like, for example.

Herein, the frequency data illustrated in FIG. 5, that is, the frequency data in which the word ID of the word appearing in the pseudo document out of the K words registered in the word dictionary and the appearance frequency of the word (frequency of the appearance in the pseudo document) are associated with each other is illustrated in FIG. 23 in place of the registered word frequency vector as the text feature amount obtained from the pseudo document. The registered word frequency vector as the text feature amount and the frequency data are equivalent data.

So-called α parameter and β parameter are obtained as the parameters of the LDA and (log) occurrence probability log (P(word|topic)) of occurrence of the word word registered in the word dictionary is obtained for all combinations of each word registered in the word dictionary (each of all the words appearing in the pseudo document obtained from the learning content) and each latent topic of the LDA in (the document of which topic is) a latent topic topic of the LDA.

Therefore, when the number of words registered in the word dictionary is K and the number of latent topics of the LDA is D, K×D occurrence probabilities log(P(word|topic)) of the word are obtained.

Meanwhile, in the learning of the LDA, a predetermined value determined in advance is used as the number D of the latent topics.

The basis space learning unit 161 creates a topic-to-frequently appearing word table in which the word with high appearance frequency in each latent topic of the LDA and the appearance frequency of the word are registered by using the occurrence probability log(P(word|topic)) of the word after obtaining the parameter of the LDA by learning the LDA.

That is, the basis space learning unit 161 sequentially sets each latent topic of the LDA as a topic of interest and converts the occurrence probability log(P(word|topic)) to the appearance frequency (number of times) of the appearance of each word in the word dictionary in the document of the topic of interest by multiplying a predetermined constant (for example, 1000 and the like) by the occurrence probability log(P(word|topic)) of the occurrence of each word in the word dictionary in the topic of interest.

Further, the basis space learning unit 161 compares the appearance frequency of the appearance of each word in the word dictionary obtained for the topic of interest with a predetermined threshold (for example, 1 and the like) and selects the word with the appearance frequency not smaller than the predetermined threshold as the word with high appearance frequency in the topic of interest (hereinafter, also referred to as the frequently appearing word) from among the words in the word dictionary.

Then, the basis space learning unit 161 associates the topic label of the topic of interest, the frequently appearing word with high appearance frequency in the topic of interest, and the appearance frequency of the frequently appearing word with one another and registers them in the topic-to-frequently appearing word table.

Herein, in the topic-to-frequently appearing word table in FIG. 23, the number in braces { } after "ldamap" represents the topic label and the words described after "words" thereafter are the frequently appearing words with high appearance frequency in the latent topic represented by the topic label just before the same.

The number described after "word_cnt" after the frequently appearing words is the appearance frequency of each frequently appearing word and the number after "numwords" thereafter is the sum of the appearance frequencies of the frequently appearing words.

Meanwhile, the frequently appearing words of each latent topic may be sorted in descending order of the appearance frequency (word with the highest appearance frequency comes first) in the topic-to-frequently appearing word table.

The topic-to-frequently appearing word table may be stored in the annotation model storage unit 13 together with the annotation model and the word dictionary, for example.

The basis space learning unit 161 obtains the parameter of the LDA and the topic-to-frequently appearing word table described above as the basis space data of the basis space for text.

Figure 24:
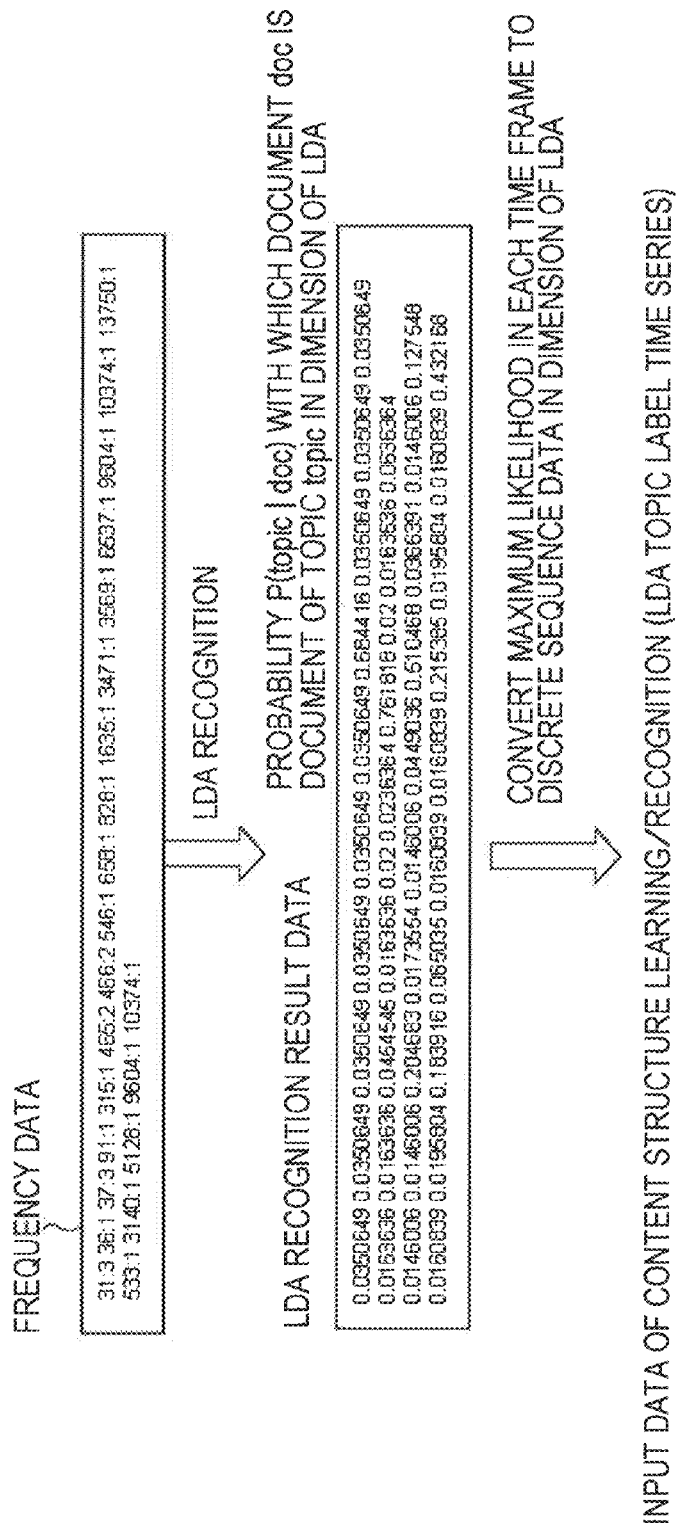
FIG. 24 is a view illustrating dimension reduction of the text feature amount performed by a dimension reducing unit 163 by using the basis space data of the basis space for text.

FIG. 24 is a view illustrating the dimension reduction of the text feature amount performed by the dimension reducing unit 163 in FIG. 22 by using the basis space data of the basis space for text illustrated in FIG. 23.

The dimension reducing unit 163 converts the text feature amount obtained from the pseudo document to the topic likelihood, which is the likelihood of each latent topic of the LDA for the pseudo document, by using the parameter of the LDA as the basis space data of the basis space for text and obtains the topic label (scalar discrete value) representing the latent topic having the maximum topic likelihood as the text feature amount after the dimension reduction.

Herein, according to an LDA recognition process in which the parameter of the LDA is used, it is possible to obtain topic likelihood P(topic|doc) representing the likelihood that the topic of a document doc is each latent topic of the LDA as LDA recognition result data, which is a result of the LDA recognition process, from the frequency data representing the appearance frequency of each word in the document doc.

The dimension reducing unit 163 obtains the topic likelihood of each latent topic of the LDA for the pseudo document of which text feature amount is obtained by using the parameter of the LDA as the basis space data of the basis space for text and inputting the K-dimensional registered word frequency vector as the text feature amount obtained from the pseudo document from the text feature amount extracting unit 34 to perform the LDA recognition process.

Therefore, according to the LDA recognition process, when the number of latent topics of the LDA is D, the K-dimensional registered word frequency vector is mapped to the topic likelihood of the D latent topics as D-dimensional discrete probability distribution.

When the dimension reducing unit 163 obtains the topic likelihood of the D latent topics of the LDA for the text feature amount, this detects the maximum topic likelihood, which is the maximum value of the topic likelihood of the D latent topics, and outputs the topic label of the latent topic having the maximum topic likelihood as the text feature amount after the dimension reduction.

As described above, by performing the dimension reduction of the image feature amount and the text feature amount, it is possible to reduce an operation amount required for the learning of the multi-stream HMM as the annotation model and the process to obtain the maximum likelihood state sequence as compared to the case in which the dimension reduction is not performed.

Meanwhile, in FIG. 22, the synchronization unit 35 synchronizes the code (hereinafter, also referred to as an image code), which is the image feature amount after the dimension reduction, from the dimension reducing unit 153 and the topic label, which is the text feature amount after the dimension reduction, from the dimension reducing unit 163 in a unit of frame and outputs them to the model learning unit 22 (FIG. 2).

The model learning unit 22 sets the sequences of the image code and the topic label from (the synchronization unit 35 of) the feature amount extracting unit 21 as the annotation sequence and learns the annotation model, which is the multi-stream HMM, according to the Baum-Welch re-estimation method.

Herein, in this case, the annotation sequence is composed of two component sequences, which are the sequence of the image code as a first component sequence $o_{[1]}$ and the sequence of the topic label as a second component sequence $o_{[2]}$.

The image code, which is the first component sequence $o_{[1]}$ of the annotation sequence, is the discrete value and the multinomial distribution is used as the output probability distribution (observation model) $b_{[1]j}(o_{[1]})$ of each state $s_j$ of the annotation model.

The topic label, which is the second component sequence $o_{[2]}$, also is the discrete value and the multinomial distribution is used as the output probability distribution $b_{[2]j}(o_{[2]})$ of each state $s_j$ of the annotation model.

In this case, in the Baum-Welch re-estimation method, the state probability $\gamma^{(h)}_{t,j}$ to be in the state j at the time t is obtained as in the case of the learning of the HMM by using a single sequence for the h-th learning content by using the initial probability $\pi_i$, the state transition probability $a_{ij}$, and the output probability distribution $b_j(o_{[1]}, o_{[2]})$ obtained according to the equation (1) at the E step.

Also, at the M step, the multinomial distribution as the output probability distribution $b_{[1]j}$ of observation of each image code and the multinomial distribution as the output probability distribution $b_{[2]j}$ of observation of each topic label are obtained according to an equation (5) as in the case of the learning of the HMM having the multinomial distribution as the observation model (output probability distribution) by using the state probability $\gamma^{(h)}_{t,j}$ obtained at the E step.

[Equation 5]

$$b_{[m]j} = \frac{\sum_{h=1}^{H}\sum_{t=1}^{T}\gamma^{(h)}_{t,j}o^{(h)}_{[m]}(t)}{\sum_{h=1}^{H}\sum_{t=1}^{T}\gamma^{(h)}_{t,j}} \quad (5)$$

Herein, in the equation (5), $o^{(h)}_{[m]}(t)$ represents the multinomial distribution representing presence of the observation of each image code (when m=1 is satisfied) or each topic label (when m=2 is satisfied) in the t-th frame of the h-th learning content of the H pieces of learning content.

The multinomial distribution $o^{(h)}_{[1]}(t)$ of the image code is the multinomial distribution in which the distribution (probability) of one image code observed at the time t is 1 and the distribution of all remaining image codes is 0 when the total number of the image codes is K'.

Also, the multinomial distribution $o^{(h)}_{[2]}(t)$ of the topic label is the multinomial distribution in which the distribution (probability) of one topic label observed at the time t is 1 and the distribution of all remaining topic labels is 0 when the total number of the topic labels (the number of the latent topics) is D.

Figure 25:
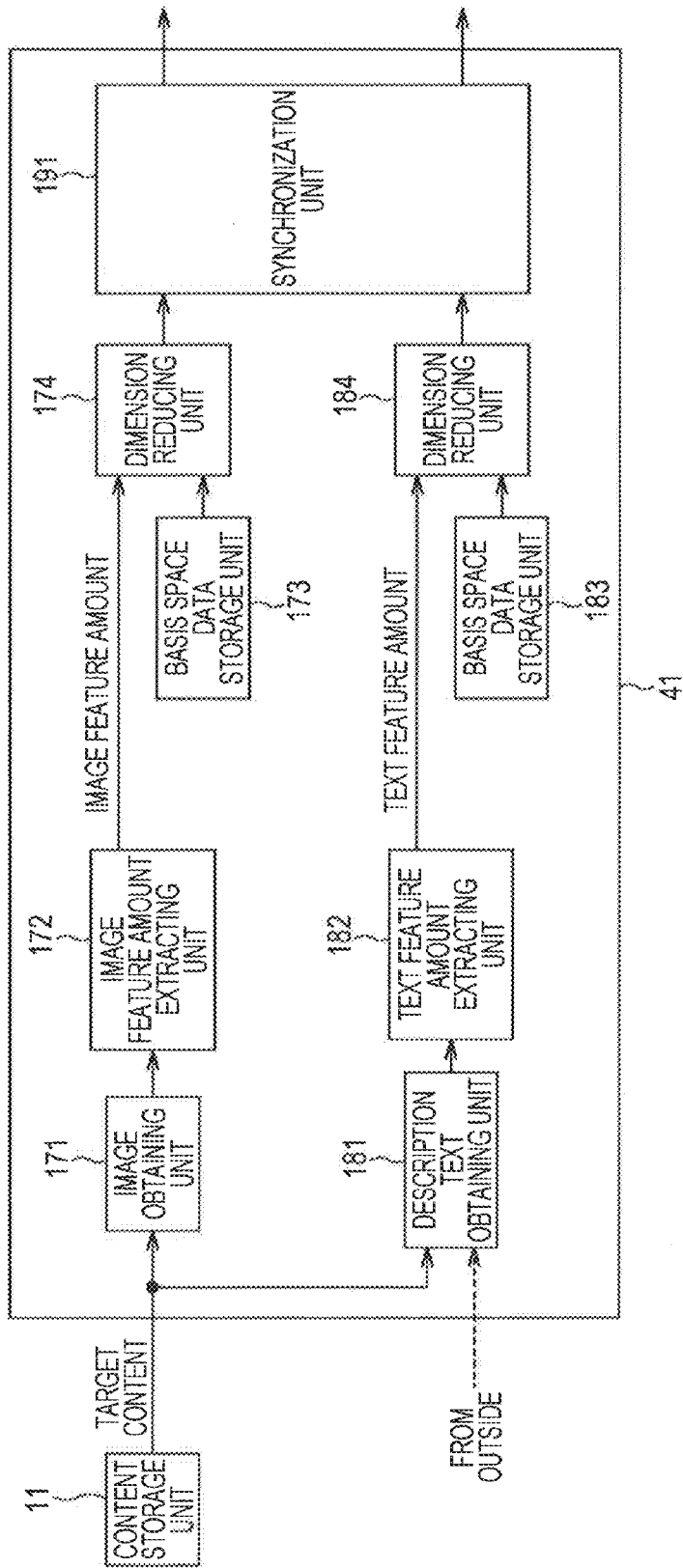
FIG. 25 is a block diagram illustrating a configuration example of a feature amount extracting unit 41 of the annotation adding device 14.

FIG. 25 is a block diagram illustrating a configuration example of the feature amount extracting unit 41 of the annotation adding device 14 (FIG. 8) when the feature amount extracting unit 21 of the learning device 12 is composed as illustrated in FIG. 22.

Meanwhile, the feature amount extracting unit 51 of the frame searching device 15 (FIG. 10) and the feature amount extracting unit 61 of the display control device 16 (FIG. 15) also are composed as the feature amount extracting unit 41 of the annotation adding device 14.

In FIG. 25, the feature amount extracting unit 41 of the annotation adding device 14 (FIG. 8) includes an image obtaining unit 171, an image feature amount extracting unit 172, a basis space data storage unit 173, a dimension reducing unit 174, a description text obtaining unit 181, a text feature amount extracting unit 182, a basis space data storage unit 183, a dimension reducing unit 184, and a synchronization unit 191.

In the feature extracting unit 41 in FIG. 25, the basis space data storage unit 173 stores the basis space data of the basis space for image obtained by the basis space learning unit 151 in FIG. 22 and the basis space data storage unit 183 stores the basis space data of the basis space for text obtained by the basis space learning unit 161 in FIG. 22.

Then, the image obtaining unit 171, the image feature amount extracting unit 172, the dimension reducing unit 174, the description text obtaining unit 181, the text feature amount extracting unit 182, the dimension reducing unit 184, and the synchronization unit 191 perform the processes similar to those of the image obtaining unit 31, the image feature amount extracting unit 32, the dimension reducing unit 153, the description text obtaining unit 33, the text feature amount extracting unit 34, the dimension reducing unit 163, and the synchronization unit 35 in FIG. 22 for the target content, and according to this, the annotation sequence in which the image code as the image feature amount after the dimension reduction and the topic label as the text feature amount after the dimension reduction are synchronized in a unit of frame is composed.

However, as for the target content of which description text cannot be obtained, the annotation sequence is composed by using the dummy data (one-dimensional discrete value) as the topic label as the text feature amount after the dimension reduction.

Meanwhile, although the feature amount extracting unit 21 in FIG. 22 performs the dimension reduction for both of the image feature amount and the text feature amount, it is possible to perform the dimension reduction for only one of the image feature amount and the text feature amount.

Much the same is true on the feature amount extracting unit 41 in FIG. 25. However, it is required that the dimension reduction of the image feature amount and the text feature amount be performed by both of the feature amount extracting unit 21 and the feature amount extracting unit 41 (feature amount extracting units 51 and 61) or not performed by any of them.

[Annotation Adding Process when Dimension Reduction of Text Feature Amount is Performed]

Figure 26:
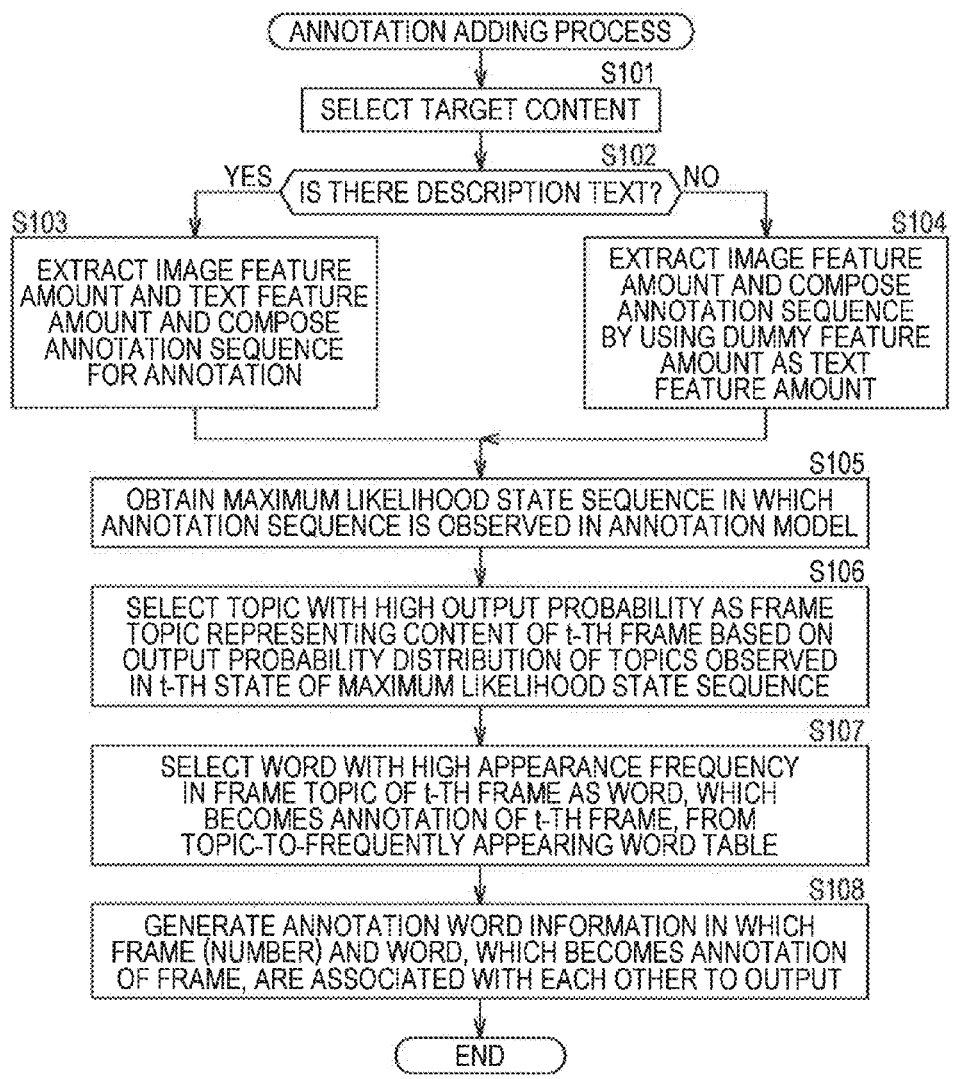
FIG. 26 is a flowchart illustrating the annotation adding process by the annotation adding device 14.

FIG. 26 is a flowchart illustrating the annotation adding process by the annotation adding device 14 in FIG. 8 when the dimension reduction of at least the text feature amount is performed.

Meanwhile, in FIG. 26 (also in FIGS. 27, 28, and 30 to be described later), the dimension reduction of the image feature amount and the text feature amount is performed, for example.

At a step S101, the feature amount extracting unit 41 (FIG. 8) selects the target content to which the annotation is to be added from among the content stored in the content storage unit 11 and obtains the same from the content storage unit 11, and the process shifts to a step S102.

At the step S102, the feature amount extracting unit 41 judges whether the target content is the content of which description text may be obtained or the content of which description text cannot be obtained.

At the step S102, when it is judged that the target content is the content of which description text may be obtained, the process shifts to a step S103 and the feature amount extracting unit 41 extracts the scene feature amount as the image feature amount for each frame and the word frequency information as the text feature amount of the text of the caption as the description text from the target content.

Further, the feature amount extracting unit 41 performs the dimension reduction of the scene feature amount for each frame and the text feature amount and composes the multi-stream including the scene feature amount and the text feature amount after the dimension reduction as the annotation sequence. Then, the feature amount extracting unit 41 supplies the annotation sequence to the maximum likelihood state sequence calculating unit 42 and the process shifts from the step S103 to a step S105.

Also, at the step S102, when it is judged that the target content is the content of which description text cannot be obtained, the process shifts to a step S104 and the feature amount extracting unit 41 extracts the scene feature amount as the image feature amount for each frame from the target content.

Further, the feature amount extracting unit 41 performs the dimension reduction of the scene feature amount for each frame. Then, the feature amount extracting unit 41 composes the multi-stream including the scene feature amount after the dimension reduction and the text feature amount after the dimension reduction, which is the dummy data, as the annotation sequence by using the dummy data (for example, the topic label of a predetermined value) as the text feature amount after the dimension reduction, for example, and supplies the annotation sequence to the maximum likelihood state sequence calculating unit 42, and the process shifts from the step S104 to the step S105.

At the step S105, the maximum likelihood state sequence calculating unit 42 obtains the annotation model of the same category as that of the category of the target content (annotation model learned by using the learning content of the same category as that of the target content) from among the annotation models (multi-stream HMMs) stored in the annotation model storage unit 13.

Further, the maximum likelihood state sequence calculating unit 42 obtains the maximum likelihood state sequence in which the annotation sequence from the feature amount extracting unit 41 is observed in the annotation model obtained from the annotation model storage unit 13 and supplies the same to the word selecting unit 43, and the process shifts from the step S105 to a step S106.

At the step S106, the word selecting unit 43 sequentially sets the frame of the target content as the frame of interest and selects the latent topic suitable for representing the content of the frame of interest as the frame topic based on the output probability distribution of (the topic labels of) the latent topics observed in the state corresponding to the frame of interest of the maximum likelihood state sequence from the maximum likelihood state sequence calculating unit 42.

That is, when the t-th frame of the target content is the frame of interest, the word selecting unit 43 selects the latent topic with high output probability in the output probability distribution of (the topic labels of) the latent topics observed in the t-th state of the maximum likelihood state sequence as the frame topic of the t-th frame.

Herein, the latent topic with the highest output probability and a plurality of latent topics with higher output probabilities in the output probability distribution of the latent topics observed in the t-th state of the maximum likelihood state sequence may be selected as the frame topic of the t-th frame.

When the frame topic of each frame of the target content is selected, the process shifts from the step S106 to a step S107 and the word selecting unit 43 selects the frequently appearing word of the frame topic of the frame as the annotation to be added to the frame for each frame of the target content based on the topic-to-frequently appearing word table (FIG. 23).

That is, when the t-th frame of the target content is the frame of interest, the word selecting unit 43 selects the frequently appearing word with the highest appearance frequency and a plurality of frequently appearing words with higher appearance frequencies, for example, out of the frequently appearing words of (the latent topic, which is) the frame topic of the t-th frame, which is the frame of interest, in the topic-to-frequently appearing word table as the annotation to be added to the frame of interest.

Meanwhile, when a plurality of latent topics are selected as the frame topics of the t-th frame, which is the frame of interest, it is possible to select (the word, which becomes) the annotation to be added to the frame of interest from the frequently appearing words of each of a plurality of latent topics.

That is, when a plurality of latent topics are selected as the frame topics of the t-th frame, which is the frame of interest, it is possible to select the frequently appearing word with the highest appearance frequency out of the frequently appearing words of each of a plurality of latent topics, which are the frame topics of the t-th frame, for example, as the annotation to be added to the t-th frame.

Also, when a plurality of latent topics are selected as the frame topics of the t-th frame, which is the frame of interest, it is possible to correct the appearance frequency by multiplying the output probability of the latent topics, which are the frame topic of the t-th frame, (output probability of the latent topics, which are the frame topics observed in the t-th state of the maximum likelihood state sequence) by the appearance frequency of the frequently appearing words of the latent topics, for example, and select the word with the highest appearance frequency after the correction and a plurality of frequently appearing words with higher appearance frequencies after the correction as the annotation to be added to the t-th frame.

When the word selecting unit 43 selects the word as the annotation to be added to the frame of interest by setting all of the frames of the target content as the frames of interest and the annotation is added to all of the frames of the target content according to this, the process shifts from the step S107 to a step S108 and the word selecting unit 43 associates the annotation added to each frame of the target content with the frame number (t of the t-th frame) of the frame to output as the annotation word information, and the annotation adding process ends.

As described above, also when the annotation adding device 14 extracts the image feature amount of each frame of the image of the target content, performs the dimension reduction, composes the annotation sequence by using the image feature amount after the dimension reduction, obtains the maximum likelihood state sequence in which the annotation sequence is observed in the annotation model, selects the latent topic represented by the topic label with high output probability in the state corresponding to the noted frame of interest out of the states of the maximum likelihood state sequence as the frame topic representing the content of the frame of interest, and selects the frequently appearing word with high appearance frequency in the frame topic as the annotation to be added to the frame of interest based on the topic-to-frequently appearing word table, the annotation may be easily added to the target content as in the case in FIG. 9.

[Frame Searching Process when Dimension Reduction of Text Feature Amount is Performed]

Figure 27:
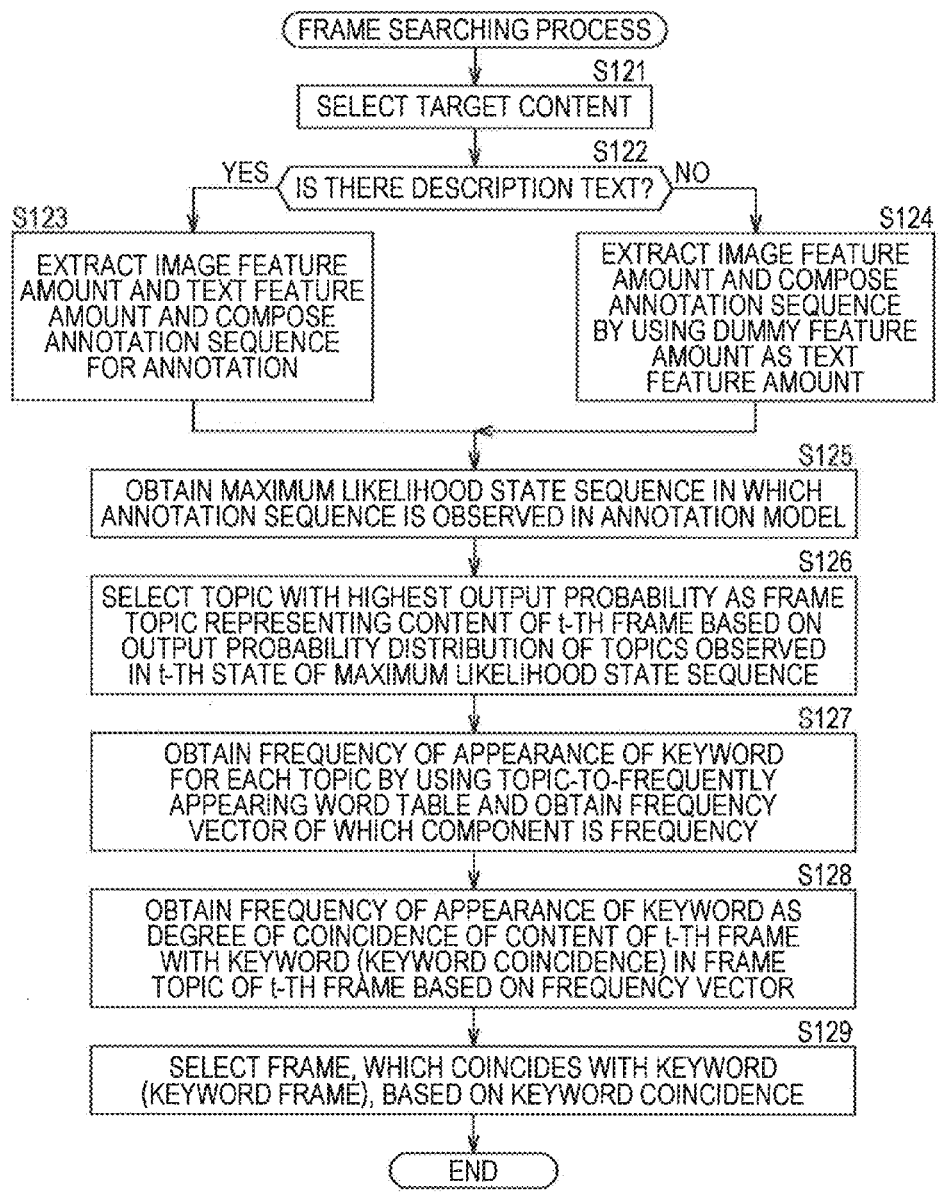
FIG. 27 is a flowchart illustrating the frame searching process by the searching device 15.

FIG. 27 is a flowchart illustrating the frame searching process by the frame searching device 15 in FIG. 10 when the dimension reduction of at least the text feature amount is performed.

The keyword supplying unit 55 supplies the search query including the keyword to the keyword coincidence calculating unit 53 according to the operation by the user, for example.

Also, the processes similar to those at the steps S101 to S105 in FIG. 26 are performed at steps S121 to S125.

That is, at the step S121, the feature amount extracting unit 51 (FIG. 10) selects the target content from among the content stored in the content storage unit 11 and obtains the same from the content storage unit 11, and the process shifts to the step S122.

At the step S122, the feature amount extracting unit 51 judges whether the target content is the content of which description text may be obtained or the content of which description text cannot be obtained.

At the step S122, when it is judged that the target content is the content of which description text may be obtained, the process shifts to the step S123 and the feature amount extracting unit 51 extracts the scene feature amount as the image feature amount for each frame and the word frequency information as the text feature amount of the description text from the target content.

Further, the feature amount extracting unit 51 performs the dimension reduction of the scene feature amount for each frame and the text feature amount and composes the multi-stream including the scene feature amount and the text feature amount after the dimension reduction as the annotation sequence. Then, the feature amount extracting unit 51 supplies the annotation sequence to the maximum likelihood state sequence calculating unit 52 and the process shifts from the step S123 to the step S125.

Also, at the step S122, when it is judged that the target content is the content of which description text cannot be obtained, the process shifts to the step S124 and the feature amount extracting unit 51 extracts the scene feature amount as the image feature amount for each frame from the target content.

Further, the feature amount extracting unit 51 performs the dimension reduction of the scene feature amount for each frame. Then, the feature amount extracting unit 51 composes the multi-stream including the scene feature amount after the dimension reduction and the text feature amount after the dimension reduction, which is the dummy data, as the annotation sequence by using the dummy data as the text feature amount after the dimension reduction, for example, and supplies the annotation sequence to the maximum likelihood state sequence calculating unit 52, and the process shifts from the step S124 to the step S125.

At the step S125, the maximum likelihood state sequence calculating unit 52 obtains the annotation model of the same category as that of the target content from among the annotation models stored in the annotation model storage unit 13.

Further, the maximum likelihood state sequence calculating unit 52 obtains the maximum likelihood state sequence in which the annotation sequence from the feature amount extracting unit 51 is observed in the annotation model obtained from the annotation model storage unit 13 and supplies the same to the keyword coincidence calculating unit 53, and the process shifts from the step S125 to a step S126.

At the step S126, the keyword coincidence calculating unit 53 sequentially sets the frame of the target content as the frame of interest and selects the latent topic suitable for representing the content of the frame of interest as the frame topic based on the output probability distribution of (the topic labels of) the latent topics observed in the state corresponding to the frame of interest of the maximum likelihood state sequence from the maximum likelihood state sequence calculating unit 52.

That is, when the t-th frame of the target content is the frame of interest, the keyword degree coincidence calculating unit 53 selects the latent topic with the highest output probability in the output probability distribution of (the topic labels of) the latent topics observed in the t-th state of the maximum likelihood state sequence, for example, as the frame topic of the t-th frame.

Thereafter, the process shifts from the step S126 to a step S127 and the keyword coincidence calculating unit 53 obtains the appearance frequency of (the frequently appearing word, which coincides with) the keyword included in the search query from the keyword supplying unit 54 for each latent topic based on the topic-to-frequently appearing word table (FIG. 23) and obtains the frequency vector of which component is the appearance frequency.

That is, when the number of latent topics of the LDA is D, the keyword coincidence calculating unit 53 detects the frequently appearing word, which coincides with the keyword, from the frequently appearing words of a first latent topic of the D latent topics in the topic-to-frequently appearing word table and obtains the appearance frequency of the frequently appearing word.

The keyword coincidence calculating unit 53 obtains the appearance frequency of the frequently appearing word, which coincides with the keyword, in the same manner also for second and subsequent latent topics and obtains a D-dimensional frequency vector of which components are the appearance frequencies of the frequently appearing words, which coincide with the keyword, obtained for the D latent topics.

Therefore, when the number of latent topics of the LDA is 10, for example, a ten-dimensional vector such as (10, 50, 0, 0, 2, 0, 0, 0, 4, 0), for example, is obtained as the frequency vector.

Herein, 0, which is a third component (from the left) of the frequency vector (10, 50, 0, 0, 2, 0, 0, 0, 4, 0), for example, represents that the appearance frequency of the frequently appearing word, which coincides with the keyword, of the frequently appearing words of the third latent topic is 0.

Meanwhile, when there is no frequently appearing word, which coincides with the keyword, in the frequently appearing words of a certain latent topic in the topic-to-frequently appearing word table, the appearance frequency of the frequently appearing word, which coincides with the keyword, is 0 for this latent topic.

When the frequency vector is obtained for the keyword, the process shifts from the step S127 to a step S128 and the keyword coincidence calculating unit 53 obtains the appearance frequency of the appearance of (the frequently appearing word, which coincides with) the keyword in (the latent topic, which is) the frame topic of the frame as the keyword coincidence for each frame of the target content based on the frequency vector.

That is, when the t-th frame of the target content is the frame of interest, the keyword coincidence calculating unit 53 obtains the appearance frequency of the appearance of the frequently appearing word, which coincides with the keyword, in the latent topic, which is the frame topic of the t-th frame, from the frequency vector as the keyword coincidence of the t-th frame.

For example, when the frame topic of the t-th frame is a d-th latent topic of the D latent topics, the appearance frequency, which is a d-th (d-dimensional) component of the D-dimensional frequency vector, is obtained as the keyword coincidence of the t-th frame.

When the keyword coincidence calculating unit 53 obtains the keyword coincidence for all of the frames of the target content, this supplies the keyword coincidence to the frame selecting unit 55 and the process shifts from the step S128 to a step S129.

At the step S129, the frame selecting unit 55 obtains the target content from the content storage unit 11 and selects the keyword frame, which coincides with the keyword (search query), from the target content based on the keyword coincidence from the keyword coincidence selecting unit 53.

That is, the frame selecting unit 55 selects the frames of which keyword coincidence from the keyword coincidence selecting unit 53 is higher than the search threshold from the target content as the keyword frames and outputs the sequence of the keyword frames in the chronological order as the keyword digest as in the case in FIG. 11, for example, and ends the frame searching process.

As described above, also when the frame searching device 15 extracts the image feature amount of each frame of the image of the target content, performs the dimension reduction, composes the annotation sequence by using the image feature amount after the dimension reduction, obtains the maximum likelihood state sequence in which the annotation sequence is observed in the annotation model, selects the latent topic represented by the topic label with high output probability in the state corresponding to the noted frame of interest out of the states of the maximum likelihood state sequence as the frame topic representing the content of the frame of interest, obtains the appearance frequency of the keyword in the frame topic based on the topic-to-frequently appearing word table, and selects the frame of interest with higher appearance frequency of the keyword as the keyword frame, it is possible to provide the application, which utilizes the annotation model that reproduces the keyword digest only of the keyword frames as in the case in FIG. 11.

[Display Controlling Process when Dimension Reduction of Text Feature Amount is Performed]

Figure 28:
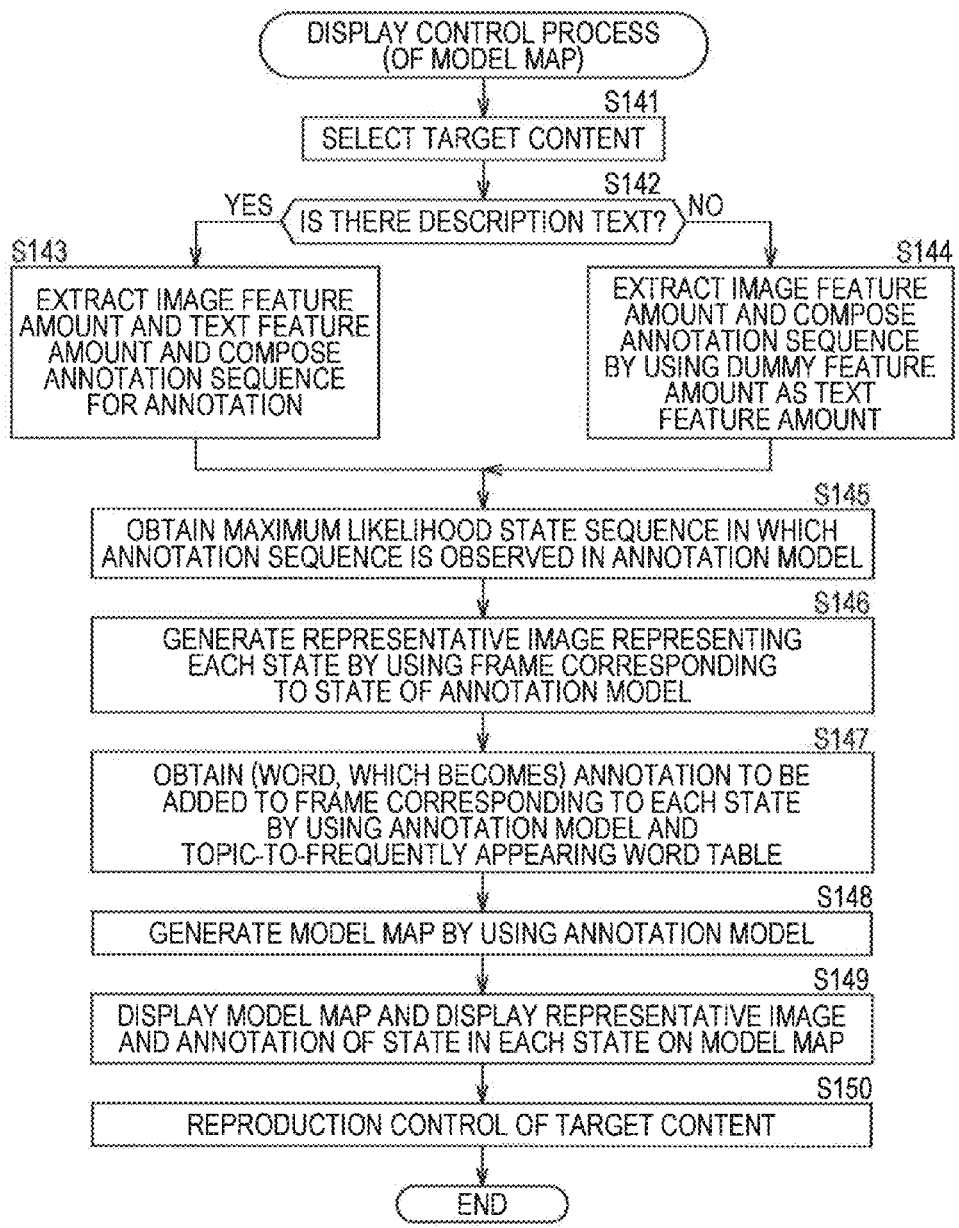
FIG. 28 is a flowchart illustrating the display control process of the model map by the display control device 16.

FIG. 28 is a flowchart illustrating the display control process of the model map by the display control device 16 in FIG. 15 when the dimension reduction of at least the text feature amount is performed.

At steps S141 to S145, the display control device 16 performs the processes similar to those at the steps S101 to S105 in FIG. 26.

That is, at the step S141, the feature amount extracting unit 61 (FIG. 15) selects the content of which reproduction is instructed according to the operation by the user from among the content stored in the content storage unit 11 as the target content to which the is to be added and obtains the same from the content storage unit 11, and the process shifts to the step S142.

At the step S142, the feature amount extracting unit 61 judges whether the target content is the content of which description text may be obtained or the content of which description text cannot be obtained.

At the step S142, when it is judged that the target content is the content of which description text may be obtained, the process shifts to the step S143 and the feature amount extracting unit 61 extracts the scene feature amount as the image feature amount for each frame and the word frequency information as the text feature amount of the description text from the target content.

Further, the feature amount extracting unit 61 performs the dimension reduction of the scene feature amount for each frame and the text feature amount and composes the multi-stream including the scene feature amount and the text feature amount after the dimension reduction as the annotation sequence. Then, the feature amount extracting unit 61 supplies the annotation sequence to the maximum likelihood state sequence calculating unit 62 and the process shifts from the step S143 to the step S145.

Also, at the step S142, when it is judged that the target content is the content of which description text cannot be obtained, the process shifts to the step S144 and the feature amount extracting unit 61 extracts the scene feature amount as the image feature amount for each frame from the target content.

Further, the feature amount extracting unit 61 performs the dimension reduction of the scene feature amount for each frame. Then, the feature amount extracting unit 61 composes the multi-stream including the scene feature amount after the dimension reduction and the text feature amount after the dimension reduction, which is the dummy data, as the annotation sequence by using the dummy data as the text feature amount after the dimension reduction, for example, and supplies the annotation sequence to the maximum likelihood state sequence calculating unit 62, and the process shifts from the step S144 to the step S145.

At the step S145, the maximum likelihood state sequence calculating unit 62 obtains the annotation model of the same category as that of the target content from among the annotation models (multi-stream HMMs) stored in the annotation model storage unit 13.

Further, the maximum likelihood state sequence calculating unit 62 obtains the maximum likelihood state sequence in which the annotation sequence from the feature amount extracting unit 61 is observed in the annotation model obtained from the annotation model storage unit 13 and supplies the same to the display controller 63, and the process shifts from the step S145 to a step S146.

At the step S146, the display controller 63 obtains the target content from the content storage unit 11 as at the step S56 in FIG. 20. Further, the display controller 63 generates the representative image of (the frame corresponding to) the state by using the frame of the target content corresponding to the state for each state of the annotation model stored in the annotation model storage unit 13 as at the step S56 in FIG. 20 and the process shifts from the step S146 to a step S147.

At the step S147, the display controller 63 performs the processes similar to those at the steps S106 and S107 in FIG. 26 by using the annotation model and the topic-to-frequently appearing word table and selects as (the word, which becomes) the annotation to be added to each frame of the target content to add the annotation to each frame of the target content.

That is, the display controller 63 sequentially sets the frame of the target content as the frame of interest and selects the latent topic suitable for representing the content of the frame of interest as the frame topic based on the output probability distribution of (the topic labels of) the latent topics observed in the state corresponding to the frame of interest of the maximum likelihood state sequence from the maximum likelihood state sequence calculating unit 62.

Further, the display controller 63 selects the frequently appearing word of the frame topic of the frame as the annotation to be added to the frame for each frame of the target content based on the topic-to-frequently appearing word table (FIG. 23).

Thereafter, the process shifts from the step S147 to a step S148 and the display controller 63 generates the model map (FIGS. 16 and 17) by using the annotation model (annotation model used for obtaining the maximum likelihood state sequence for the target content) stored in the annotation model storage unit 13 as at the step S58 in FIG. 20 and the process shifts to a step S149.

At the step S149, the display controller 63 displays the model map on the display as at the step S59 in FIG. 20 and further displays the representative image and the annotation of this state in each state on the model map, and the process shifts to a step S150.

At the step S150, the display controller 63 performs the reproduction control of the target content as at the step S60 in FIG. 20.

As described above, also when the display control device 16 extracts the image feature amount of each frame of the image of the target content, performs the dimension reduction, composes the annotation sequence by using the image feature amount after the dimension reduction, obtains the maximum likelihood state sequence in which the annotation sequence is observed in the annotation model, thereby obtaining the state corresponding to each frame of the target content, selects the latent topic represented by the topic label with high output probability in this state as the frame topic representing the content of the frame corresponding to the state, obtains the word with high appearance frequency in the frame topic as the annotation to be added to the frame of which content is represented by the frame topic based on the topic-to-frequently appearing word table, and displays the annotation to be added to the frame corresponding to the state for each state of the annotation model, the user may have a look at the annotations added to the target content as in the case in FIG. 20 and it is possible to provide the application, which utilizes the annotation that starts reproducing the frame corresponding to the state when the state on the model map in which the annotation is displayed is specified.

According to the annotation model obtained by performing the dimension reduction of the text feature amount by using the parameter of the LDA (basis space data of the basis space for text) and performing the learning by using the annotation sequence including the topic label, which is the text feature amount after the dimension reduction, as described above, (the frequently appearing word, which becomes) the annotation is added to (each frame of) the target content through the latent topic of the LDA in the display control device 16.

In this manner, when the annotation is added to the target content through the latent topic, the annotation added to the target content may be displayed for each latent topic in addition to be displayed for each state of the annotation model in the display format and the like using the above-described model map (FIGS. 16 and 17).

Figure 29:
FIG. 29 is a view illustrating a display example in which the annotations added to the target content are displayed for each latent topic.

FIG. 29 is a view illustrating a display example in which the annotations added to the target content are displayed for each latent topic.

That is, FIG. 29 illustrates an example of a topic list in which rectangular topic columns corresponding to the latent topics of the LDA are arranged in a two-dimensional tabular format.

In the topic list, the topic columns as many as the latent topics of the LDA are arranged in a lattice manner and one latent topic is associated with each topic column.

Then, the frequently appearing words of the latent topic corresponding to the topic column (the latent topic associated with the topic column) are displayed so as to be arranged in descending order of the appearance frequency, for example, in the topic column.

Meanwhile, in FIG. 29, the number of characters of the frequently appearing words displayed in the topic column is limited to 20 as a predetermined number of characters because of a size of the topic column.

Also, when a certain topic column in the topic list is noted, the frequently appearing word is displayed in the noted topic column of interest only when the frame of which frame topic is the latent topic corresponding to the topic column of interest is present in the target content.

Therefore, the frequently appearing word is not displayed in the topic column corresponding to the latent topic, which is not selected as the frame topic of any frame of the target content.

In FIG. 29, although the frequently appearing word is not displayed in left upper and right upper topic columns and the like, for example, the left upper and right upper topic columns in which the frequently appearing word is not displayed in this manner represent that the frame of which frame topic is the latent topic corresponding to the topic column is not present in the target content.

Figure 30:
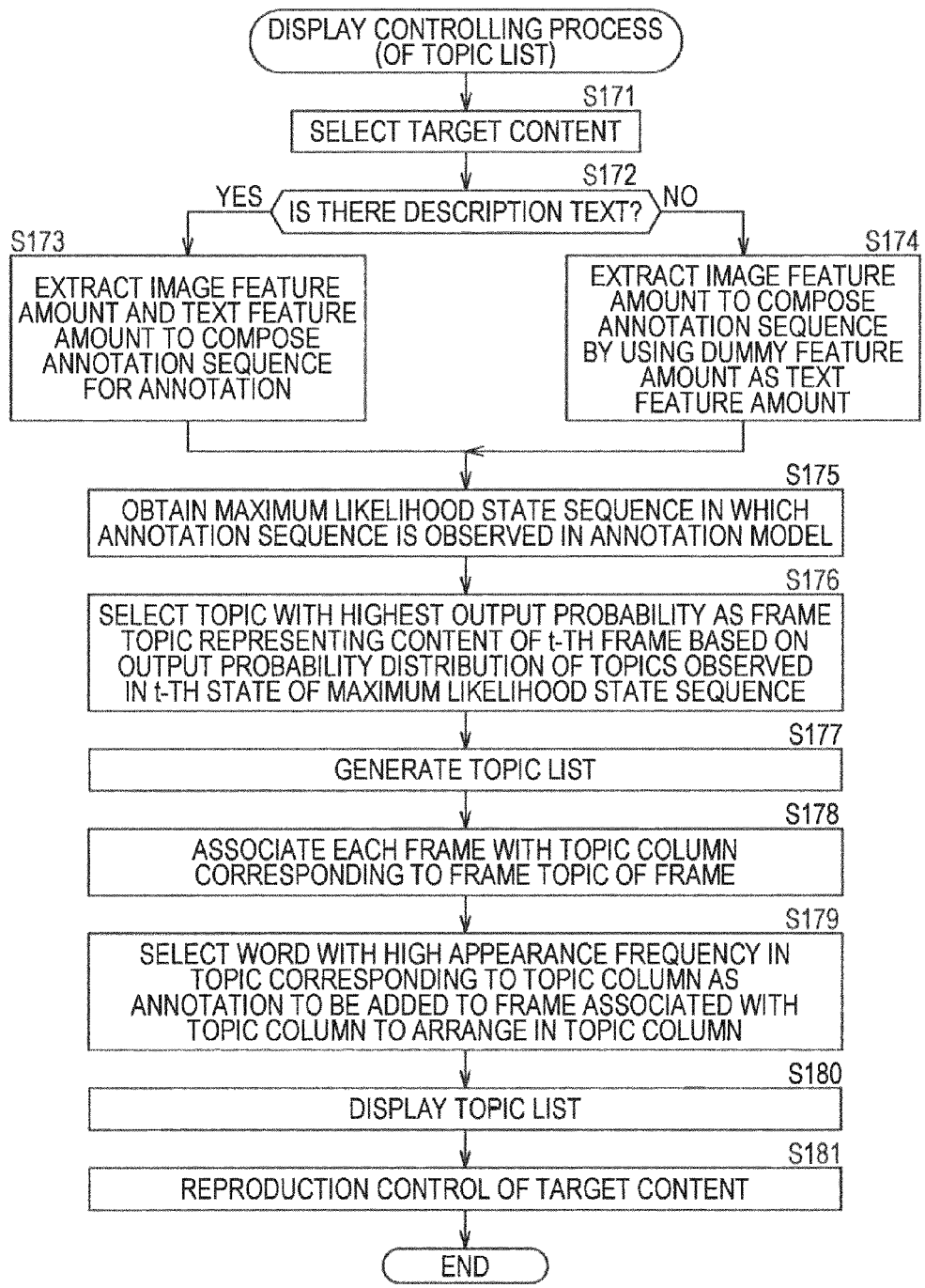
FIG. 30 is a flowchart illustrating the display control process of a topic list by the display control device 16.

FIG. 30 is a flowchart illustrating a display control process of the topic list by the display control device 16 in FIG. 15.

At steps S171 to S176, the display control device 16 performs the processes similar to those at the steps S101 to S106 in FIG. 26.

That is, at the step S171, the feature amount extracting unit 61 (FIG. 15) selects the content of which reproduction is instructed according to the operation by the user as the target content to which the annotation is to be added from among the content stored in the content storage unit 11 and obtains the same from the content storage unit 11, and the process shifts to the step S172.

At the step S172, the feature amount extracting unit 61 judges whether the target content is the content of which description text may be obtained or the content of which description text cannot be obtained.

At the step S172, when it is judged that the target content is the content of which description text may be obtained, the process shifts to the step S173 and the feature amount extracting unit 61 extracts the scene feature amount as the image feature amount for each frame and the word frequency information as the text feature amount of the description text from the target content.

Further, the feature amount extracting unit 61 performs the dimension reduction of the scene feature amount for each frame and the text feature amount and composes the multi-stream including the scene feature amount and the text feature amount after the dimension reduction as the annotation sequence. Then, the feature amount extracting unit 61 supplies the annotation sequence to the maximum likelihood state sequence calculating unit 62 and the process shifts from the step S173 to the step S175.

Also, at the step S172, when it is judged that the target content is the content of which description text cannot be obtained, the process shifts to the step S174 and the feature amount extracting unit 61 extracts the scene feature amount as the image feature amount for each frame from the target content.

Further, the feature amount extracting unit 61 performs the dimension reduction of the scene feature amount for each frame. Then, the feature amount extracting unit 61 composes the multi-stream including the scene feature amount after the dimension reduction and the text feature amount after the dimension reduction, which is the dummy data, as the annotation sequence by using the dummy data as the text feature amount after the dimension reduction, for example, and supplies the annotation sequence to the maximum likelihood state sequence calculating unit 62, and the process shifts from the step S174 to the step S175.

At the step S175, the maximum likelihood state sequence calculating unit 62 obtains the annotation model of the same category as that of the target content from among the annotation models (multi-stream HMMs) stored in the annotation model storage unit 13.

Further, the maximum likelihood state sequence calculating unit 62 obtains the maximum likelihood state sequence in which the annotation sequence from the feature amount extracting unit 61 is to be observed in the annotation model obtained from the annotation model storage unit 13 and supplies the same to the display controller 63, and the process shifts from the step S175 to the step S176.

At the step S176, the display controller 63 sequentially sets the frame of the target content as the frame of interest and selects the latent topic with the highest output probability as the frame topic based on the output probability distribution of (the topic labels of) the latent topics observed in the state corresponding to the frame of interest of the maximum likelihood state sequence from the maximum likelihood state sequence calculating unit 62, and the process shifts to a step S177.

At the step S177, the display controller 63 generates the topic list including the topic column corresponding to each latent topic of the LDA (FIG. 29) and the process shifts to a step S178.

At the step S178, the display controller 63 associates each topic column of the topic list with the frame of the target content of which frame topic is the latent topic corresponding to the topic column and the process shifts to a step S179.

At the step S179, the display controller 63 selects the frequently appearing word of the latent topic corresponding to the topic column as the annotation to be added to the frame associated with the topic column based on the topic-to-frequently appearing word table (FIG. 23) and arranges the same in the topic column.

Thereafter, the process shifts from the step S179 to a step S180 and the display controller 63 displays the topic list on the display, and the process shifts to a step S181.

At the step S181, the display controller 63 performs the reproduction control of the target content.

That is, when the topic column on the topic list is specified by the user, for example, the display controller 63 starts reproducing the frame associated with the topic column.

Therefore, the user may look at the word as the annotation displayed in the topic column to understand a summary of the content of the frame associated with the topic column, and if the user is interested in the same, the user may specify the topic column, thereby reproducing the frame associated with the topic column.

Meanwhile, in the display control device 16, the display format of the annotation added to the target content may be switched according to the operation by the user and the like.

That is, the display control device 16 may create both of the model map and the topic list, for example, and switch the display format of the annotation between the display format using the model map and the display format using the topic list.

Figure 32:
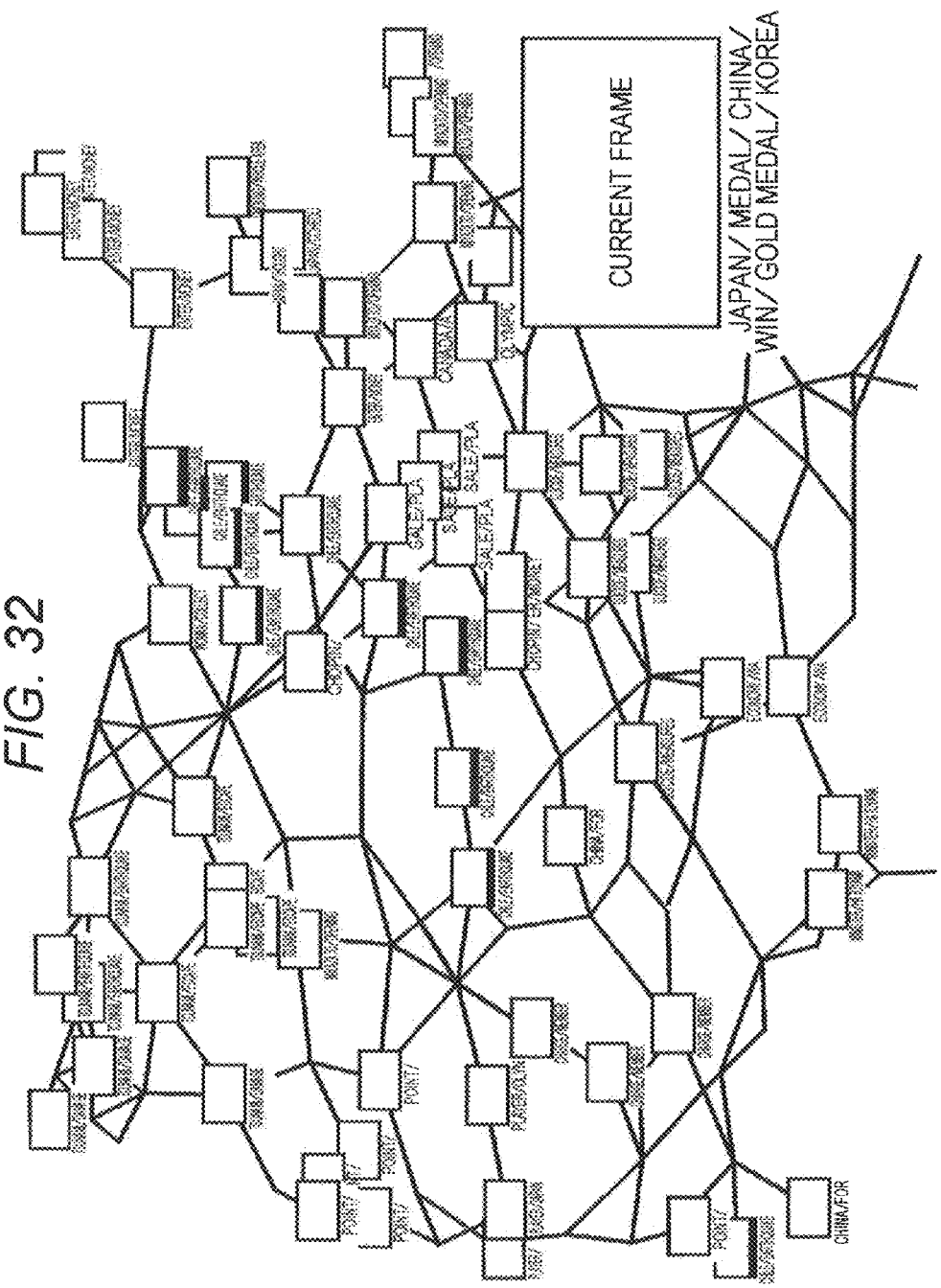
FIG. 32 is a view illustrating an example of the display format of the annotation using the model map.

FIGS. 31 and 32 are views illustrating switch of the display formats of the annotation.

That is, FIG. 31 is a view illustrating an example of the display format of the annotation using the topic list.

The user may look at the word as the annotation displayed in the topic column in the topic list to understand the summary of the content of the frame associated with the topic column, and if the user is interested in the same, the user may specify the topic column to select the latent topic corresponding to the topic column as an interesting topic.

The display control device 16 may display the topic column corresponding to the latent topic selected as the interesting topic (hereinafter, also referred to as an interesting topic column) with emphasis when the interesting topic is selected by the user.

In FIG. 31, (the topic column, which becomes) the interesting topic column is emphasized with a bold line under the word as the annotation arranged in the interesting topic column.

Meanwhile, a method of emphasizing the interesting topic column is not limited to the method of drawing the underline. That is, it is possible to emphasize the interesting topic column by displaying the same with a specific color different from that of another topic column (such as red) and the like.

Although only the word as the annotation is displayed in the topic column of the topic list in FIG. 31 (also in FIG. 29), in addition to this, it is possible to generate the representative image representing the frame associated with the topic column to display, for example, in the topic column.

FIG. 32 is a view illustrating an example of the display format of the annotation using the model map.

That is, FIG. 32 illustrates (the display of) the model map switched from the display of the topic list in FIG. 31.

In the model map, only the state in which the corresponding frame (frame of the target content) is present out of the states of the annotation model is displayed in the rectangular shape as illustrated in FIGS. 18 and 19. Then, in the rectangle representing the state in which the corresponding frame is present, the representative image of the frame corresponding to the state is displayed and the word as the annotation added to the frame corresponding to the state is further displayed under the same.

Then, as for the state corresponding to the frame currently reproduced (reproduced frame), the image of the reproduced frame is displayed so as to be larger than the representative image in place of the representative image and the annotation is also displayed so as to be larger than that in another state.

In the display control device 16, as for the model map switched from the display of the topic list, (the rectangle representing) the state corresponding to the frame associated with the interesting topic column of the topic list), the representative image in the rectangle, the annotation and the like) may be displayed with emphasis.

Herein, in FIG. 32, the state corresponding to the frame associated with the interesting topic column on the model map is emphasized with the bold line drawn on a lower part of the rectangle representing the state.

As described above, by displaying the state corresponding to the frame associated with the interesting topic column of the topic list with emphasis on the model map switched from the display of the topic list, the user may recognize at one view the state corresponding to the frame associated with the interesting topic, that is, the frame of which content is interesting for the user on the map by selecting the topic column, which is the interesting topic column, in the topic list and thereafter switching to the model map.

Meanwhile, when a certain state is selected by the user on the model map, the display control device 16 may detect another state corresponding to the frame of the frame topic, which coincides with the frame topic of the frame corresponding to a selected state, which is the state selected by the user, and display the same with emphasis with the selected state.

[Fourth Configuration Example of Feature Amount Extracting Unit 21]

Figure 33:
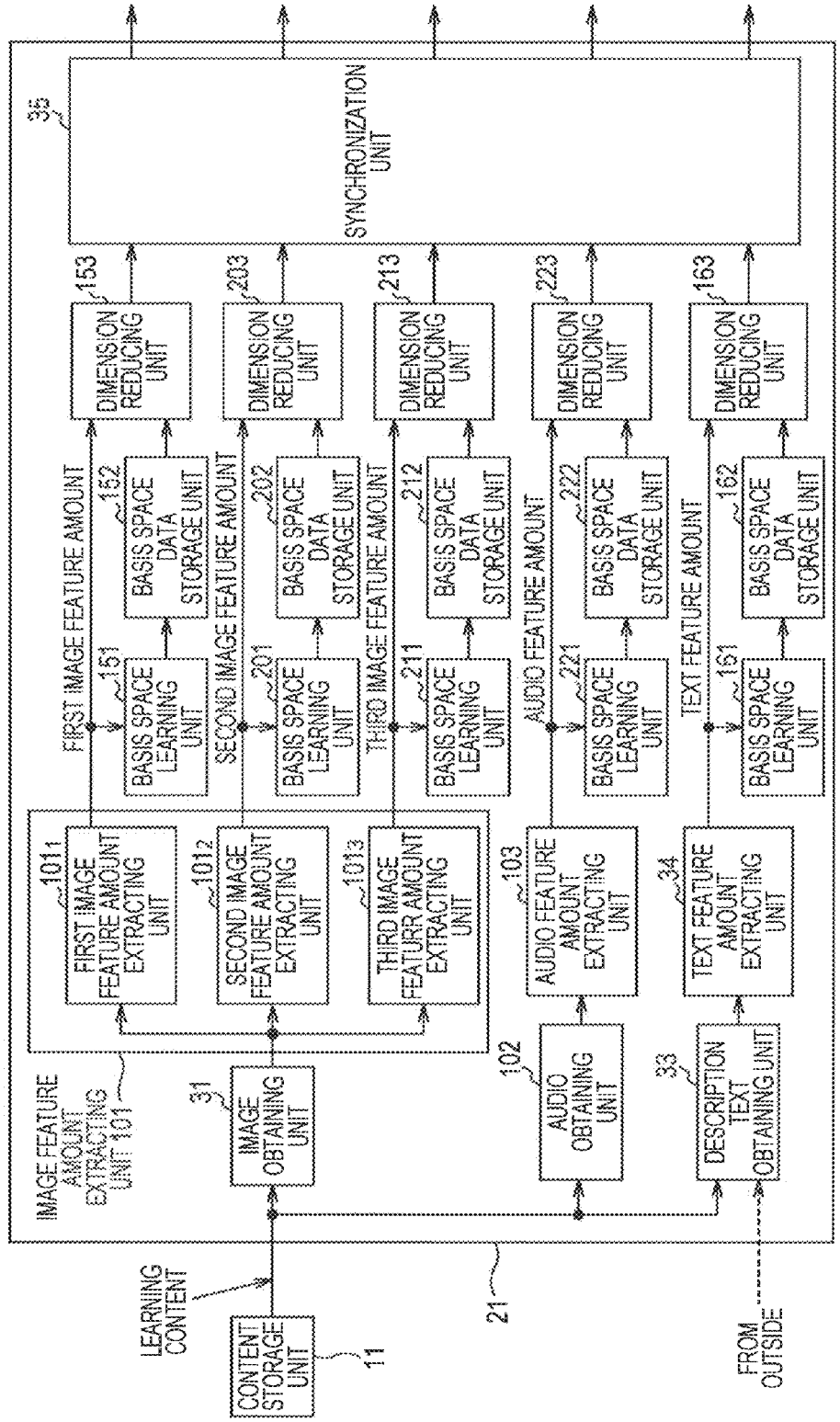
FIG. 33 is a block diagram illustrating a fourth configuration example of the feature amount extracting unit 21.

FIG. 33 is a block diagram illustrating a fourth configuration example of the feature amount extracting unit 21 in FIG. 2.

Meanwhile, in FIG. 33, the same reference sign is assigned to a part corresponding to that in FIG. 21 or 22 and the description thereof is hereinafter appropriately omitted.

The feature amount extracting unit 21 in FIG. 33 is the same as that in FIG. 21 in that this includes the image obtaining unit 31, the image feature amount extracting unit 101, the description text obtaining unit 33, the text feature amount extracting unit 34, the synchronization unit 35, the audio obtaining unit 102, and the audio feature amount extracting unit 103.

Further, the feature amount extracting unit 21 in FIG. 33 is the same as that in FIG. 22 in that this includes the basis space learning unit 151, the basis space data storage unit 152, the dimension reducing unit 153, the basis space learning unit 161, the basis space data storage unit 162, and the dimension reducing unit 153.

Then, the feature amount extracting unit 21 in FIG. 33 is different from that in FIGS. 21 and 22 in that a basis space learning unit 201, a basis space data storage unit 202, a dimension reducing unit 203, a basis space learning unit 211, a basis space data storage unit 212, a dimension reducing unit 213, a basis space learning unit 221, a basis space data storage unit 222, and a dimension reducing unit 223 are newly provided.

The second image feature amount of the learning content is supplied from the image feature amount extracting unit 101 to the basis space learning unit 201.

The basis space learning unit 201 obtains the code book and the like as the basis space data of the basis space for image of which dimension is lower than the dimension of the second image feature amount for mapping the second image feature amount by using the second image feature amount from the image feature amount extracting unit 101 and supplies the same to the basis space data storage unit 202 as in the case of the basis space learning unit 151, for example.

The basis space data storage unit 202 stores the basis space data from the basis space learning unit 201.

The second image feature amount of the learning content is supplied from the image feature amount extracting unit 101 to the dimension reducing unit 203.

The dimension reducing unit 203 performs the vector quantization and the like as the dimension reduction to reduce the dimension of the second image feature amount from the image feature amount extracting unit 101 based on the basis space data stored in the basis space data storage unit 202 and supplies the second image feature amount after the dimension reduction to the synchronization unit 35 as in the case of the dimension reducing unit 153, for example.

The third image feature amount of the learning content is supplied from the image feature amount extracting unit 101 to the basis space learning unit 211.

The basis space learning unit 211 obtains the code book and the like as the basis space data of the basis space for image of which dimension is lower than the dimension of the third image feature amount for mapping the third image feature amount by using the third image feature amount from the image feature amount extracting unit 101 and supplies the same to the basis space data storage unit 212 as in the case of the basis space learning unit 151, for example.

The basis space data storage unit 212 stores the basis space data from the basis space learning unit 211.

The third image feature amount of the learning content is supplied from the image feature amount extracting unit 101 to the dimension reducing unit 213.

The dimension reducing unit 213 performs the vector quantization and the like as the dimension reduction to reduce the dimension of the third image feature amount from the image feature amount extracting unit 101 based on the basis space data stored in the basis space data storage unit 212 and supplies the third image feature amount after the dimension reduction to the synchronization unit 35 as in the case of the dimension reducing unit 153, for example.

The audio feature amount of the learning content is supplied from the audio feature amount extracting unit 103 to the basis space learning unit 221.

The basis space learning unit 221 obtains the code book and the like as the basis space data of the basis space for audio of which dimension is lower than the dimension of the audio feature amount for mapping the audio feature amount by using the audio feature amount from the audio feature amount extracting unit 103 and supplies the same to the basis space data storage unit 222 as in the case of the basis space learning unit 151, for example.

The basis space data storage unit 222 stores the basis space data from the basis space learning unit 221.

The audio feature amount of the learning content is supplied from the audio feature amount extracting unit 103 to the dimension reducing unit 223.

The dimension reducing unit 223 performs the vector quantization and the like as the dimension reduction to reduce the dimension of the audio feature amount from the audio feature amount extracting unit 103 based on the basis space data stored in the basis space data storage unit 222 and supplies the audio feature amount after the dimension reduction to the synchronization unit 35 as in the case of the dimension reducing unit 153, for example.

Although the annotation sequence is composed by using the first to third image feature amounts, the audio feature amount, and the text feature amount as is in FIG. 21, the dimension reduction of the first to third image feature amounts, the audio feature amount, and the text feature amount is performed and the annotation sequence is composed of the first to third image feature amounts, the audio feature amount, and the text feature amount after the dimension reduction to be used in the learning of the annotation model in FIG. 33.

Figure 34:
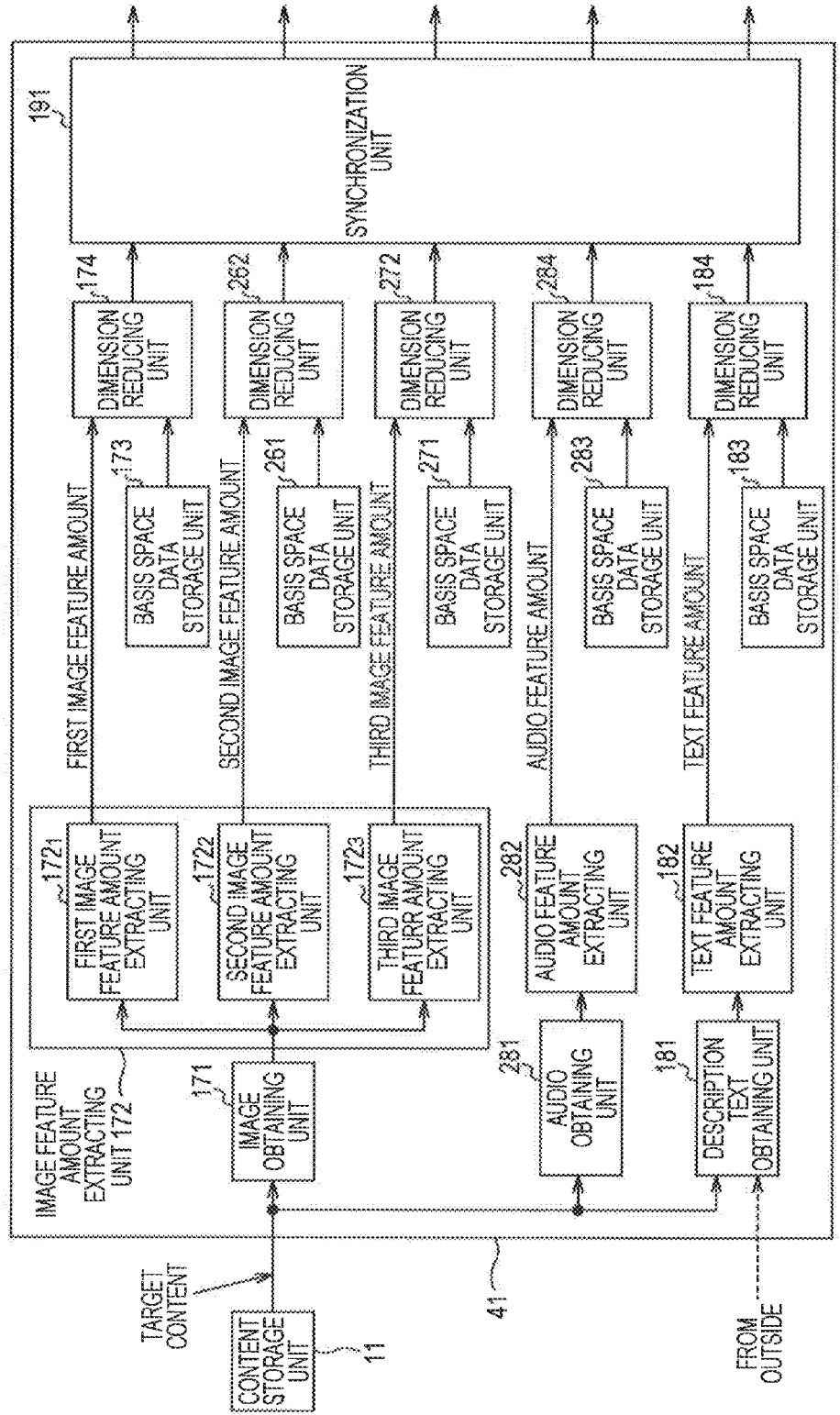
FIG. 34 is a block diagram illustrating a configuration example of the feature amount extracting unit 41 of the annotation adding device 14.

FIG. 34 is a block diagram illustrating a configuration example of the feature amount extracting unit 41 of the annotation adding device 14 in FIG. 8 (feature amount extracting unit 51 of the frame searching device 15 (FIG. 10) and the feature amount extracting unit 61 of the display control device 16 (FIG. 15)) when the feature amount extracting unit 21 of the learning device 12 is composed as illustrated in FIG. 33.

In FIG. 34, the feature amount extracting unit 41 of the annotation adding device 14 (FIG. 8) includes the image obtaining unit 171, the image feature amount extracting unit 172, the basis space data storage unit 173, the dimension reducing unit 174, the description text obtaining unit 181, the text feature amount extracting unit 182, the basis space data storage unit 183, the dimension reducing unit 184, the synchronization unit 191, a basis space data storage unit 261, a dimension reducing unit 262, a basis space data storage unit 271, a dimension reducing unit 272, an audio obtaining unit 281, an audio feature amount extracting unit 282, a basis space data storage unit 283, and a dimension reducing unit 284.

Further, the image feature amount extracting unit 172 includes a first image feature amount extracting unit 172$_1$, a second image feature amount extracting unit 172$_2$, and a third image feature amount extracting unit 172$_3$.

In the feature amount extracting unit 41 in FIG. 34, the basis space data storage unit 173 stores the basis space data obtained by the basis space learning unit 151 in FIG. 33, the basis space data storage unit 183 stores the basis space data obtained by the basis space learning unit 161 in FIG. 33, the basis space data storage unit 261 stores the basis space data obtained by the basis space learning unit 201 in FIG. 33, the basis space data storage unit 271 stores the basis space data obtained by the basis space learning unit 211 in FIG. 33, and the basis space data storage unit 283 stores the basis space data obtained by the basis space learning unit 221 in FIG. 33, respectively.

Then, in the image obtaining unit 171, the first image feature amount extracting unit 172$_1$, the second image feature amount extracting unit 172$_2$, the third image feature amount extracting unit 172$_3$, the dimension reducing unit 174, the description text obtaining unit 181, the text feature amount extracting unit 182, the dimension reducing unit 184, the synchronization unit 191, the dimension reducing unit 262, the dimension reducing unit 272, the audio obtaining unit 281, the audio feature amount extracting unit 282, and the dimension reducing unit 284, the processes similar to those of the image obtaining unit 31, the first image feature amount extracting unit 102$_1$, the second image feature amount extracting unit 102$_2$, the third image feature amount extracting unit 102$_3$, the dimension reducing unit 153, the description text obtaining unit 33, the text feature amount extracting unit 34, the dimension reducing unit 163, the synchronization unit 35, the dimension reducing unit 203, the dimension reducing unit 213, the audio obtaining unit 102, the audio feature amount extracting unit 103, and the dimension reducing unit 223 in FIG. 33 are performed for the target content, and according to this, the annotation sequence including the first to third image feature amounts, the audio feature amount, and the text feature amount after the dimension reduction is composed.

However, as for the target content of which description text cannot be obtained, the annotation sequence is composed by using the dummy data as the topic label as the text feature amount after the dimension reduction.

Second Embodiment

Figure 35:
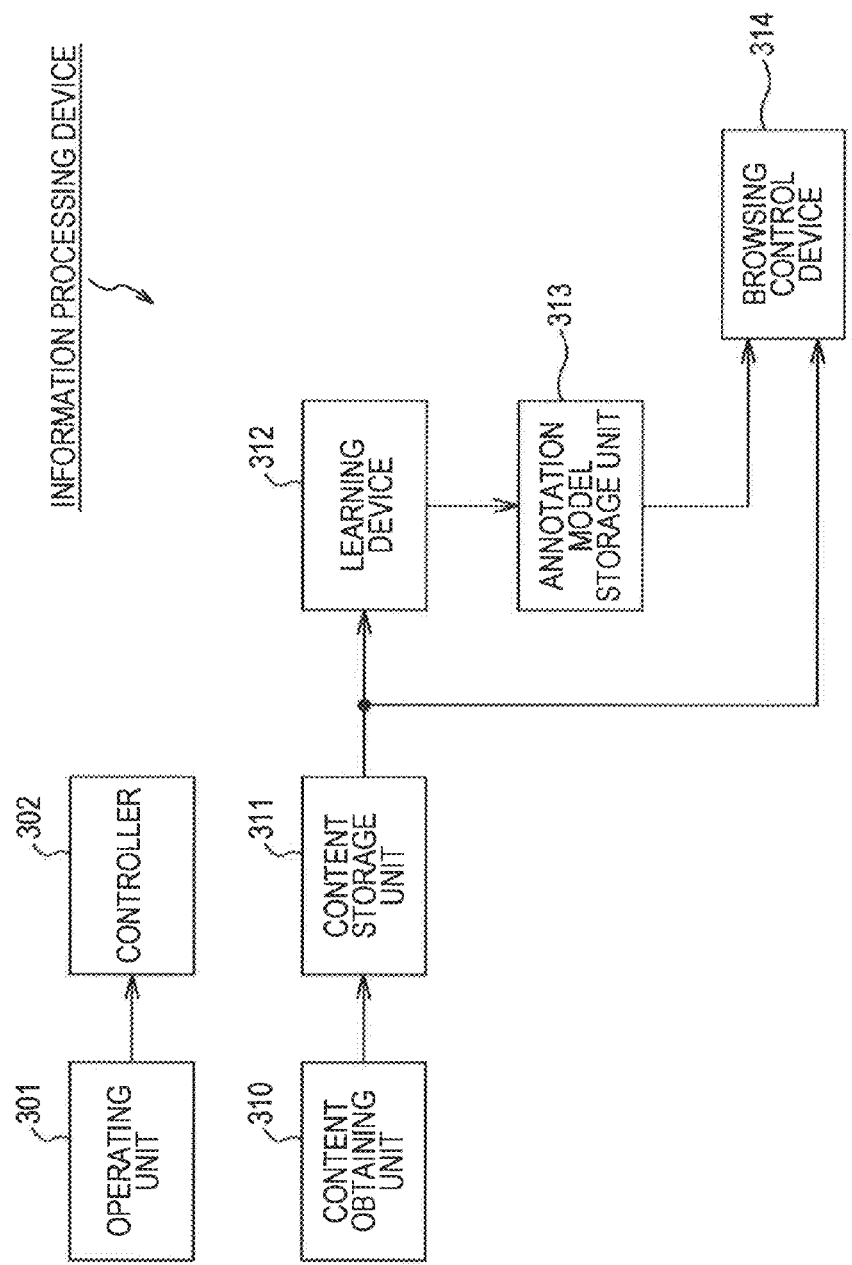
FIG. 35 is a block diagram illustrating a configuration example of another embodiment of the recorder to which the information processing device of the present invention is applied.

Another Embodiment of Recorder to which Information Processing Device of Present Invention is Applied FIG. 35 is a block diagram illustrating a configuration example of another embodiment of a recorder to which an information processing device of the present invention is applied.

The recorder (hereinafter, also referred to as a browsing recorder) in FIG. 35 is a HD (hard disk) recorder and the like, for example, which may record (record) (store) various content such as a television broadcast program, content provided through a network such as the Internet, and content taken by a video camera and the like.

That is, in FIG. 35, the browsing recorder includes an operating unit 301, a controller 302, a content obtaining unit 310, a content storage unit 311, a learning device 312, an annotation model storage unit 313, and a browsing control device 314.

The operating unit 301 is a button provided on a casing of the browsing recorder in FIG. 35, a remote commander to remotely control the browsing recorder and the like, which are operated by a user to supply an operation signal corresponding to the operation to the controller 302.

The controller 302 controls units from the content obtaining unit 310 to the browsing controller 314 according to the operation of the operating unit 301 and the like.

The content obtaining unit 310 obtains the content including an image such as the television broadcast program and supplies the same to the content storage unit 311.

That is, the content obtaining unit 310 may be composed of a tuner, an STB (set top box), and a network I/F (interface) such as an NIC (network interface card), for example, and in this case, the content is obtained through a transmitting medium not illustrated such as ground digital broadcasting, satellite digital broadcasting, and the network such as a CATV network and the Internet.

Also, the content obtaining unit 310 may be composed of a drive for driving a recording medium and the like, for example, and in this case, the content is obtained from the recording medium such as a hard disk embedded in the video camera, a semiconductor memory such as a memory card removed from the video camera, a tape recording medium, and a disk recording medium, for example.

Meanwhile, hereinafter, the content obtaining unit 310 is composed of the tuner, which receives the television broadcast program (broadcast program) in order to simplify the description.

The content storage unit 311 stores (records) the content from the content obtaining unit 310. To store the content in the content storage unit 311 is to record the content and the recorded content (content stored in the content storage unit 311) is reproduced according to the operation of the operating unit 301 by the user, for example.

The learning device 312 is composed in the same manner as a learning device 12 in FIG. 1 and organizes the content stored in the content storage unit 311 in a self-organizing manner in a predetermined feature amount space to perform learning (statistical learning) to obtain a model representing a structure (time-space structure) of the content.

That is, the learning device 312 selects the content of which description text describing a content of the image of the content may be obtained out of the content stored in the content storage unit 311 as learning content used for the learning an annotation model.

Further, the learning device 312 extracts an image feature amount of each frame of the image of the learning content and extracts word frequency information regarding a frequency of appearance of each word in the description text describing the content of the image of the learning content as a text feature amount of the description text.

Then, the learning device 312 composes an annotation sequence, which is a multi-stream including the image feature amount and the text feature amount extracted from the learning content, and learns the annotation model, which is the multi-stream HMM, by using the annotation sequence.

When the learning device 312 learns the annotation model, this supplies the learned annotation model to the annotation model storage unit 313.

The annotation model storage unit 313 stores the annotation model supplied from the learning device 312.

The browsing control device 314 extracts a scene, which is a group of one or more temporally continuous frames, from target content from which the scene is to be extracted out of the content stored in the content storage unit 311 by using the annotation model stored in the annotation model storage unit 313 and displays representative images of the scenes so as to be arranged in order of display time (reproduction time).

That is, the browsing control device 314 divides the target content into the scenes and displays the representative images of the frames, which compose each scene, and the annotations in order of display time such that the user may rapidly understand the content of the target content.

Also, the browsing control device 314 detects the scene including the frame (keyword frame), the content of which coincides with a keyword input by the user by the operation of the operating unit 301, from the target content and displays the representative images of the frames, which compose each scene, in order of display time such that the user may rapidly search an interesting scene from the target content.

[Summary of Process Performed by Browsing Recorder]

FIGS. 36 to 39 are views illustrating a summary of a process performed by the browsing recorder in FIG. 35.

Herein, there is a program composed of a plurality of corners in the program. For example, a news program of the television broadcast is composed of corners (scenes) of a plurality of news topics such as economic news, social news, sports news and the like.

Regarding such news program, the recorder may present (display) a broadcast start time, a broadcast end time, a performer, a summary of the content of the program by obtaining EPG (electronic program guide) data, for example.

However, the recorder cannot present a news topic, which comes up at a certain time on the news program on a certain channel (broadcast station) of a certain day, for example, by using the EPG data.

Also, the recorder may display whether the program is already recorded on the EPG in a browser embedded in the recorder and start reproducing the recorded program from the start of the program, so to say, cue up the same, when the recorded program on the EPG is specified.

However, the recorder cannot cue up a predetermined corner of the recorded program.

As described above, the recorder handles the program not in a corner unit but in a so-called program unit, so that this can display the summary of "an entire" program and cue up the program, but this cannot display the summary of each corner of the program nor cue up the corner.

It is convenient to provide the user a method of browsing the program (hereinafter, also referred to as scene browsing) in which the program is sectioned into the scenes with the same content such as the corner and the summary of the scene may be recognized for each scene.

It is considered that the user may perform the scene browsing by processing meta data such as the start time and the end time, the performer, and the summary of the content of the corner for each corner of the program distributed by a program meta data service, which is a paid service described above, by the recorder, but such a recorder is not proposed.

Also, as a method of cueing up the corner desired by the user of the recorded program by the recorder, there is a method of allowing the user to input a word representing the content of the desired corner as the keyword, detecting the frame in which a caption including the keyword input by the user is displayed from the recorded program, and starting reproducing from the frame.

However, the method of detecting the frame in which the caption including the keyword input by the user is displayed from the recorded program cannot be applied to the program without the caption. Further, even when the caption is displayed in the corner desired by the user, (the frame of) the corner desired by the user is not detected when the keyword input by the user is not included in the caption.

Also, a method of cueing up the corner desired by the user by detecting the keyword input by the user from audio of the recorded program and starting reproducing from the frame in which the audio including the keyword is spoken by the recorder is considered.

However, in the method of searching the keyword input by the user from the audio of the recorded program, (the frame of) the corner desired by the user is not detected when the keyword input by the user is not spoken in the audio of the corner desired by the user.

The browsing recorder in FIG. 35 allows the user to perform the scene browsing in which the summary of the scene, which composes the content, may be easily recognized by extracting the scene, which is a group of one or more temporally continuous frames, from the target content from which the scene is to be extracted by using the above-described annotation model and displaying the representative images of the scenes so as to be arranged in chronological order.

That is, the browsing recorder performs the learning of the annotation model, extraction of the scene from the target content by using the annotation model, and display control to display the representative images of the scenes so as to be arranged in chronological order.

Figure 36:
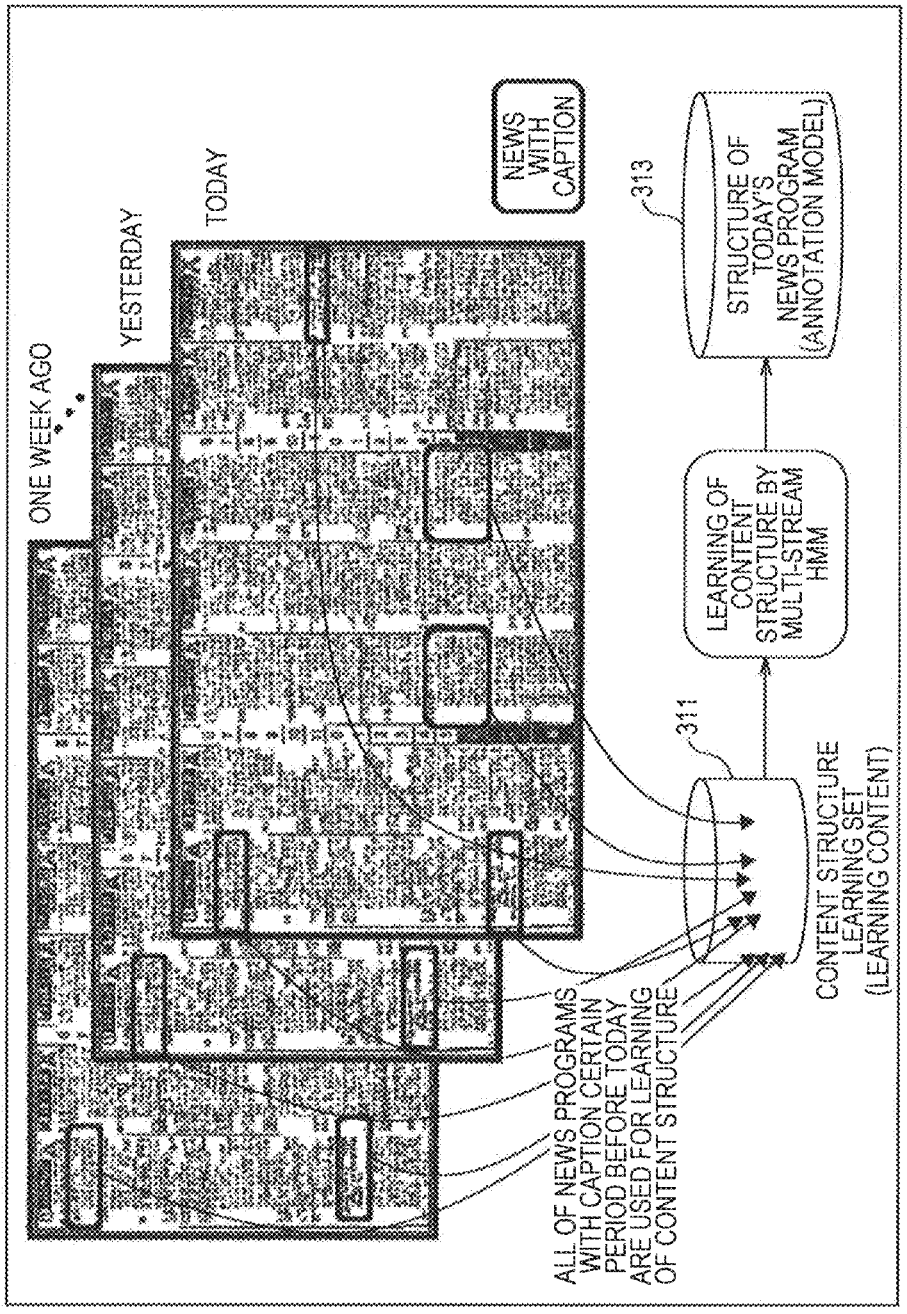
FIG. 36 is a view illustrating a summary of the learning of the annotation model by a browsing recorder.

FIG. 36 is a view illustrating a summary of the learning of the annotation model by the browsing recorder in FIG. 35.

In the browsing recorder, the controller 302 sets a genre of the content of which scene browsing is performed as a browsing genre.

Herein, the controller 302 sets the browsing genre according to the operation of the operating unit 301 by the user, for example. Herein, the news as the genre is set as the browsing genre, for example.

In the browsing recorder, the content obtaining unit 310 recognizes the genre of each program from the EPG data, for example, and records the program of which genre is the news, which is the browsing genre. That is, according to this, the news program of which genre coincides with the browsing genre is stored in the content storage unit 311.

In the browsing recorder, the learning device 312 reads the recorded program of which genre is the news, which is the browsing genre, including the text of the caption out of the recorded programs (broadcasted and) recorded within a certain past period stored in the content storage unit 311 as the learning content used for learning the annotation model and performs the learning (content structure learning) of the annotation model, which is the multi-stream HMM, by using the learning content as in the case of the learning device 12 in FIG. 1.

Then, the learning device 312 supplies the learned annotation model to the annotation model storage unit 313 for storage.

Figure 37:
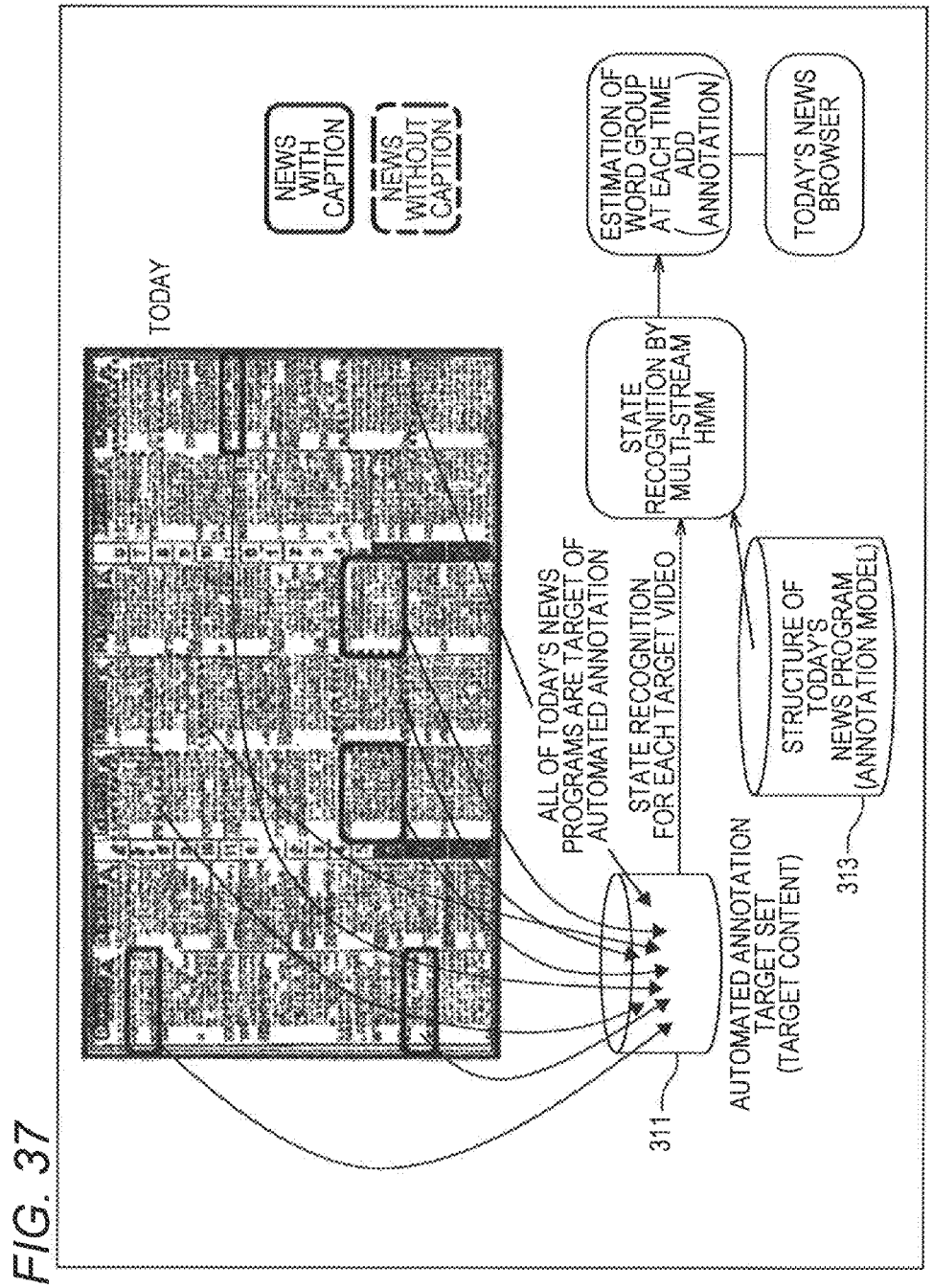
FIG. 37 is a view illustrating a summary of extraction of a scene from the target content by using the annotation model by the browsing recorder.

FIG. 37 is a view illustrating a summary of the extraction of the scene from the target content by using the annotation model by the browsing recorder in FIG. 35.

In the browsing recorder, the browsing control device 314 reads the recorded program of which genre is the news, which is the browsing genre, out of the recorded programs (broadcasted and) recorded within a certain past period stored in the content storage unit 311 as the target content regardless of presence of the text of the caption and performs an annotation adding process to add the annotation to the target content by using the annotation model stored in the annotation model storage unit 313 as in the case of the annotation adding device 14 in FIG. 1.

That is, the browsing control device 314 composes the annotation sequence for the target content and obtains a maximum likelihood state sequence in which the annotation sequence of the target content is observed in the annotation model (multi-stream HMM) stored in the annotation model storage unit 313 (performs state recognition).

Further, the browsing control device 314 adds (the word, which becomes) the annotation to each frame (each time) of the target content based on the maximum likelihood state sequence in which the annotation sequence of the target content is observed.

Then, the browsing control device 314 extracts a group of one or more temporally continuous frames to which the same annotation is added as the scene from the target content, thereby sectioning the target content into scenes.

Herein, the frame to which the same annotation as that of a certain frame of interest is added may include, in addition to the frame, all of the words of which added as the annotations coincide with those of the frame of interest, the frame, a part of the words of which added as the annotations coincides with that of the frame of interest.

Figure 38:
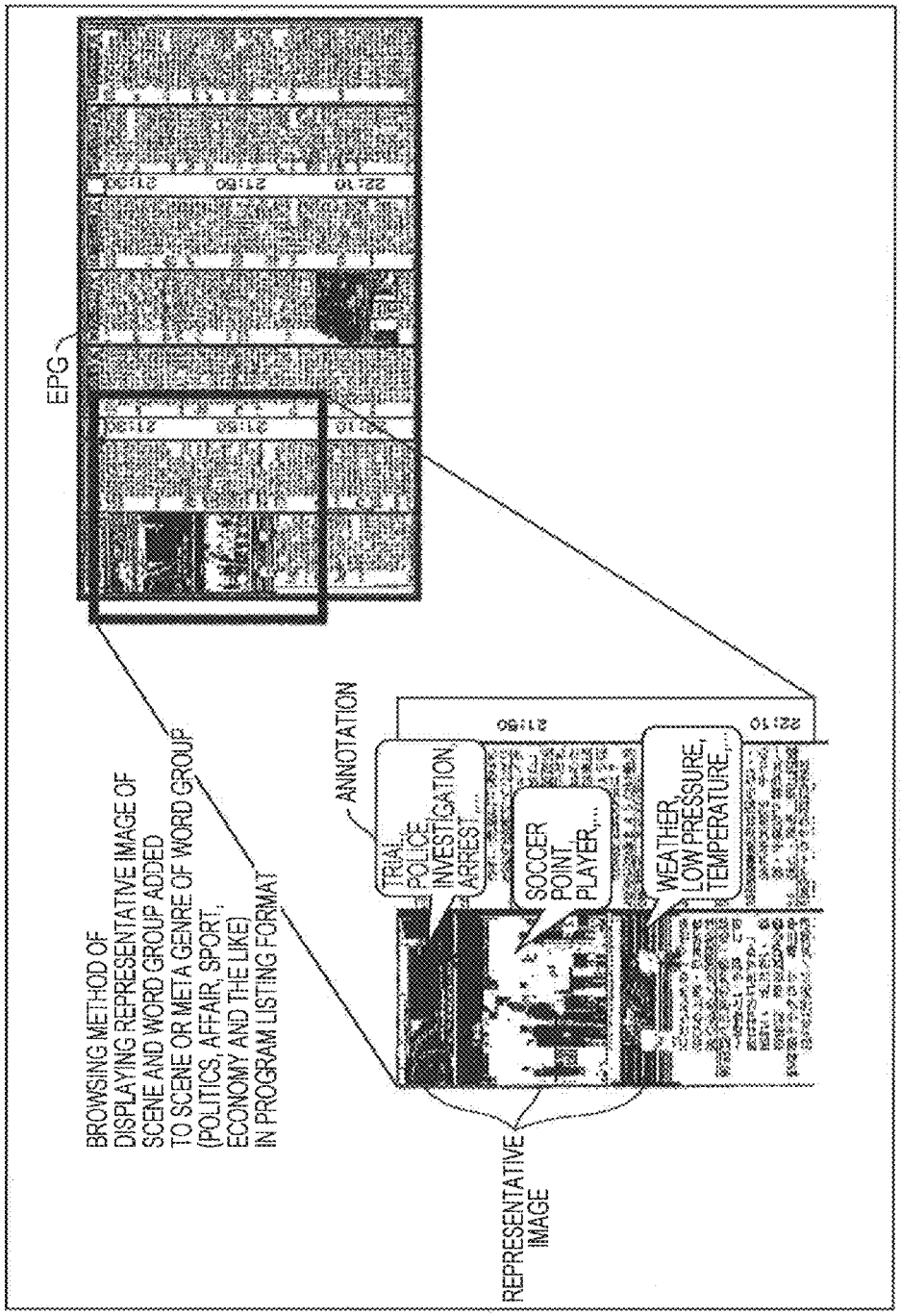
FIG. 38 is a view illustrating a summary of the display control in which the browsing recorder displays the representative images of the scenes so as to be arranged in order of display time.

FIG. 38 is a view illustrating a summary of the display control to display the representative images of the scenes so as to be arranged in order of display time by the browsing recorder in FIG. 35.

In the browsing recorder, when the browsing control device 314 sections all pieces of the target content into the scenes, this displays the representative images of the scenes so as to be arranged in order of display time for each target content.

That is, the browsing control device 314 generates a thumbnail of a first frame of the scene, for example, as the representative image for each scene of the target content and generates an image in which the representative images of the scenes of the target content are arranged in one direction from top down (longitudinal direction) and the like, for example, in order of display time (hereinafter, also referred to as a chronological summary display image).

Then, the browsing control device 314 displays the EPG on a display not illustrated and displays the chronological summary display image of the target content in a program listing of the target content in the program listing of the EPG.

Herein, in the browsing control device 314, a length in the longitudinal direction (direction of time) of the representative image of each scene of the chronological summary display image may be proportional to the time of the scene (the number of frames, which compose the scene).

Also, the browsing control device 314 may display the word as the annotation added to the frame, which composes the scene, in a form of a balloon and the like as illustrated in FIG. 38, for example, for the representative image of each scene of the chronological summary display image.

Further, the browsing control device 314 may prepare a meta genre dictionary in which the word as the annotation is associated with the genre (hereinafter, also referred to as a meta genre) of the news when the word is used in the news program as the target content and display the meta genre together with the annotation or in place of the annotation for the representative image of each scene of the chronological summary display image.

As described above, according to the browsing control device 314, the chronological summary display image is displayed on the EPG together with the annotation added to (the frame, which composes) each scene of the chronological summary display image for the program of the browsing genre, that is, herein the news program.

Therefore, the user may look at the chronological summary display image and the annotation to easily recognize the summary of the scene, which composes the news program recorded within a certain past period.

Also, since the browsing control device 314 sections the target content into the scenes by extracting a group of one or more temporally continuous frames to which the same annotation is added as the scene from the target content, it is highly probable that the scene coincides with the corner such as the economic news, the social news, and the sports news, for example, of the news program, which is the target content.

Therefore, according to the chronological summary display image of the news program displayed on the EPG, the user may understand on first glance (by a quick look) the corners, which compose each news program.

Further, when the user is interested in the sports news, for example, the user may understand how long the corner of the sports news is broadcasted from a certain time in the news program.

Meanwhile, the browsing control device 314 may detect the start time and the end time of each scene based on (the frame of) the start of the target content, for example, when sectioning the target content into the scenes.

In this case, when the representative image of a certain scene out of the representative images, which compose the chronological summary display image of the news program, displayed on the EPG is specified by the operation of the operating unit 301 by the user, the browsing control device 314 may reproduce the scene from the start time. That is, it is possible to cue up a certain corner (scene) of the news program.

Also, the browsing control device 314 may generate the image in which the representative images of the corners of which content is represented by the keyword input by the user by the operation of the operating unit 301 out of the scenes (corners) of the news program are arranged in addition to the image in which the representative images of all of the scenes (corners) of the news program are arranged as the chronological summary display image of the news program and display the same on the EPG.

Figure 39:
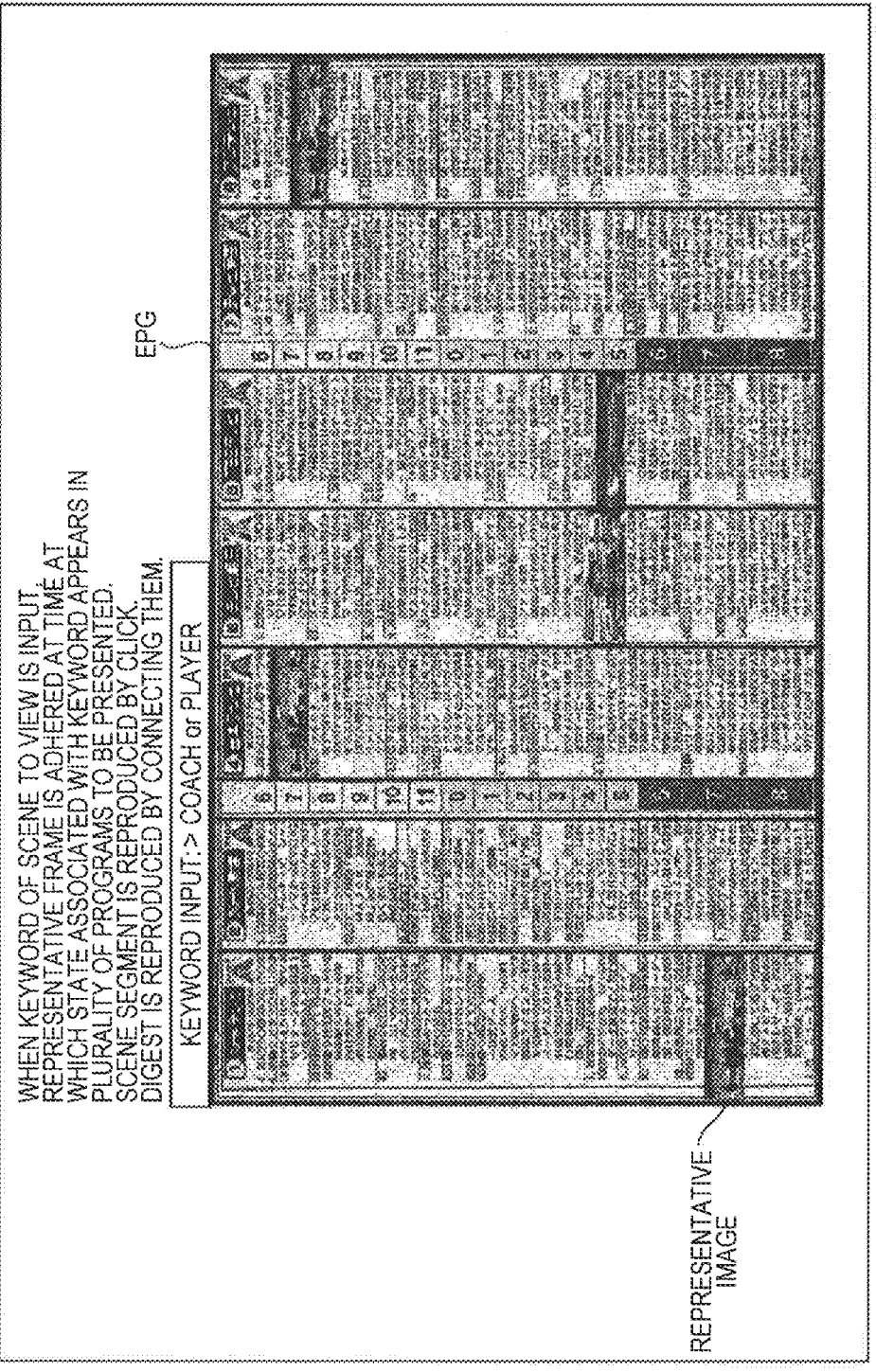
FIG. 39 is a view illustrating the summary of the display control in which a chronological summary display image in which the representative images only of corners (scenes) of which content is represented by the keyword input by the user are arranged in order of display time is displayed.

That is, FIG. 39 is a view illustrating the summary of the display control to display the chronological summary display image in which the representative images only of the corners (scenes) of which content is represented by the keyword input by the user are arranged in order of display time.

The user may input a search query including the keyword by operating the operating unit 301.

Herein, the search query may include an AND search equation and an OR search equation as illustrated in FIGS. 12 to 14 in addition to the keyword.

In the browsing recorder in FIG. 35, the browsing control device 314 reads the recorded program of which genre is the news, which is the browsing genre, out of the recorded programs recorded within a certain past period stored in the content storage unit 311 as the target content and performs a frame searching process to search the keyword frame, which is the frame of which content coincides with the keyword included in the search query input by the user, from the target content by using the annotation model stored in the annotation model storage unit 313 as in the case of the frame searching device 15 in FIG. 1.

Then, the browsing control device 314 extracts a group of one or more temporally continuous keyword frames as the scene from the keyword frames searched from the target content, thereby sectioning the keyword frames of the target content into the scenes.

That is, the browsing control device 314 selects a first keyword frame of the keyword frames of the target content as the frame of interest and adds the frame of interest to a first scene as the frame, which composes the first scene.

Further, the browsing control device 314 selects a next keyword frame of the keyword frames of the target content as a new frame of interest, and when the frame of interest is the keyword frame of which display time is continuous from the keyword frame, which is the frame of interest just before (hereinafter, also referred to as a preceding frame), that is, when the frame of interest is a next frame of the preceding frame in the target content, this adds the frame of interest to the first scene as the frame, which composes the first scene.

Thereafter, the browsing control device 314 selects the next keyword frame of the keyword frames of the target content as the new frame of interest, and while the frame of interest is the keyword frame of which display time is continuous from the preceding frame, this repeatedly adds the frame of interest to the first scene as the frame, which composes the first scene.

On the other hand, when the frame of interest is the keyword frame of which display time is not continuous from the preceding frame, that is, when the frame of interest is the frame two or more frames after the preceding frame in the target content, the browsing control device 314 adds the frame of interest to a second scene as the frame, which composes the second scene as a new scene.

Hereinafter, in the same manner, the browsing control device 314 sections the keyword frames of the target content into one or more scenes.

Thereafter, the browsing control device 314 displays the representative images of the scenes so as to be arranged in order of display time for each target content.

That is, the browsing control device 314 generates the thumbnail of the first frame of the scene, for example, as the representative image for each scene composed of the keyword frames of the target content, for example, and generates the chronological summary display image in which the representative images of the scenes of the target content are arranged in one direction such as from top down, for example, in order of display time.

Then, the browsing control device 314 displays the EPG on the display not illustrated and displays the chronological summary display image of the target content in the program listing of the target content in the program listing of the EPG.

Herein, in the browsing control device 314, a length in the longitudinal direction of the representative image of each scene of the chronological summary display image may be proportional to the time of the scene as in the case in FIG. 38. Further, as in the case in FIG. 38, the word as the annotation added to the frame, which composes the scene, and the meta genre may be displayed for the representative image of each scene of the chronological summary display image.

[Configuration Example of Browsing Control Device 314]

Figure 40:
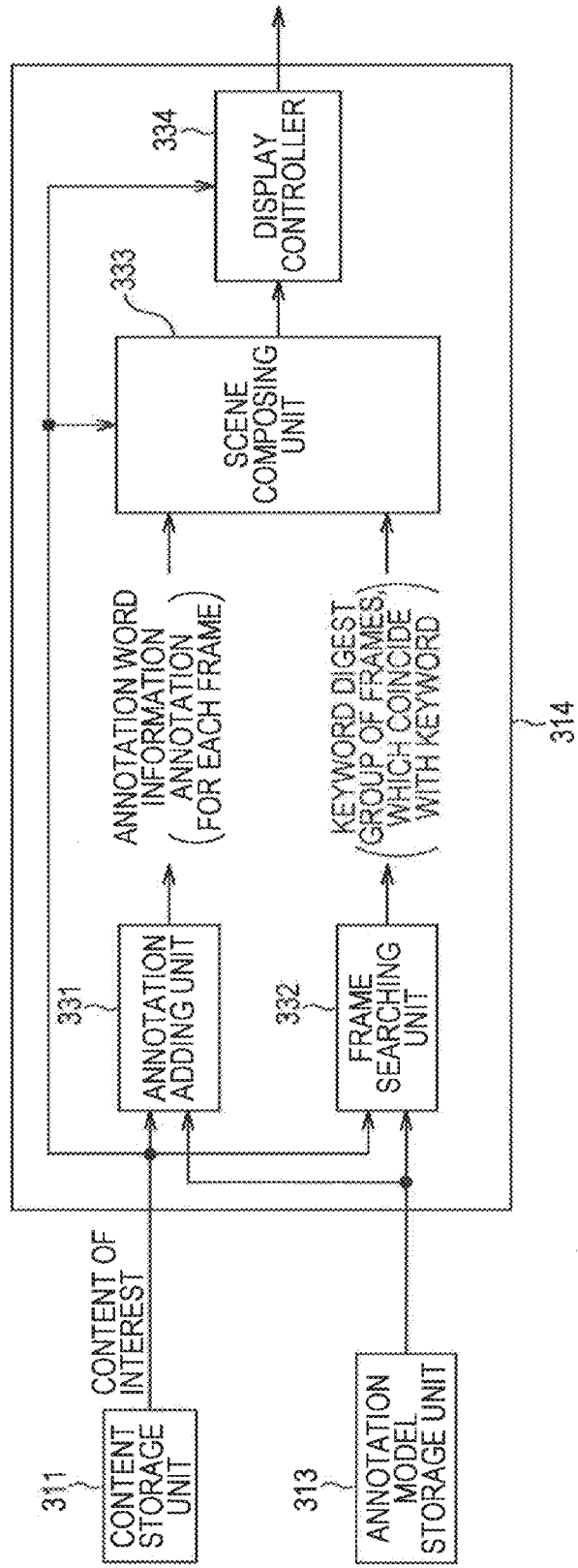
FIG. 40 is a block diagram illustrating a configuration example of a browsing control device 314.

FIG. 40 is a block diagram illustrating a configuration example of the browsing control device 314 in FIG. 35.

The browsing control device 314 includes an annotation adding unit 331, a frame searching unit 332, a scene composing unit 333, and a display controller 334.

The annotation adding unit 331 sequentially selects the target content stored in the content storage unit 311 as the content of interest.

Then, the annotation adding unit 331 adds the annotation to each frame of the content of interest by using the annotation model stored in the annotation model storage unit 313 as in the case of the annotation adding device 14 in FIG. 1 and supplies annotation word information in which the annotation added for each frame of the content of interest and a frame number of the frame (t of a t-th frame) are associated with each other to the scene composing unit 333.

The frame searching unit 332 sequentially selects the target content stored in the content storage unit 311 as the content of interest.

Then, as in the case of the frame searching device 15 in FIG. 1, the frame searching unit 332 searches the keyword frame from the content of interest by using the annotation model stored in the annotation model storage unit 313 and supplies a keyword digest, which is a sequence of the keyword frames in chronological order, to the scene composing unit 333.

The scene composing unit 333 sections the content of interest stored in the content storage unit 311 into the scenes by using the annotation word information supplied from the annotation adding unit 331 and the keyword digest supplied from the frame searching unit 332 (composes the scenes of the content of interest).

Further, the scene composing unit 333 generates the representative image of each scene of the content of interest, generates the chronological summary display image in which the representative images of the scene are arranged from top down in order of display time and supplies the same to the display controller 334.

Herein, the scene composing unit 333 detects the start time and end time of each scene (hereinafter, also referred to as scene time information) when sectioning the content of interest into the scenes and supplies the same to the display controller 334 together with the chronological summary display image.

The display controller 334 displays the EPG on the display not illustrated and displays the chronological summary display image of the content of interest in the program listing of the content of interest in the program listing of the EPG.

Also, the display controller 334 displays the word as the annotation added to the frame, which composes the scene, as illustrated in FIG. 38, for example, by using the annotation word information obtained by the annotation adding unit 331.

Further, when the representative image of a certain scene out of the representative images, which compose the chronological summary display image displayed in the EPG, is specified by the operation of the operating unit 301 (FIG. 35) by the user, and according to this, the cue of the scene is instructed, the display controller 334 recognizes the content including the scene as a cue content, which is a target of the cue, and recognizes the start time of a cued scene from the scene time information from the scene composing unit 333.

Then, the display controller 334 reads the cue content from the content storage unit 311 and performs the reproduction control to reproduce from the cued scene.

[Process of Browsing Recorder]

Hereinafter, a variety of processes performed by the browsing recorder in FIG. 35 are described.

Figure 41:
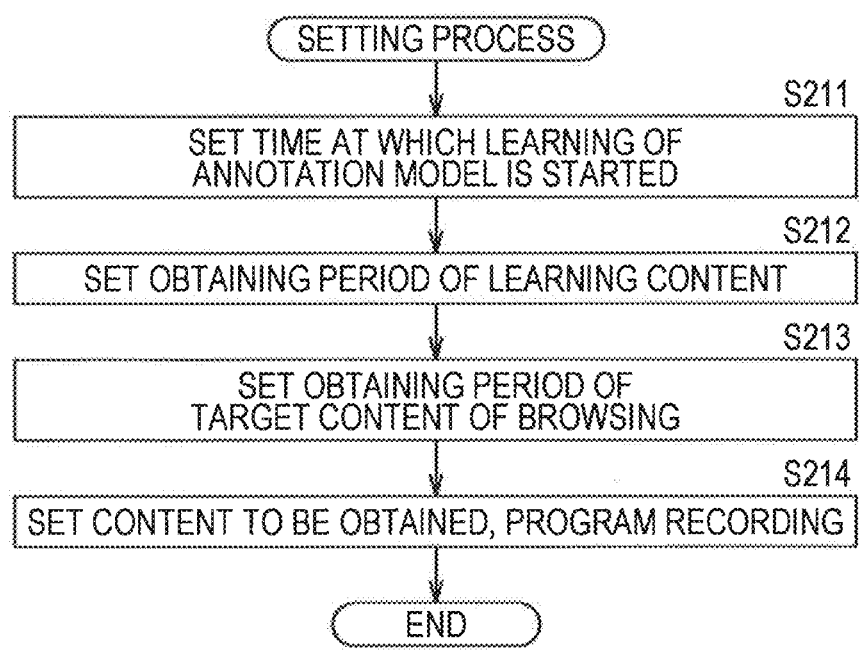
FIG. 41 is a flowchart illustrating a setting process performed by the browsing recorder.

FIG. 41 is a flowchart illustrating a setting process performed by the browsing recorder in FIG. 35.

A variety of settings are performed in the setting process.

That is, in the setting process, at a step S211, the controller 302 (FIG. 35) sets a learning start time at which the learning of the annotation model is started and the process shifts to a step S212.

Herein, regarding the learning start time, it is possible to set a predetermined time such as 22 o'clock, for example, as a default time in a factory of the browsing recorder and the like and set the default time as the learning start time.

Also, it is possible to set the learning start time according to the operation by the user. That is, when the user inputs a time, which becomes the learning start time, by operating the operating unit 301 (FIG. 35), for example, the time may be set as the learning start time.

Meanwhile, the time changing depending on the day of the week may be set, for example, as the learning start time.

Also, it is possible to display a calendar and allow the user to input the time changing each day as the learning start time when setting the learning start time.

Further, as the learning start time, it is possible to set the time input by the user as the learning start time in the past by the operation of the operating unit 301.

At the step S212, the controller 302 sets learning content obtaining period within which the learning content is obtained and the process shifts to a step S213.

Herein, the controller 302 may set a period from a time one week to several weeks before the learning start time to (just before) the learning start time as a default period and set the default period as the learning content obtaining period.

Also, the controller 302 may set the period before the learning start time according to the operation of the operating unit 301 by the user as the learning content obtaining period.

At the step S213, the controller 302 sets target content obtaining period within which the content, which is the target of the scene browsing, that is, the target content from which the scene is to be extracted by the browsing control device 314 (FIGS. 35 and 40) is obtained and the process shifts to a step S214.

Herein, the controller 302 sets a period from a time one week and the like before the learning start time to (just before) the learning start time as a default period, for example, and sets the default period as the target content obtaining period.

Also, the controller 302 may set the target content obtaining period according to the operation of the operating unit 301 by the user.

However, the controller 302 sets the time period overlapping with the learning content obtaining period as the target content obtaining period. Therefore, the target content obtaining period is included in the learning content obtaining period.

By setting the time period overlapping with the learning content obtaining period as the target content obtaining period, it is possible to use the content of which content is not significantly different as the learning content and the target content.

That is, when the content of a period within which the Olympic game is taken place is set as the target content, for example, it is possible to perform the annotation adding process and the frame searching process by using the annotation model of which learning is performed with the content of the period within which the Olympic game is taken place as the learning content.

At a step S214, the controller 302 sets the content broadcasted within the learning content obtaining period out of the content of which genre is the news, which is the browsing genre, (news programs) as a recording target content, which is the content to be recorded.

Then, the controller 302 programs to record the recording target content, that is, sets the channel on which the recording target content is broadcasted, a recording start time at which the recording is started (broadcast start time of the recording target content) and a recording end time at which the recording ends (broadcast end time of the recording target content) and the setting process ends.

Herein, as described above, since the target content obtaining period is included in the learning content obtaining period, when the news program broadcasted within the learning content obtaining period out of the content of which genre is the news, which is the browsing genre, (news programs) is set as the recording target content, the news program broadcasted within the target content obtaining period out of the content of which genre is the news, which is the browsing genre, (news programs) also is set as the recording target content according to this.

Meanwhile, it is possible to set the recording target content out of the content of which genre is the news, which is the browsing genre, according to the operation of the operating unit 301 by the user.

That is, the controller 302 may display the content of which genre is the news, which is the browsing genre, (news program) broadcasted within the learning content obtaining period on the EPG on the display not illustrated and set the news program selected by the operation of the operating unit 301 by the user from the EPG as the recording target content.

Figure 42:
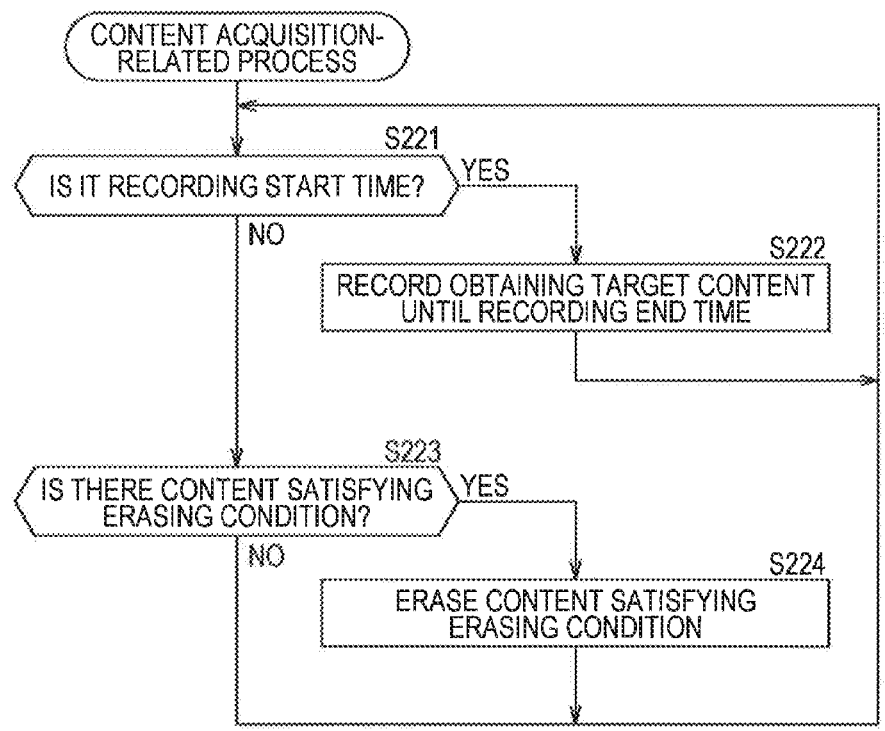
FIG. 42 is a flowchart illustrating a content acquisition-related process performed by the browsing recorder.

FIG. 42 is a flowchart illustrating a content acquisition-related process performed by the browsing recorder in FIG. 35.

In the content acquisition-related process, the process related to acquisition of the recording target content is performed.

That is, in the content acquisition-related process, at a step S221, the controller 302 judges whether a current time is the recording start time of an optional recording target content.

At the step S221, when the current time is judged to be the recording start time, the process shifts to a step S222 and the controller 302 controls the content obtaining unit 310 to record the recording target content until the recording end time, and the process returns back to the step S221.

Herein, the content obtaining unit 310 performs programmed recording of the recording target content according to the control of the controller 302 and allows the content storage unit 311 to store the same.

On the other hand, when it is judged that the current time is not the recording start time at the step S221, the process skips the step S222 to shift to a step S223 and the controller 302 judges whether there is the content satisfying an erasing condition in the content stored (recorded) in the content storage unit 311.

Herein, the erasing condition is the condition to erase the content and a fact that the content is broadcasted (recorded) before the learning content obtaining period may be adopted, for example.

In this case, when there is the content broadcasted before the learning content obtaining period in the content stored in the content storage unit 311, it is judged that there is the content satisfying the erasing condition.

At the step S223, when it is judged that there is the content satisfying the erasing condition in the content stored in the content storage unit 311, the process shifts to a step S224 and the controller 302 erases the content satisfying the erasing condition in the content stored in the content storage unit 311, and the process returns back to the step S221.

Herein, it is possible to prevent capacity shortage of the content storage unit 311 by erasing the content satisfying the erasing condition from the content storage unit 311.

Meanwhile, the user may protect the content stored in the content storage unit 311 by operating the operating unit 301. The controller 302 does not erase the protected content even if this satisfies the erasing condition.

On the other hand, at the step S223, when it is judged that there is no content satisfying the erasing condition in the content stored in the content storage unit 311, the process skips the step S224 to return back to the step S221.

Meanwhile, the browsing recorder in FIG. 35 may extract the feature amount of each frame of the content by the learning device 312 while performing the programmed recording of the content depending on its performance.

The feature amount extracted by the learning device 312 may be used in the annotation adding process by the annotation adding unit 331 and the frame searching process by the frame searching unit 332 of the browsing control device 314 (FIG. 40) in addition to the learning of the annotation model by the learning device 312.

Also, in this embodiment, the content obtaining unit 310 is composed of the tuner, which receives the television broadcast program; when the content obtaining unit 310 includes a plurality of tuners, it is possible to record a plurality of recording target content of which recording time slots overlap with each other up to the number of tuners included in the content obtaining unit 310 even when there are a plurality of recording target content of which recording (broadcast) time slots overlap with each other.

Meanwhile, when the number of recording target content of which recording time slots overlap with each other is larger than the number of tuners included in the content obtaining unit 310, the content obtaining unit 310 preferentially records the recording target content as many as the number of the tuners according to a predetermined recording rule.

As the recording rule, a fact that the content of which recording start time is earlier is preferentially recorded and a fact that the content including the text of the caption is preferentially recorded out of the content of the same recording start time may be adopted, for example.

Also, the user may set a priority level of the recording for a plurality of recording target content of which recording time slots overlap with each other by operating the operating unit 301. When the user sets the priority level of the recording, the content is recorded according to the priority level set by the user regardless of the recording rule.

Herein, it is possible to store the recorded content (and the feature amounts thereof) in the content storage unit 311 by separating them into the content including the text of the caption and the content, which does not include the same.

In the browsing recorder in FIG. 35, the recording target content broadcasted within the learning content obtaining period by the programmed recording is stored in the content storage unit 311, and when (the current time becomes) the learning start time, the learning device 312 selects the content including the text of the caption as the learning content from among the content broadcasted within the learning content obtaining period out of the content of which genre is the news, which is the browsing genre, (news programs) stored in the content storage unit 311.

Meanwhile, the content of which meta data of the program, which becomes the description text, may be obtained from the program meta data service and the like, for example, may be selected as the learning content even when this is the content, which does not include the text of the caption.

After selecting the learning content, the learning device 312 (FIG. 35) composes the annotation sequence from the learning content and learns the annotation model, which is the multi-stream HMM, by using the annotation sequence as in the case of the learning device 12 in FIG. 1.

Then, the learning device 312 supplies the learned annotation model to the annotation model storage unit 313 for storage.

Figure 43:
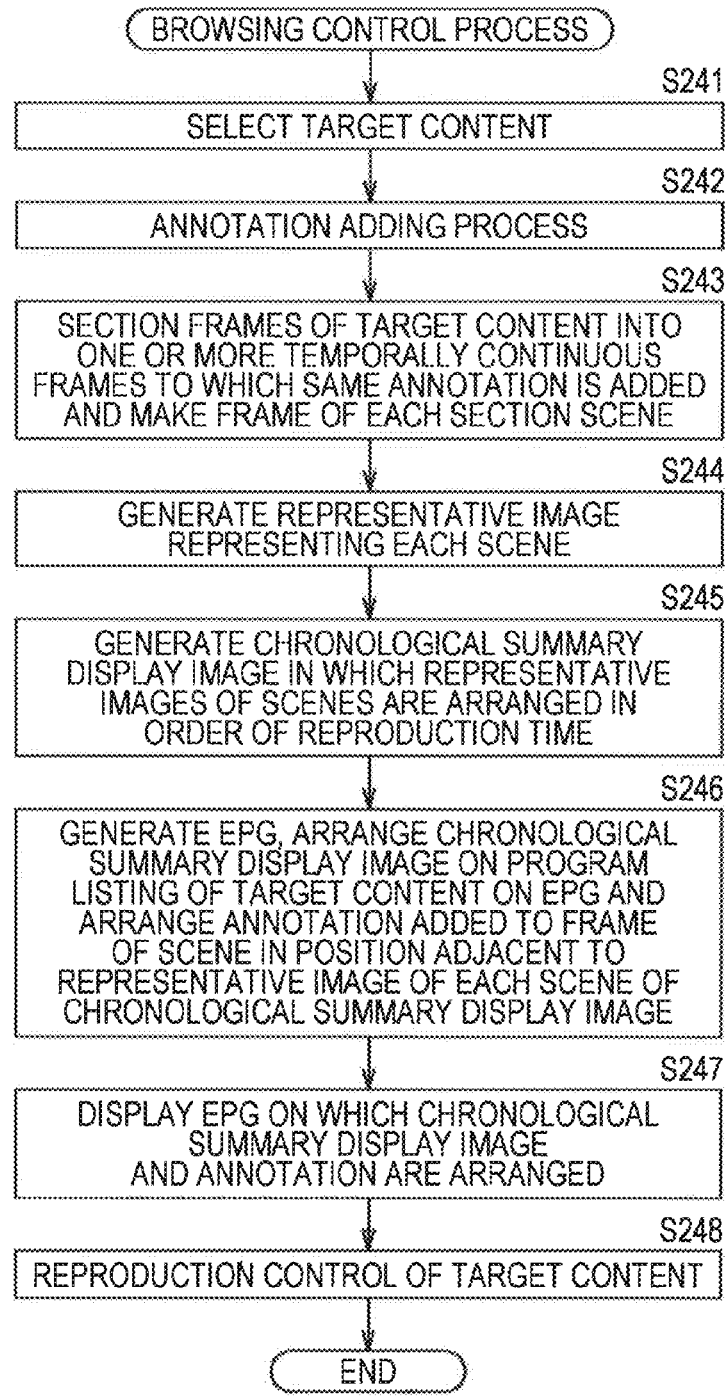
FIG. 43 is a flowchart illustrating a process (browsing controlling process) performed by the browsing control device 314 by using the annotation model.

FIG. 43 is a flowchart illustrating a process performed by the browsing control device 314 by using the annotation model (browsing control process).

When the user operates the operating unit 301 so as to browse the program of which genre is the browsing genre, for example, the browsing control device 314 starts the browsing control process.

In the browsing control process, at a step S241, the annotation adding unit 331 of the browsing control device 314 (FIG. 40) selects all pieces of the content broadcasted within the target content obtaining period out of the content of which genre is the news, which is the browsing genre, (news programs) stored in the content storage unit 311 as the target content and the process shifts to a step S242.

At the step S242, as in the case of the annotation adding device 14 in FIG. 1, the annotation adding unit 331 adds (the word, which becomes) the annotation to each frame of each target content by using the annotation model stored in the annotation model storage unit 313 and supplies the annotation word information including the annotation added to each frame to the scene composing unit 333 for each target content, and the process shifts to a step S243.

At the step S243, the scene composing unit 333 extracts a group of one or more temporally continuous frames to which the same annotation is added as the scene based on the annotation word information from the annotation adding unit 331 for each target content stored in the content storage unit 311, thereby sectioning the target content into the scenes.

Further, the scene composing unit 333 detects the scene time information, which is the start time and the end time of each scene, for each target content and the process shifts to a step S244.

At the step S244, the scene composing unit 333 generates the representative image of each scene, which composes the target content, for each target content and the process shifts to a step S245.

At the step S245, the scene composing unit 333 generates the chronological summary display image in which the representative images of the scenes, which compose the target content, are arranged from top down in order of display (reproduction) time for each target content.

Then, the scene composing unit 333 supplies the chronological summary display image to the display controller 334 together with the scene time information and the annotation word information for each target content and the process shifts from the step S245 to a step S246.

At the step S246, the display controller 334 obtains (receives) the EPG data and generates (an image of) the EPG by using the EPG data.

Further, the display controller 334 arranges the chronological summary display image of the target content in the program listing of the target content on the EPG and arranges the word as the annotation added to the frame, which composes the scene, in a balloon format as illustrated in FIG. 38, for example, in the vicinity of the representative image of each scene of the chronological summary display image for each target content.

Herein, the display controller 334 recognizes the word as the annotation added to the frame, which composes the scene, from the annotation word information from the scene composing unit 333.

Thereafter, the process shifts from the step S246 to a step S247 and the display controller 334 displays the EPG on which the chronological summary display image and the annotation are arranged on the display not illustrated and the process shifts to a step S248.

At the step S248, the display controller 334 performs the reproduction control of the target content.

That is, when the representative image of a certain scene of the representative images, which compose the chronological summary display image of the target content displayed on the EPG, is specified by the operation of the operating unit 301 by the user, the display controller 334 recognizes the content including the scene as the cue content, which is the target of the cue, and recognizes the start time of the scene of which representative image is specified by the user from the scene time information from the scene composing unit 333.

Then, the display controller 334 reads the target content as the cue content from the content storage unit 311 and performs the reproduction control to start reproducing the target content from the start time of the scene of which representative image is specified by the user.

The display controller 334 may also display a keyword entry field to which (the search query including) the keyword is input on the display not illustrated when displaying the EPG on which the chronological summary display image and the annotation are arranged.

The user may input (the search query including) the keyword to the keyword entry field by operating the operating unit 301 (FIG. 35) and when the keyword is input to the keyword entry field, the browsing controller 314 generates the image in which the representative images only of the corners of which content is represented by the keyword input by the operation of the operating unit 301 by the user out of the scenes (corners) of the target content are arranged for each target content and displays the same on the EPG.

Figure 44:
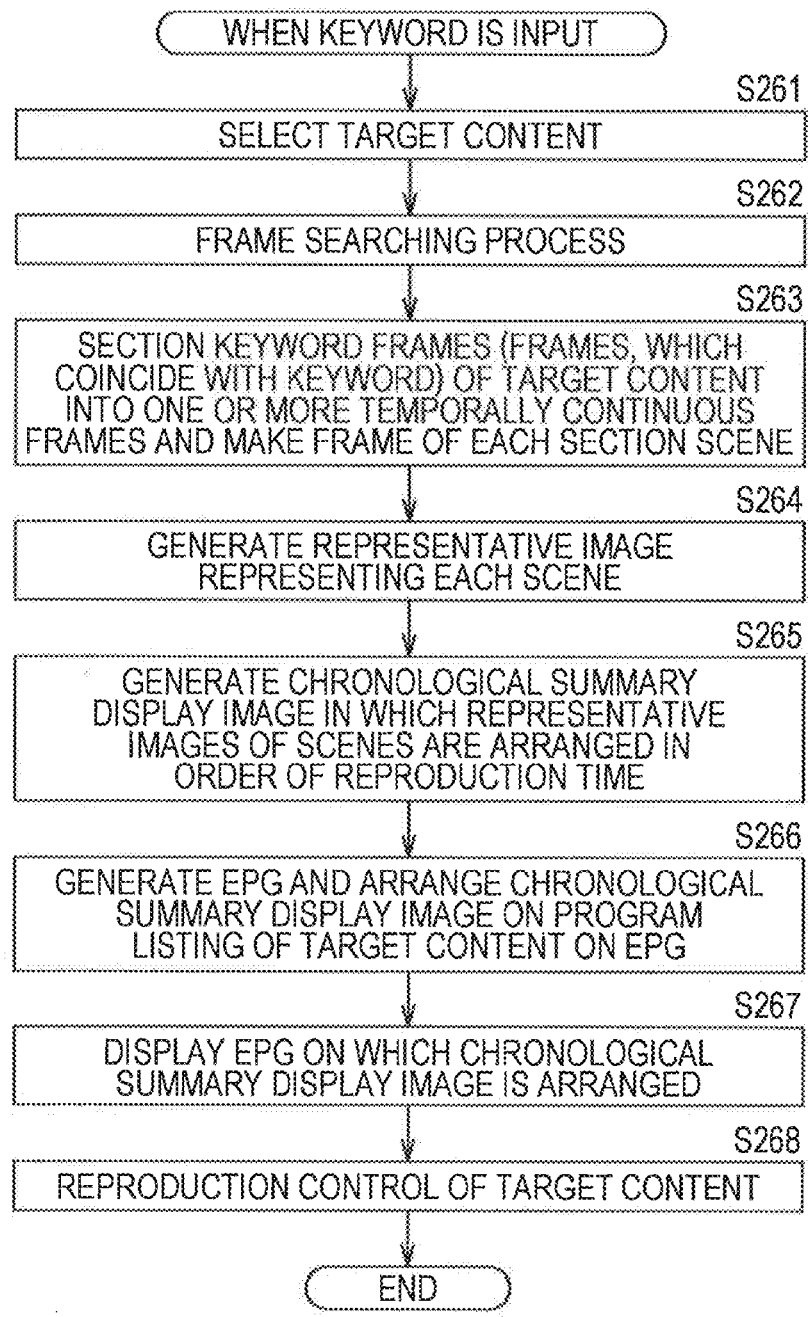
FIG. 44 is a flowchart illustrating a process performed by the browsing control device 314 when the user inputs the keyword.

That is, FIG. 44 is a flowchart illustrating a process performed by the browsing control device 314 when the user inputs the keyword.

When the user inputs (the search query including) the keyword to the keyword entry field by operating the operating unit 301 (FIG. 35), at a step S261, the frame searching unit 332 of the browsing control device 314 (FIG. 40) selects all pieces of the content broadcasted within the target content obtaining period out of the content of which genre is the news, which is the browsing genre, (news programs) stored in the content storage unit 311 as the target content and the process shifts to a step S262.

That is, at the step S261, the content selected as the target content at the step S241 in FIG. 43 out of the content stored in the content storage unit 311 (FIG. 35) are selected as the target content.

At the step S262, as in the case of the frame searching device 15 in FIG. 1, the frame searching unit 332 searches the keyword frame, which is the frame with high keyword coincidence with the keyword input by the user, for each target content by using the annotation model stored in the annotation model storage unit 313 and generates the keyword digest in which the keyword frames are arranged in chronological order and supplies the same to the scene composing unit 333 (FIG. 40).

Thereafter, the process shifts from the step S262 to a step S263 and the scene composing unit 333 extracts a group of one or more temporally continuous frames (group of the frames of which display (reproduction) times are continuous) as the scene from the keyword frames, which compose the keyword digest, from the frame searching unit 332 for each target content, thereby sectioning the keyword digest of the target content into the scenes.

Further, the scene composing unit 333 detects the scene time information, which is the start time and end time of each scene, for each target content and the process shifts to a step S264.

At the step S264, the scene composing unit 333 generates the representative image of each scene, which composes the keyword digest of the target content, for each target content and the process shifts to a step S265.

At the step S265, the scene composing unit 333 generates the chronological summary display image in which the representative images of the scenes, which compose the keyword digest of the target content, are arranged from top down in order of display (reproduction) time for each target content.

Then, the scene composing unit 333 supplies the chronological summary display image to the display controller 334 together with the scene time information for each target content and the process shifts from the step S265 to a step S266.

At the step S266, the display controller 334 obtains (receives) the EPG data and generates (the image of) the EPG by using the EPG data.

Further, the display controller 334 arranges the chronological summary display image of the target content in the program listing of the target content on the EPG for each target content.

Thereafter, the process shifts from the step S266 to a step S267 and the display controller 334 displays the EPG on which the chronological summary display image is arranged on the display not illustrated and the process shifts to a step S268.

At the step S268, the display controller 334 performs the reproduction control of the target content.

That is, when the representative image of a certain scene of the representative images, which compose the chronological summary display image of the target content displayed on the EPG, is specified by the operation of the operating unit 301 by the user, the display controller 334 recognizes the content including the scene as the cue content, which is the target of the cue, and recognizes the start time of the scene of which representative image is specified by the user from the scene time information from the scene composing unit 333.

Then, the display controller 334 reads the target content as the cue content from the content storage unit 311 and performs the reproduction control to start reproducing the target content from the start time of the scene of which representative image is specified by the user.

Meanwhile, the user may specify the program listing in which the chronological summary display image is arranged on the EPG by operating the operating unit 301.

In this case, the display controller 334 may perform the reproduction control to reproduce the keyword digest of the target content corresponding to the program listing specified by the user.

When the keyword digest is reproduced, it is possible to reproduce the keyword frames, which compose the keyword digest, in chronological order (in order of display time) or in descending order of the keyword coincidence.

Meanwhile, the browsing genre is not limited to the news.

Also, the chronological summary display image may be displayed not on the EPG but by itself. That is, it is possible to display the chronological summary display images of one or more pieces of target content so as to be arranged in a direction orthogonal to a direction in which the representative images of the scenes, which compose the chronological summary display image, are arranged (longitudinal direction in this embodiment) (horizontal direction in this embodiment) with starting positions (positions of the representative images of the first scenes) aligned with one another.

Further, in the browsing recorder in FIG. 35, in addition to the television broadcast program, the content provided from a server on the Internet may be adopted as the content used as the learning content and the target content.

[Description of Computer to which this Invention is Applied)

A series of processes described above may be performed by hardware or by software. When a series of processes are performed by the software, a program, which composes the software, is installed on a multi-purpose computer and the like.

Figure 45:
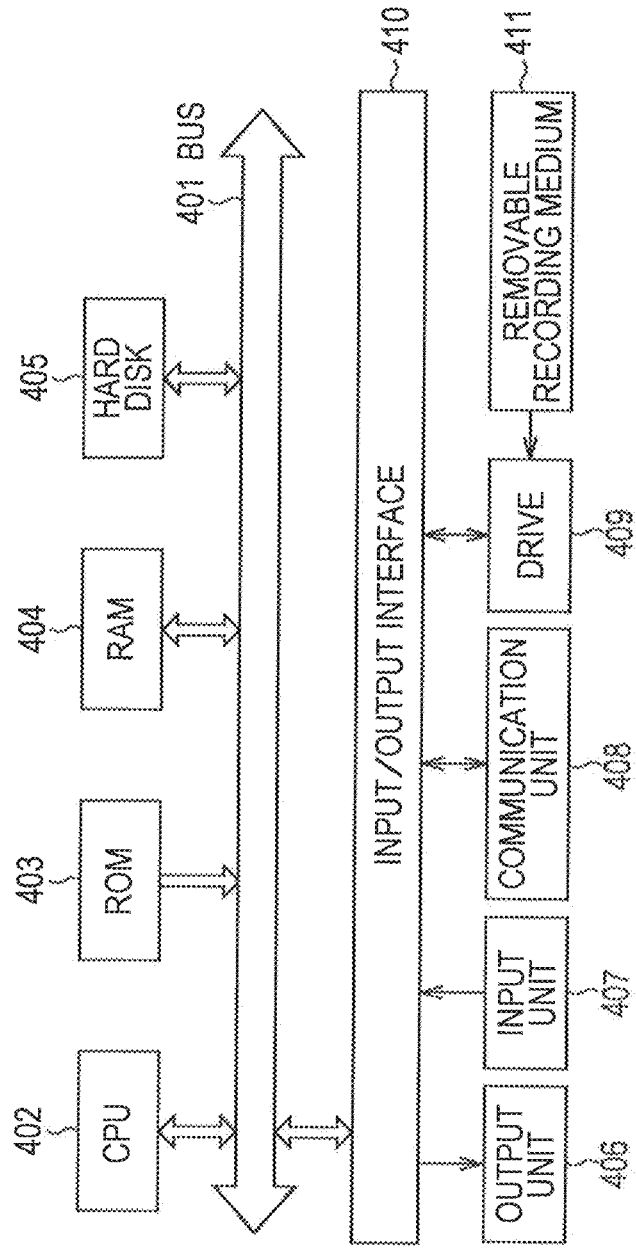
FIG. 45 is a block diagram illustrating a configuration example of one embodiment of a computer to which the present invention is applied.

FIG. 45 illustrates a configuration example of one embodiment of the computer on which the program, which executes a series of processes described above, is installed.

The program may be recorded in advance in a hard disk 405 and a ROM 403 as a recording medium embedded in the computer.

Alternatively, the program may be stored (recorded) in a removable recording medium 411. Such removable recording medium 411 may be provided as so-called package software. Herein, the removable recording medium 411 includes a flexible disc, a CD-ROM (compact disc read only memory), an MO (magneto optical) disc, a DVD (digital versatile disc), a magnetic disc, a semiconductor memory and the like, for example.

Meanwhile, the program may be installed on the computer from the above-described removable recording medium 411 or may be downloaded to the computer through a communication network and a broadcast network to be installed on an embedded hard disk 405. That is, the program may be wirelessly transmitted from a downloading site to the computer through a satellite for digital satellite broadcasting or may be transmitted by wire to the computer through the network such as a LAN (local area network) and the Internet, for example.

A CPU (central processing unit) 402 is embedded in the computer and an input/output interface 410 is connected to the CPU 402 through a bus 401.

When an instruction is input by operation and the like of an input unit 407 by the user through the input/output interface 410, the CPU 402 executes the program stored in the ROM (read only memory) 403 according to this. Alternatively, the CPU 402 loads the program stored in the hard disk 405 onto a RAM (random access memory) 404 to execute.

According to this, the CPU 402 performs the process according to the above-described flowchart or the process performed by the configuration of the above-described block diagram. Then, the CPU 402 outputs the processing result from an output unit 406 through the input/output interface 410 for example, as needed, or transmits the same from a communication unit 408 or records the same in the hard disk 405.

Meanwhile, the input unit 407 is composed of a keyboard, a mouse, a microphone and the like. The output unit 406 is composed of a LCD (liquid crystal display), a speaker and the like.

Herein, in this specification, the process performed by the computer according to the program is not necessarily performed in chronological order along the order described as the flowchart. That is, the process performed by the computer according to the program also includes the process executed in parallel or independently executed (for example, a parallel process and a process by an object).

Also, the program may be processed by one computer (processor) or processed by a plurality of computers. Further, the program may be transmitted to a remote computer to be executed.

Meanwhile, the embodiments of the present invention are not limited to the above-described embodiments and various modifications may be made without departing from the spirit of the present invention.

REFERENCE SIGNS LIST

11 content storage unit, 12 learning device, 13 annotation model storage unit, 14 annotation adding device, 15 frame searching device, 16 display control device, 21 feature amount extracting unit, 22 model learning unit, 31 image obtaining unit, 32 image feature amount extracting unit, 33 description text obtaining unit, 34 text feature amount extracting unit, 35 synchronization unit, 41 feature amount extracting unit, 42 maximum likelihood state sequence calculating unit, 43 word selecting unit, 51 feature amount extracting unit, 52 maximum likelihood state sequence calculating unit, 53 keyword coincidence calculating unit, 54 keyword supplying unit, 55 frame selecting unit, 61 feature amount extracting unit, 62 maximum likelihood state sequence calculating unit, 63 display controller, 101 image feature amount extracting unit, 101$_1$ first image feature amount extracting unit, 101$_2$ second image feature amount extracting unit, 101$_3$ third image feature amount extracting unit, 102 seclusion obtaining unit, 103 audio feature amount extracting unit, 151 basis space learning unit, 152 basis space data storage unit, 153 dimension reducing unit, 161 basis space learning unit, 162 basis space data storage unit, 163 dimension reducing unit, 171 image obtaining unit, 172 image feature amount extracting unit, 172$_1$ first image feature amount extracting unit, 172$_2$ second image feature amount extracting unit, 172$_3$ third image feature amount extracting unit, 173 basis space data storage unit, 174 dimension reducing unit, 181 description text obtaining unit, 182 text feature amount extracting unit, 183 basis space data storage unit, 184 dimension reducing unit, 191 synchronization unit, 201 basis space learning unit, 202 basis space data storage unit, 203 dimension reducing unit, 211 basis space learning unit, 212 basis space data storage unit, 213 dimension reducing unit, 221 basis space learning unit, 222 basis space data storage unit, 223 dimension reducing unit, 261 basis space data storage unit, 262 dimension reducing unit, 271 basis space data storage unit, 272 dimension reducing unit, 281 audio obtaining unit, 282 audio feature amount extracting unit, 283 basis space data storage unit, 284 dimension reducing unit, 301 operating unit, 302 controller, 310 content obtaining unit, 311 content storage unit, 312 learning device, 313 annotation model storage unit, 314 browsing control device, 331 annotation adding unit, 332 frame searching unit, 333 scene composing unit, 334 display controller, 401 bus, 402 CPU, 403 ROM, 404 RAM, 405 hard disk, 406 output unit, 407 input unit, 408 communication unit, 409 drive, 410 input/output interface, 411 removable recording medium

The invention claimed is:

1. An information processing device, comprising:
   a learning module configured to
   extract an image feature amount of each frame of an image of learning content and extracting word frequency information regarding a frequency of appearance of each word in a description text describing a content of the image of the learning content as a text feature amount of the description text,
   wherein the learning content includes a text of a caption, and
   wherein the description text is the text of the caption included in the learning content, and
   learn an annotation model, which is a multi-stream HMM (Hidden Markov Model), by using an annotation sequence for annotation, which is a multi-stream including the image feature amount and the text feature amount; and
   a browsing controller configured to extract a scene, which is a group of one or more temporally continuous frames, from target content from which the scene is to be extracted by using the annotation model, and
   display representative images of scenes so as to be arranged in chronological order.

2. The information processing device according to claim 1, wherein
   the learning means
   extracts words included in the text of the caption displayed in a window as one document while shifting the window of a predetermined time length at regular intervals, and
   extracts multinomial distribution, which represents a frequency of appearance of each word in the document, as the text feature amount.

3. The information processing device according to claim 1, wherein
   the learning means
   extracts words included in the text of the caption displayed in a window as one document while shifting the window of a predetermined time length at regular intervals, and
   extracts multinomial distribution, which represents a frequency of appearance of each word in the document, as the text feature amount, and
   the browsing controlling means
   extracts the image feature amount of each frame of the image of the target content and composes the annotation sequence by using the image feature amount,
   obtains a maximum likelihood state sequence in which the annotation sequence is observed in the annotation model,
   selects a word with high frequency in the multinomial distribution observed in a state corresponding to a noted frame of interest out of states of the maximum likelihood state sequence as an annotation to be added to the frame of interest,
   extracts a group of one or more temporally continuous frames to which the same annotation is added as the scene from the target content, and
   displays the representative images of the scenes so as to be arranged in chronological order.

4. The information processing device according to claim 3, wherein
   the target content is content of a broadcast program, and
   the browsing controlling means displays the representative images of the scenes of the broadcast program so as to be arranged in chronological order in a program listing of the broadcast program on an EPG (electronic program guide).

5. The information processing device according to claim 3, wherein
   the browsing controlling means also displays the annotation added to the frame, which composes the scene, together with a representative image of the scene.

6. The information processing device according to claim 1, wherein the learning means extracts words included in the text of the caption displayed in a window as one document while shifting the window of a predetermined time length at regular intervals, and extracts multinomial distribution, which represents a frequency of appearance of each word in the document, as the text feature amount, and the browsing controlling means extracts the image feature amount of each frame of the image of the target content and composes the annotation sequence by using the image feature amount, obtains a maximum likelihood state sequence in which the annotation sequence is observed in the annotation model, selects, when a frequency of a predetermined keyword is high in the multinomial distribution observed in a state corresponding to a noted frame of interest out of states of the maximum likelihood state sequence, the frame of interest as a keyword frame, which is the frame of which content coincides with a predetermined keyword, extracts a group of one or more temporally continuous frames as the scene from the keyword frame, and displays the representative images of the scenes so as to be arranged in chronological order.

7. The information processing device according to claim 6, wherein the target content is content of a broadcast program, and the browsing controlling means displays the representative images of the scenes of the broadcast program so as to be arranged in chronological order in a program listing of the broadcast program on an EPG (electronic program guide).

8. The information processing device according to claim 1, wherein the learning means performs dimension reduction to reduce a dimension of the image feature amount and the text feature amount, and learns the annotation model by using the multi-stream including the image feature amount and the text feature amount after the dimension reduction as the annotation sequence.

9. The information processing device according to claim 8, wherein the learning means obtains basis space data of a basis space for image of which dimension is lower than the dimension of the image feature amount for mapping the image feature amount by using the image feature amount, performs the dimension reduction of the image feature amount based on the basis space data of the basis space for image, obtains basis space data of a basis space for text of which dimension is lower than the dimension of the text feature amount for mapping the text feature amount by using the text feature amount, and performs the dimension reduction of the text feature amount based on the basis space data of the basis space for text.

10. The information processing device according to claim 9, wherein the learning means obtains a code book used for vector quantization as the basis space data of the basis space for image by using the image feature amount, and obtains a code representing a centroid vector as the image feature amount after the dimension reduction by performing the vector quantization of the image feature amount by using the code book.

11. The information processing device according to claim 9, wherein the learning means extracts words included in the text of the caption displayed in a window as one document while shifting the window of a predetermined time length at regular intervals, extracts a frequency of appearance of each word in the document as the text feature amount, obtains a parameter of LDA (latent Dirichlet allocation) as the basis space data of the basis space for text by learning the LDA by using the document obtained from the learning content, and converts the text feature amount obtained from the document to topic likelihood, which is likelihood of each latent topic of the LDA for the document, by using the parameter of the LDA, to obtain a topic label representing the latent topic of which topic likelihood is the maximum as the text feature amount after the dimension reduction.

12. The information processing device according to claim 11, wherein the learning means generates a word dictionary of the words appearing in the document by using the document obtained from the learning content and creates a topic-to-frequently appearing word table of a word with high appearance frequency in the latent topic of the LDA and the appearance frequency of the word by using occurrence probability of occurrence of each word in the word dictionary in each latent topic of the LDA obtained by learning the LDA, and the browsing controlling means extracts the image feature amount of each frame of the image of the target content, performs the dimension reduction, and composes the annotation sequence by using the image feature amount after the dimension reduction, obtains a maximum likelihood state sequence in which the annotation sequence is observed in the annotation model, selects the latent topic represented by the topic label with high output probability in a state corresponding to a noted frame of interest out of states of the maximum likelihood state sequence as a frame topic representing a content of the frame of interest, selects a word with high appearance frequency in the frame topic as the annotation to be added to the frame of interest based on the topic-to-frequently appearing word table, extracts a group of one or more temporally continuous frames to which the same annotation is added as the scene from the target content, and displays the representative images of the scenes so as to be arranged in chronological order.

13. The information processing device according to claim 12, wherein the target content is content of a broadcast program, and the browsing controlling means displays the representative images of the scenes of the broadcast program so as to be arranged in a program listing of the broadcast program on an EPG (electronic program guide) in chronological order.

14. The information processing device according to claim 12, wherein the browsing controlling means also displays the annotation added to the frame, which composes the scene, together with a representative image of the scene.

15. The information processing device according to claim 12, wherein the learning means generates a word dictionary of the words appearing in the document by using the document obtained from the learning content and creates a topic-to-frequently appearing word table of a word with high appearance frequency in the latent topic of the LDA and the appearance frequency of the word by using occurrence probability of occurrence of each word in the word dictionary in each latent topic of the LDA obtained by learning the LDA, and the browsing controlling means extracts the image feature amount of each frame of the image of the target content, performs the dimension reduction, and composes the annotation sequence by using the image feature amount after the dimension reduction, obtains a maximum likelihood state sequence in which the annotation sequence is observed in the annotation model, selects the latent topic represented by the topic label with high output probability in a state corresponding to a noted frame of interest out of states of the maximum likelihood state sequence as a frame topic representing a content of the frame of interest, obtains an appearance frequency of a predetermined keyword in the frame topic based on the topic-to-frequently appearing word table and selects, when the appearance frequency of the predetermined keyword is high, the frame of interest as a keyword frame, which is a frame of which content coincides with the predetermined keyword, extracts a group of one or more temporally continuous frames from the keyword frame as the scene, and displays the representative images of the scenes so as to be arranged in chronological order.

16. The information processing device according to claim 15, wherein the target content is content of a broadcast program, and the browsing controlling means displays the representative images of the scenes of the broadcast program so as to be arranged in chronological order in a program listing of the broadcast program on an EPG (electronic program guide).

17. An information processing method to be performed by an information processing device, comprising the steps of:

extracting an image feature amount of each frame of an image of learning content and extracting word frequency information regarding a frequency of appearance of each word in a description text describing a content of the image of the learning content as a text feature amount of the description text, wherein the learning content includes a text of a caption, and wherein the description text is the text of the caption included in the learning content;

learning an annotation models which is a multi-stream HMM (Hidden Markov Model), by using an annotation sequence for annotation, which is a multi-stream including the image feature amount and the text feature amount;

extracting a scene, which is a group of one or more temporally continuous frames, from target content from which the scene is to be extracted by using the annotation model; and displaying representative images of scenes so as to be arranged in chronological order.

18. A non-transitory computer-readable medium having a set of computer-executable instructions embodied thereon to perform a method in a computing device comprising:

extract an image feature amount of each frame of an image of learning content and extracting word frequency information regarding a frequency of appearance of each word in a description text describing a content of the image of the learning content as a text feature amount of the description text, wherein the learning content includes a text of a caption, and wherein the description text is the text of the caption included in the learning content;

learn an annotation model, which is a multi-stream HMM (Hidden Markov Model), by using an annotation sequence for annotation, which is a multi-stream including the image feature amount and the text feature amount;

extract a scene, which is a group of one or more temporally continuous frames, from target content from which the scene is to be extracted by using the annotation model; and display representative images of scenes so as to be arranged in chronological order.

* * * * *